(12) United States Patent
Owens et al.

(10) Patent No.: US 12,306,390 B2
(45) Date of Patent: May 20, 2025

(54) HIGH SPEED SCANNING SYSTEMS FOR SUPER RESOLUTION IMAGING

(71) Applicant: Pacific Biosciences of California, Inc., Menlo Park, CA (US)

(72) Inventors: Windsor Owens, San Francisco, CA (US); Bryan P. Staker, San Ramon, CA (US); Robert Hartlage, Sunnyvale, CA (US); Edvinas Zizminskas, Dublin, CA (US); Paul Heilman, San Carlos, CA (US); Jim Jahncke, San Ramon, CA (US)

(73) Assignee: Pacific Biosciences of California, Inc., Menlo Park, CA (US)

( * ) Notice: Subject to any disclaimer, the term of this patent is extended or adjusted under 35 U.S.C. 154(b) by 298 days.

(21) Appl. No.: 17/688,466

(22) Filed: Mar. 7, 2022

(65) Prior Publication Data
US 2022/0187583 A1    Jun. 16, 2022

Related U.S. Application Data

(63) Continuation of application No. PCT/US2020/049446, filed on Sep. 4, 2020.
(Continued)

(51) Int. Cl.
*G02B 21/00* (2006.01)
*G02B 21/26* (2006.01)
(Continued)

(52) U.S. Cl.
CPC ....... *G02B 21/0048* (2013.01); *G02B 21/008* (2013.01); *G02B 21/26* (2013.01);
(Continued)

(58) Field of Classification Search
CPC .. G02B 21/0048; G02B 21/008; G02B 21/26; G02B 27/58; G02B 21/367; G02B 21/16;
(Continued)

(56) References Cited

U.S. PATENT DOCUMENTS

| | | | |
|---|---|---|---|
| 4,516,023 | A | 5/1985 | Morrill et al. |
| 6,537,801 | B1 | 3/2003 | Ida et al. |

(Continued)

FOREIGN PATENT DOCUMENTS

| | | |
|---|---|---|
| CN | 110031907 A | 7/2019 |
| JP | H09250912 A | 9/1997 |

(Continued)

OTHER PUBLICATIONS

European Application No. 18761316 Search Report dated Nov. 13, 2020.
(Continued)

*Primary Examiner* — Nimesh Patel
(74) *Attorney, Agent, or Firm* — WILSON SONSINI GOODRICH & ROSATI

(57) ABSTRACT

Disclosed herein is a high throughput optical scanning system to generate super resolution images and methods of use. The optical scanning device and methods of use provided herein can allow high throughput scanning of a continuously moving object with a high resolution despite fluctuations in stage velocity. This can aid in high throughput scanning of a substrate, such as a biological chip comprising fluorophores. Also provided herein are improved optical relay systems and scanning optics.

19 Claims, 38 Drawing Sheets

Related U.S. Application Data

(60) Provisional application No. 62/896,541, filed on Sep. 5, 2019.

(51) Int. Cl.
| | |
|---|---|
| *G02B 27/58* | (2006.01) |
| *G06T 3/4053* | (2024.01) |
| *G06T 7/70* | (2017.01) |
| *H04N 23/55* | (2023.01) |
| *H04N 23/56* | (2023.01) |

(52) U.S. Cl.
CPC ............ *G02B 27/58* (2013.01); *G06T 3/4053* (2013.01); *G06T 7/70* (2017.01); *H04N 23/55* (2023.01); *H04N 23/56* (2023.01); *G06T 2207/10056* (2013.01)

(58) Field of Classification Search
CPC .. G02B 26/105; G02B 26/101; G02B 27/644; G02B 17/0892; G02B 21/361; G02B 13/22; G02B 17/0812; G02B 21/0036; G02B 21/365; G02B 21/002; G02B 21/0044; G02B 26/12; G02B 26/121; G02B 21/06; G02B 27/286; G02B 26/10; G02B 2006/0098; G02B 2027/0138; G02B 26/125; G02B 6/34; G02B 6/06; G02B 6/02042; G02B 6/00; G06T 3/4053; G06T 7/0004; G06T 2207/10056; G06T 2207/30148; G06T 7/70; G06T 1/0007; G06T 2207/10064; G06T 2207/10152; G06T 2207/30004; G06T 7/001; G06T 7/11; G06T 2207/30141; G06T 2207/20036; G06T 2207/30152; G06T 7/0012; G06T 7/0008; G06T 2207/30168; G06T 2207/20081; G06T 15/00; G06T 15/506; G06T 2207/10004; G06T 2207/10021; G06T 7/337; G06T 7/80; H04N 23/55; H04N 23/56; H04N 23/50; H04N 23/695; G01J 3/0289; G01J 2003/2826; G01N 21/8851; G01N 2021/8861; G01N 21/956; G01N 2021/1765; G01N 2021/8887; G01N 21/6452; G01N 21/6456; G01N 21/8806; G01N 2201/104; G01N 21/9501; G01N 2021/6463; G01N 2201/023; G01N 2021/95638; G01N 35/00732; G01N 2021/6421; G01N 2021/6419; G01N 2021/6441; G01N 21/6458; G01N 21/6428; H01L 21/0274; H01L 21/68; H01L 21/67259; H01L 21/67288; H01L 21/027; H01L 22/12; H01L 22/24; H01L 21/0275; H01L 21/681; H01L 21/67242; H01L 21/02488; H01L 21/02532; H01L 21/02691; G03F 7/70358; G03F 7/70341; G03F 7/70866; G03F 7/70725; G03F 7/2041; G03F 7/70716; G03F 7/70275; G03F 9/7088; G03F 7/70191; G03F 7/70225; G03F 9/7026; G03F 7/70258; G03F 7/7015; G03F 7/70766; G03F 7/70425; G03F 7/70791; G03F 7/70141; G03F 7/70666; G03F 9/7073; G03F 9/7084; G03F 7/70208; G03F 7/70466; G03F 7/70608; G03F 7/7065; G03F 7/70775; G03F 7/7008; G01D 2205/90; G01D 5/34746; G01D 2205/95; G01D 5/38; G01D 5/26; G01D 5/266; G06V 20/698; G06V 20/80; G06V 10/147; G06V 10/40; G06V 20/693; G06V 10/764; G06V 10/82; G06V 40/193; G02F 1/0105; G02F 1/133374; G02F 1/133512; G02F 1/133514; G02F 1/133516; G02F 1/29; G02F 1/292
See application file for complete search history.

(56) References Cited

U.S. PATENT DOCUMENTS

| | | | |
|---|---|---|---|
| 8,089,436 B1 | 1/2012 | Werner | |
| 10,475,179 B1* | 11/2019 | Bishop | .................... G06T 7/13 |
| 2002/0001403 A1* | 1/2002 | Kikuchi | ............ G01N 21/9501 |
| | | | 382/145 |
| 2002/0004103 A1 | 1/2002 | Lynch | |
| 2002/0018192 A1* | 2/2002 | Nishi | .................. G03F 7/70775 |
| | | | 355/75 |
| 2002/0196450 A1 | 12/2002 | Olszak et al. | |
| 2006/0072191 A1* | 4/2006 | Akiyama | .......... G02B 21/0048 |
| | | | 359/368 |
| 2006/0139660 A1 | 6/2006 | Patrick | |
| 2007/0165134 A1 | 7/2007 | Hama et al. | |
| 2008/0029491 A1 | 2/2008 | Johnson et al. | |
| 2010/0201981 A1* | 8/2010 | Stanke | .................. G01J 3/0224 |
| | | | 356/328 |
| 2011/0249143 A1 | 10/2011 | Tatsumi | |
| 2014/0152793 A1* | 6/2014 | Staker | .................. H04N 25/441 |
| | | | 348/79 |
| 2014/0152888 A1 | 6/2014 | Staker et al. | |
| 2014/0204196 A1 | 7/2014 | Loney et al. | |
| 2014/0363095 A1 | 12/2014 | Sato | |
| 2015/0022881 A1 | 1/2015 | Loza et al. | |
| 2015/0308957 A1 | 10/2015 | Okura et al. | |
| 2015/0330974 A1 | 11/2015 | Staker et al. | |
| 2016/0066775 A1 | 3/2016 | Hunter et al. | |
| 2016/0103178 A1 | 4/2016 | Zeise | |
| 2016/0261798 A1 | 9/2016 | Ishikawa et al. | |
| 2017/0026581 A1 | 1/2017 | Ryu et al. | |
| 2017/0289412 A1* | 10/2017 | Staker | .................... G02B 21/16 |
| 2018/0252936 A1* | 9/2018 | Owens | ................. G02B 26/101 |
| 2018/0274028 A1 | 9/2018 | Staker et al. | |
| 2020/0393691 A1 | 12/2020 | Owens et al. | |
| 2022/0214557 A1 | 7/2022 | Owens et al. | |

FOREIGN PATENT DOCUMENTS

| | | |
|---|---|---|
| JP | 2000171719 A | 6/2000 |
| JP | 3859459 B2 | 12/2006 |
| JP | 2015521750 A | 7/2015 |
| WO | WO-2018161013 A1 | 9/2018 |
| WO | WO-2018170518 A1 | 9/2018 |
| WO | WO-2021046378 A1 | 3/2021 |

OTHER PUBLICATIONS

Japanese Office Action and Translation issued in Japanese Patent Application No. 2019-568593 on Feb. 2, 2022.
PCT/2018/020737 International Search Report and Written Opinion dated May 30, 2018.
U.S. Appl. No. 16/742,783 Final Office Action dated Jul. 13, 2021.
U.S. Appl. No. 16/742,783 Non-Final Office Action dated Oct. 23, 2020.
U.S. Appl. No. 18/207,962 Office Action dated Apr. 9, 2024.
CA Serial No. 3055249 Office Action dated Aug. 19, 2024.
JP Serial No. 2022-514664 Office Action dated Jun. 20, 2024.
PCT/US2018/0204737 International Preliminary Report on Patentability dated Sep. 3, 2018.
PCT/US2020/049446 International Preliminary Report on Patentability dated Mar. 8, 2022.
U.S. Appl. No. 18/207,962 Corrected Notice of Allowability dated Dec. 12, 2024.
U.S. Appl. No. 18/207,962 Notice of Allowance dated Nov. 20, 2024.

(56) References Cited

OTHER PUBLICATIONS

U.S. Appl. No. 18/207,962 Office Action dated Jul. 24, 2024.
International Search Report and Written Opinion issued in PCT/US2020/049446 on Dec. 17, 2020.

* cited by examiner

| Parameter | Unit | Case 1 | Case 2 | Case 3 | Case 4 | Case 5 | Case 6 |
|---|---|---|---|---|---|---|---|
| Inputs | | | | | | | |
| Pitch | nm | 220 | 236 | 261 | 200 | 250 | 333 |
| # Molecules / um^2 | NA | 20.7 | 17.9 | 14.7 | 25.0 | 16.0 | 9.0 |
| # Cycles | NA | 100 | 100 | 100 | 100 | 100 | 100 |
| Lane width | mm | 63 | 63 | 63 | 63 | 63 | 63 |
| Lane length | mm | 63 | 63 | 63 | 63 | 63 | 63 |
| Frame rate | Hz | 85 | 85 | 85 | 85 | 85 | 85 |
| Outputs | | | | | | | |
| Throughput (30X genome) | per run | 90 | 78 | 64 | 109 | 70 | 39 |
| Throughput (30X genome) | per day | 93 | 81 | 66 | 113 | 72 | 41 |
| Throughput (Gb) | per run | 8,127 | 7,044 | 5,785 | 9,838 | 6,297 | 3,542 |
| Throughput (Gb) | per day | 8,398 | 7,280 | 5,978 | 10,167 | 6,507 | 3,660 |
| # Spots / chip | 10^9 | 81.3 | 70.4 | 57.9 | 98.4 | 63.0 | 35.4 |
| Imaging time per cycle | min | 13.9 | 13.9 | 13.9 | 13.9 | 13.9 | 13.9 |

FIGURE 11

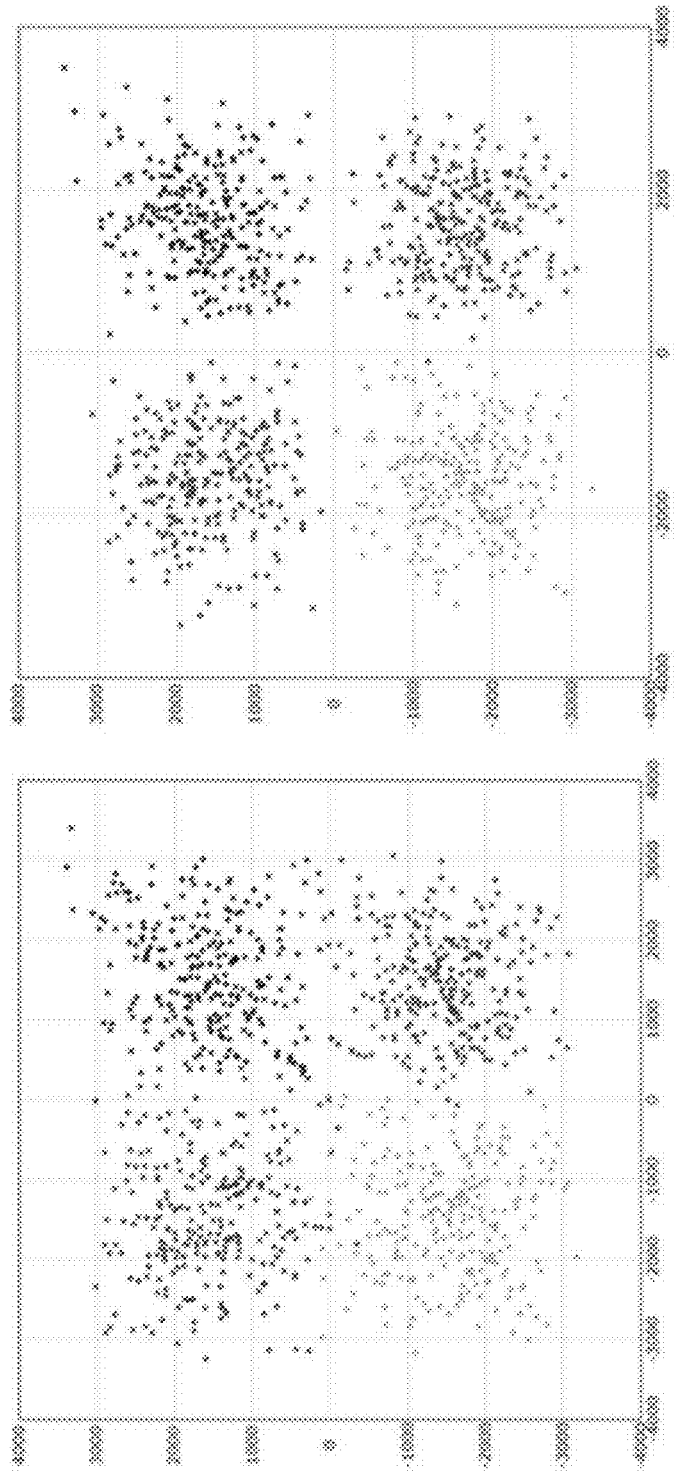

FIGURE 25B

| Field # | HSS Mapped Density/SS Mapped Density per field |
|---|---|
| # | % |
| 1 | 96% |
| 2 | 94% |
| 3 | 97% |
| 4 | 93% |
| 5 | 93% |
| 6 | 91% |
| 7 | 94% |
| 8 | 96% |
| 9 | 96% |
| 10 | 115% |
| 11 | 103% |
| 12 | 96% |
| 13 | 102% |
| 14 | 99% |
| 15 | 97% |
| 16 | 97% |

FIGURE 30

HIGH SPEED SCANNING SYSTEMS FOR SUPER RESOLUTION IMAGING

CROSS-REFERENCE

This application is a continuation of International Application No. PCT/US2020/049446, filed Sep. 4, 2020, which claims benefit of U.S. Provisional Application No. 62/896,541 filed on Sep. 5, 2019, which is herein incorporated by reference in its entirety.

BACKGROUND

In today's society the cost of goods can make or break a business. Often, this cost of goods & services (COGS) can be reduced by increasing throughput for a particular Process. So, being able to Process goods as quickly and efficiently as possible is often a "must do" for businesses. Automated inspection of goods is routinely done with Vision or Imaging Systems. These Systems are used to take a still or video image of an object and make a determination of the state of that object based on analysis of that video or still. So, quantifiable data needs to be extracted from the video or still in order to determine what happens to that object next. Extracting quantifiable data is always dependent on image quality (how well-defined are the image features (blur), is the contrast adequate, etc.). Combining this need with the need for high-throughput imaging (imaging a sample while the sample is continuously moving) in a simple, cost-effective manner is a challenge. One of the critical aspects of on-the-fly or high-throughput imaging is maintaining a near constant velocity of the sample stage. If the sample stage velocity is changing, the images will be blurry and insufficient quantifiable data can be extracted. For some high-throughput processes, super-resolution (sub-diffraction-limited) imaging while scanning and <0.5-pixel blur are required. This quantified improvement can be achieved with two mirrors (velocity and acceleration tracking mirrors) or with a single mirror utilizing a feed-forward approach (using the average velocity of current field to calculate and provide a velocity correction term to the next field). To date, there has been no known application of a single or dual mirror used for image stabilization in a super-resolution system using only real-time position data where the accuracy of the image stabilization is <40 nm and the speed is greater than 20 FPS (frames per second).

Typical single-molecule, single-fluor sensitivity biological fluorescent optical scanning systems require low noise cameras with long exposure times. These systems often require a high precision and stable imaging platform situated on granite or equivalent. In addition, these systems employ "step and repeat" staging which necessitate high acceleration and deceleration as well as high mass in order to achieve high throughput, stable imaging of multiple fields. To scan a large area chip (2000 mm2) in a short amount of time (~5 min) at high magnification requires frame imaging times shorter than step and repeat systems allow.

An "image on the fly" approach is needed to prevent a loss in throughput due to stage accelerations and settling time inherent to the step and repeat systems. Traditional image on the fly applications require sample stages that can provide near-constant (~+/−0.05%) velocity, and scanning optics that image the sample as it moves. If the stage velocity is not near-constant throughout its travel, then the scanning optics will not image the exact same region of the sample as the stage moves. This can result in a blurry image (e.g., with a pixel smear of ~+/−3 pixels). 4 This problem is typically solved by utilizing expensive stages that provide near constant velocity by using heavy stages and powerful stage drives. Unfortunately, this adds to the cost of the product and makes it impractical to use as a benchtop system.

Typical low-cost, compact and/or lightweight stages are built with components that have various surface irregularities such as pits, burrs, machining grooves, divots and misshapen cavities. These irregularities usually result in velocity that is not constant. For instance, a burr or a divot in the ways of a stage will cause the stage to momentarily slow down and then possibly speed up before returning to the velocity it had before it encountered the irregularity. The velocity fluctuations of the stage make the use of these low-cost, smaller components incompatible with current image on the fly high throughput scanning approaches due to the generation of unacceptable levels of image blur.

What is needed therefore, are improved scanning optics that increase the velocity fluctuation tolerance, allowing an image with increased stability (e.g., reduced pixel smear) to be obtained using image on the fly scanning with single fluor sensitivity in smaller, lightweight, and low-cost optical scanning systems.

SUMMARY

The instant invention is based, at least in part, on the discovery of new methods and devices to reduce pixel smear in the imaging of an object on a moving stage.

An aspect of the present disclosure described herein provides an imaging system comprising: a light source; one or more cameras operably coupled to an objective lens to capture a plurality of fields; a stage configured to support a substrate, wherein said stage is configured to move along a defined path adjacent to said light source; an encoder mechanically operably coupled to said stage; a position processing module configured to receive positional information from said encoder and perform a plurality of calculations of a plurality of positions for said stage; a scanning mirror coupled to an axis adjacent to said defined path operably coupled to said position processing module to receive said plurality of calculations of said plurality of positions for said stage; and a control module configured to operate the components of the system synchronously. In some embodiments, the system further comprises an image processing module, wherein said image processing module is configured to (i) use an imaging algorithm to process a plurality of images to identify a position of an analyte of a plurality of analytes displaced on said substrate or a relative position of an analyte displaced on said substrate with respect to another analyte displaced on said substrate; and (ii) upon identifying said analyte at said position or said relative position, analyze said analyte, wherein said plurality of analytes are disposed on said substrate at a density such that a minimum effective pitch between an analyte of said plurality of analytes and another analyte of said plurality of analytes is less than $\lambda/(2*NA)$, wherein $\lambda$ is a wavelength of light used in the optical path and 'NA' is a numerical aperture of said one or more cameras. In some embodiments, said light source comprises a laser. In some embodiments, said light source comprises a plurality of lasers. In some embodiments, said imaging processing module is configured to generate a plurality of super resolution images. In some embodiments, a plurality of movements of said scanning mirror is generated from said plurality of calculations of said position processing module. In some embodiments, said plurality of calculations is a function of a velocity measurement or a position measurement of said stage. In some embodiments, said position processing module is configured to output said plurality of calculations in a waveform. In some embodiments, said substrate comprises a plurality of fields. In some embodiments, said encoder is configured to: generate one or more correction values for said position of said analyte of said plurality of analytes displaced on said substrate or said relative position of said analyte displaced on said substrate with respect to another analyte displaced on said substrate; and apply said one or more correction values to said waveform. In some embodiments, said scanning mirror is configured to move to an original position upon completing a scan of a field of said plurality of fields and begin to scan a subsequent field of said plurality of fields. In some embodiments, said light source comprises a wavelength of about 400 to 800 nanometers. In some embodiments, said encoder is configured to perform a plurality of encoder counts based on said plurality of movements of said stage. In some embodiments, said encoder is configured to generate a signal period from said plurality of encoder counts. In some embodiments, said encoder counts are positioned at a distance of about 0.05 micrometers to about 30 micrometers. In some embodiments, said encoder generates a signal period from said plurality of encoder counts at 512 nanometers. In some embodiments, said substrate comprises a plurality of defined lanes. In some embodiments, a lane of said plurality of defined lanes comprises a plurality of columns. In some embodiments, said plurality of super resolution images comprises a blur of less than about 10 to about 40 nanometers. In some embodiments, said blur is generated at a frame rate of about 20 to about 150 frames per second. In some embodiments, said plurality of analytes are disposed on said substrate with a center-to-center spacing below a diffraction limit or $\lambda/(2*NA)$ of said imaging system. In some embodiments, said plurality of calculations comprises instantaneous calculations.

Another aspect as disclosed herein provides a method of imaging a plurality of fields on a moving substrate utilizing the system of any one of the preceding embodiments.

Another aspect as disclosed herein provides a method of imaging a moving substrate, wherein said moving substrate comprises a plurality of fields, comprising: disposing said substrate on a stage, wherein said stage is configured to move along a defined path adjacent to a light source; configuring a position processing module to receive positional information from an encoder mechanically operably coupled to said stage, and wherein said position processing module is further configured to perform a plurality of calculations of a plurality of positions for said stage; configuring a scanning mirror coupled to an axis adjacent to said defined path operably coupled to said position processing module to receive said plurality of calculations of said position for said stage; and imaging at least a field of said plurality of fields with one or more cameras. In some embodiments, the parts of the method are performed synchronously. In some embodiments, the method further comprises: using an imaging algorithm to process a plurality of images to identify a position of an analyte of a plurality of analytes displaced on said substrate or a relative position of an analyte displaced on said substrate with respect to another analyte displaced on said substrate. In some embodiments, said plurality of analytes are disposed on said substrate at a density such that a minimum effective pitch between an analyte of said plurality of analytes and another analyte of said plurality of analytes is less than $\lambda/(2*NA)$, wherein $\lambda$ is a wavelength of light used in the optical path and 'NA' is a numerical aperture of said optical imaging module. In some embodiments, a plurality of movements of said scanning mirror is generated from said plurality of calculations of said position processing module. In some embodiments, said plurality of calculations is a function of a velocity measurement or a position measurement of said stage. In some embodiments, the method further comprises further configuring said position processing module to output said plurality of calculations in a waveform. In some embodiments, the method further comprises configuring said position processing module to: generate one or more correction values for said position of said analyte of said plurality of analytes displaced on said substrate or said relative position of said analyte displaced on said substrate with respect to another analyte displaced on said substrate; and apply said one or more correction values to said waveform. In some embodiments, the method further comprises further configuring said scanning mirror is configured to move to an original position upon completing a scan of a field of said plurality of fields and begin to scan a subsequent field of said plurality of fields. In some embodiments, the method further comprises configuring said encoder to generate a signal period from a plurality of encoder counts. In some embodiments, said encoder counts are positioned at a distance of about 0.05 micrometers to about 30 micrometers. In some embodiments, said encoder generates a signal period from said plurality of encoder counts at 512 nanometers. In some embodiments, an image of said plurality of images comprises a blur of less than about 10 to about 40 nanometers. In some embodiments, said blur is generated at a frame rate of about 20 to about 150 frames per second.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead placed upon illustrating the principles of various embodiments of the invention.

FIG. 7A is related to a dual mirror embodiment, while FIG. 7B is related to a single mirror embodiment.

FIG. 11 shows sequencer throughput versus array pitch and outlines a system design which meets the criteria needed for a $10 genome.

FIG. 22A shows a cross-talk plot of fluorophore intensity between four fluorophores from optical signals detected from the raw image.

FIG. 22B shows a cross-talk plot of fluorophore intensity between four fluorophores from a 4× oversampled image.

Figure 25B:
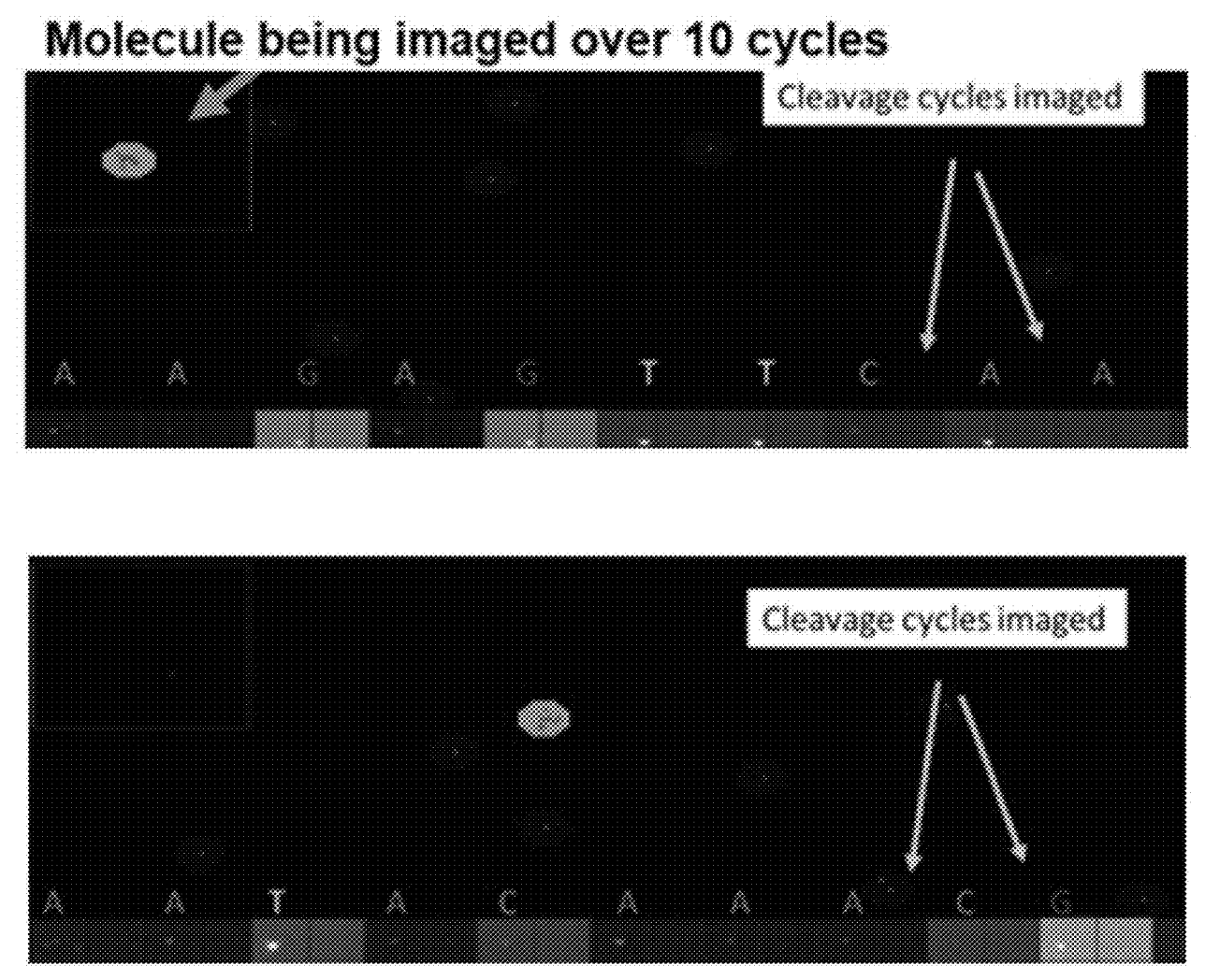

FIG. 25B depicts images from alternating base incorporation and cleavage cycles.

FIG. 30 shows example data obtained from the experiments of Example 1 demonstrating that the high speed scanning image yields mapped densities that are comparable to step and shoot mapped densities. Data shows that high speed scanning fields comprise least 95% of the mapped step and shoot fields.

DETAILED DESCRIPTION

Figure 1:
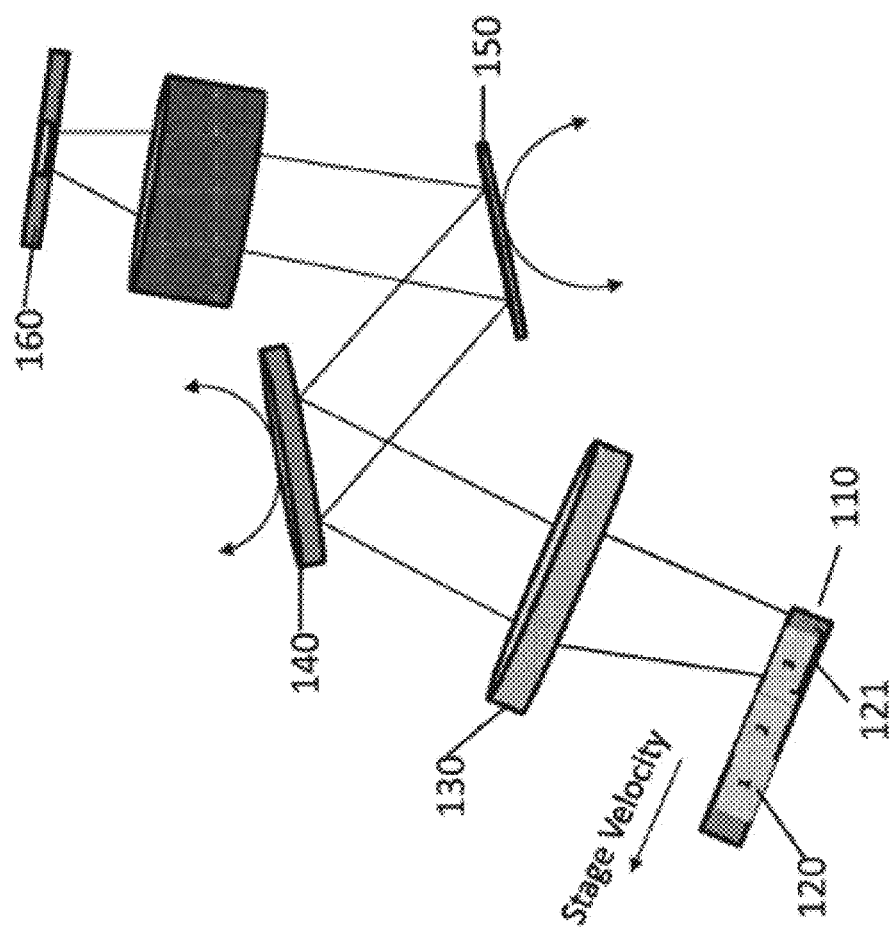
FIG. 1 is a diagram of components of an optical scanning device along an optical path from a substrate to a detector comprising an acceleration tracking mirror and a velocity tracking mirror (i.e., a dual mirror embodiment) according to an embodiment of the invention.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The details of various embodiments of the invention are set forth in the description below. Other features, objects, and advantages of the invention will be apparent from the description and the drawings, and from the claims.

As used herein, the term "objective lens" refers to an element or group of elements, in an optical scanning system, that comprises one or more lenses and is configured and operative to magnify an electromagnetic (e.g., such as optical) signal. In some embodiments, an objective lens has a large numerical aperture (NA), such as an NA in a range between 0.6 and 1.5 and performs imaging via air immersion or liquid immersion (e.g., such as water, oil, or other immersion fluids). In various embodiments, an objective lens may have a focal length in the range from 2 mm to 25 mm.

As used herein, the term "substrate" refers to an object having a multitude of distinct features that are targets for imaging. These features may or may not be arranged in a spatially uniform pattern. For example, in some embodiments a substrate comprises a non-planar structure with a surface, such as a bead or a well, to which target biomolecules have been attached as the target features. In another example, in some embodiments a substrate comprises an array chip. An array chip (i.e., an array, microarray, or chip) refers to a solid phase support having a surface, preferably but not exclusively a planar or substantially planar surface, that carries attachment sites to which target biomolecules (e.g., such as proteins or nucleic acids) have been attached as the target features.

As used herein, the term "lane" refers to a portion of a substrate that comprises detectable events including, but not limited to, analyte probe binding.

As used herein, the term "field" refers to an area of a substrate capable of being captured within a single image by a camera. A field on the substrate is related to the field of view of the camera. An entire substrate may be scanned by taking images of a plurality of fields on a substrate.

As used herein, the term "optical path" or "light path" refers to the path of light or other electromagnetic radiation from a source to the camera sensor. Manipulation of the optical path by mirrors along the optical path enable the capture of a still image from a continuously moving substrate with random or systematic velocity fluctuations.

As used herein, the term "scanning" refers to operations to observe and record the status of a substrate.

As used herein, "super-resolution" refers to features that are spaced less than the diffraction limit of the imaging system.

As used herein, the term "velocity tracking mirror" refers to a mirror configured to track the movement of a substrate at a velocity. This velocity may be fixed or variable. The velocity may be predetermined, or may include systematic or random error in the velocity.

As used herein, the term "velocity tracking error" refers to an error in the tracking of a substrate or stage velocity by the velocity tracking mirror. In some embodiments, this is the result of a deviation in the velocity of the substrate from the velocity being tracked by the velocity tracking mirror.

As used herein, the term "acceleration tracking mirror" refers to a mirror that is operably connected to an optical scanning system to rotate in response to a nonlinearity, such as a systematic or random error in stage velocity, or any other deviations from an expected or constant stage velocity. In some embodiments, the acceleration tracking mirror is paired with a velocity tracking mirror to provide a still image of a moving substrate with reduced pixel smear.

As used herein, the term "electrical motor" refers to a device that converts an electrical signal to a physical movement, such as a motor that rotates in response to electrical energy. In some embodiments, the electrical motor provides a rotation mechanism for rotating a velocity tracking mirror or an acceleration tracking mirror. The electrical motor can be operably linked to a position processing module that sends an electrical signal or driving signal to effect controlled movement of the electrical motor. An electrical motor may be a galvanometer or a piezoelectric actuator. As used herein, a "galvanometer" refers to a coil in a magnetic field that moves in response to an electrical signal. This can act as an electrical motor to actuate rotary motion of a tracking mirror. As used herein, the term "piezoelectric actuator" refers to a type of electric motor based upon the change in shape of a piezoelectric material when an electric field is applied. Although electrical motors are referred to in this specification as a preferred embodiment, other devices to provide actuation of components of the parts of the invention described herein, such as those based on hydraulics, pneumatics, or magnetic principles may also be used.

As used herein, the term "position processing module" refers to one or more components in the device that provide control over components of the optical scanning system. In particular, the position processing module includes devices that control movement of the electrical motors operably connected to one or more tracking mirrors. Thus, the position processing module generates and transmits a driving signal to these electrical motors. The driving signal may be generated from a pre-programmed or observed stage or substrate motion. The driving signal may be generated from information collected by a position or velocity sensor, such as an encoder, and used to generate a velocity measurement that is then translated into a responsive driving signal to control movement of one or more tracking mirrors.

As used herein, the term "electrical signal" or "driving signal" refers to a controlled amount of energy sent to an electrical motor that the motor transforms into physical movement. For example, a galvanometer can effect rotation of a mirror to track a moveable stage and to return to its original position after imaging is complete by sending a drive signal that resembles a sawtooth wave.

As used herein, the term "duty cycle" refers to the percent of time a tracking mirror is tracking the stage and the camera is imaging the field (as opposed to flyback time, where the tracking mirror is returning to its initial position).

As used herein, the term "imaging frequency" or "image capture frequency" refers to the frequency of image capture of fields on a substrate.

As used herein, the term "pixel smear" refers to a measure of the spread of a pixel along an axis due to movement of an imaged object during image capture. A high amount of pixel smear will generate an image that is less sharp and has a higher amount of blur. In some embodiments, pixel smear is generated due to velocity fluctuations that are not compensated for in the optical path or in the movement of one or more tracking mirrors. Provided herein, in some embodiments, are devices and methods for capturing an image of a continuously moving substrate on a moveable stage with velocity fluctuations wherein the amount of pixel smear along the primary axis of movement of the substrate is mitigated by the rotation of one or more tracking mirrors along the optical path.

As used herein, the term "logic" refers to a set of instructions which, when executed by one or more processors (e.g., CPUs) of one or more computing devices, are operative to perform one or more functionalities and/or to return data in the form of one or more results or of input data that is used by other logic elements and/or by elements that control the operation of mechanical devices (e.g., such as servos and the like). In various embodiments and implementations, any given logic may be implemented as one or more software components that are executable by one or more processors (e.g., CPUs), as one or more hardware components such as Application-Specific Integrated Circuits (ASICs) and/or Field-Programmable Gate Arrays (FPGAs), or as any combination of one or more software components and one or more hardware components. The software component(s) of any particular logic may be implemented, without limitation, as a standalone software application, as a client in a client-server system, as a server in a client-server system, as one or more software modules, as one or more libraries of functions, and as one or more static and/or dynamically-linked libraries. During execution, the instructions of any particular logic may be embodied as one or more computer processes, threads, fibers, and any other suitable runtime entities that can be instantiated in the hardware of one or more computing devices and can be allocated computing resources that may include, without limitation, memory, CPU time, storage space, and network bandwidth.

As used herein, the term center-to-center distance refers to a distance between two adjacent molecules as measured by the difference between the average position of each molecule on a substrate. The term average minimum center-to-center distance refers specifically to the average distance between the center of each analyte disposed on the substrate and the center of its nearest neighboring analyte, although the term center-to-center distance refers also to the minimum center-to-center distance in the context of limitations corresponding to the density of analytes on the substrate. As used herein, the term "pitch" or "average effective pitch" is generally used to refer to average minimum center-to-center distance. In the context of regular arrays of analytes, pitch may also be used to determine a center-to-center distance between adjacent molecules along a defined axis.

As used herein, the term "overlaying" (e.g., overlaying images) refers to overlaying images from different cycles to generate a distribution of detected optical signals (e.g., position and intensity, or position of peak) from each analyte over a plurality of cycles. This distribution of detected optical signals can be generated by overlaying images, overlaying artificial processed images, or overlaying datasets comprising positional information. Thus, as used herein, the term "overlaying images" encompasses any of these mechanisms to generate a distribution of position information for optical signals from a single probe bound to a single analyte for each of a plurality of cycles.

A "cycle" is defined by completion of one or more passes and stripping of the detectable label from the substrate. Subsequent cycles of one or more passes per cycle can be performed. For the methods and systems described herein, multiple cycles are performed on a single substrate or sample. For DNA sequencing, multiple cycles requires the use of a reversible terminator and a removable detectable label from an incorporated nucleotide. For proteins, multiple cycles requires that the probe removal (stripping) conditions either maintain proteins folded in their proper configuration, or that the probes used are chosen to bind to peptide sequences so that the binding efficiency is independent of the protein fold configuration.

A "pass" in a detection assay refers to a process where a plurality of probes comprising a detectable label are introduced to the bound analytes, selective binding occurs between the probes and distinct target analytes, and a plurality of signals are detected from the detectable labels. A pass includes introduction of a set of antibodies that bind specifically to a target analyte. A pass can also include introduction of a set of labelled nucleotides for incorporation into the growing strand during sequencing by synthesis. There can be multiple passes of different sets of probes before the substrate is stripped of all detectable labels, or before the detectable label or reversible terminator is removed from an incorporated nucleotide during sequencing. In general, if four nucleotides are used during a pass, a cycle will only consist of a single pass for standard four nucleotide sequencing by synthesis.

As used herein, an image refers to an image of a field taken during a cycle or a pass within a cycle. In some embodiments, a single image is limited to detection of a single color of a detectable label.

As used herein, the term "field" refers to a single region of a substrate that is imaged. During a typical assay a single field is imaged at least once per cycle. For example, for a 20 cycle assay, with 4 colors, there can be 20*4=80 images, all of the same field.

A "target analyte" or "analyte" refers to a single molecule, compound, complex, substance or component that is to be identified, quantified, and otherwise characterized. A target analyte can comprise by way of example, but not limitation to, a single molecule (of any molecular size), a single biomolecule, a polypeptide, a protein (folded or unfolded), a polynucleotide molecule (RNA, cDNA, or DNA), a fragment thereof, a modified molecule thereof, such as a modified nucleic acid, or a combination thereof. In an embodiment, a target polynucleotide comprises a hybridized primer to facilitate sequencing by synthesis. The target analytes are recognized by probes, which can be used to sequence, identify, and quantify the target analytes using optical detection methods described herein.

A "probe" as used herein refers to a molecule that is capable of binding to other molecules (e.g., a complementary labelled nucleotide during sequencing by synthesis, polynucleotides, polypeptides or full-length proteins, etc.), cellular components or structures (lipids, cell walls, etc.), or cells for detecting or assessing the properties of the molecules, cellular components or structures, or cells. The probe comprises a structure or component that binds to the target analyte. In some embodiments, multiple probes may recognize different parts of the same target analyte. Examples of probes include, but are not limited to, a labelled reversible terminator nucleotide, an aptamer, an antibody, a polypeptide, an oligonucleotide (DNA, RNA), or any combination thereof. Antibodies, aptamers, oligonucleotide sequences and combinations thereof as probes are also described in detail below.

The probe can comprise a detectable label that is used to detect the binding of the probe to a target analyte. The probe can be directly or indirectly bound to, hybridized to, conjugated to, or covalently linked to the target analyte.

As used herein, the term detectable label refers to a molecule bound to a probe that is capable of generating a detectable optical signal when the probe is bound to a target analyte and imaged using an optical imaging system. The detectable label can be directly or indirectly bound to, hybridized to, conjugated to, or covalently linked to the probe. In some embodiments, the detectable label is a fluorescent molecule or a chemiluminescent molecule. The probe can be detected optically via the detectable label.

As used herein, the term optical distribution model refers to a statistical distribution of probabilities for light detection from a point source. These include, for example, a Gaussian distribution. The Gaussian distribution can be modified to include anticipated aberrations in detection to generate a point spread function as an optical distribution model.

Optical Scanning System and Methods of Use

Provided herein is a system for high frame rate image capture of portions or fields of a substrate with a high sensitivity while the substrate is moving on a moveable stage. The optical scanning system is capable of high speed, single molecule, single-fluor imaging, which to date has only been provided by heavy and expensive systems requiring precise control of stage movement, or through slower step and repeat optical scanning systems. The optical scanning system provided herein can be used as an image a (continuously moving stage by using single mirror or double mirror scanning optics which compensate for stage velocities that vary by 1% to 10% and image blur of at least several pixels. This compensation can result in an image equivalent of a tracked staged velocity with fluctuations less than 0.1% or a pixel smear of an image of no more than +/−1 pixel. Therefore, the scanning optics disclosed herein provide a system to compensate for velocity error (i.e., velocity fluctuations), such as localized accelerations and decelerations of a moveable stage or substrate, to provide a stabilized image field to a camera during imaging of a continuously moving moveable stage to reduce pixel smear.

The optical scanning system herein provides a super-resolution imaging system comprising a single scanning mirror for velocity tracking for high speed scanning. The super-resolution imaging system can comprise a sample stage with an encoder, an FPGA, laser illumination sources, a single mirror or high speed scanning optic, and a camera or image detection means. In certain cases the system can comprise two scanning mirrors. The, high-speed scanning system utilizes real-time sample stage position information to generate and update a waveform that is used to rotate the single mirror in a synchronized fashion with the sample stage motion wherein the synchronized rotation of the mirror can continue through a range of rotation until the end of said range of rotation. In certain cases comprising a two mirror system, high-speed scanning system utilizes real-time sample stage position information to generate and update a waveform that is used to rotate the two mirrors in a synchronized fashion with the sample stage motion wherein the synchronized rotation of one or both mirrors can continue through a range of rotation until the end of said range of rotation. In certain instances, an encoder can comprise the position information. Images acquired during this range of rotation comprise forward scan images. In certain cases, after the completion of the forward scan, the rotation of the mirror comprises a back scan, rotation back to the beginning of the mirror's range of rotation, and forward scan of the next field while the stage is in continuous motion.

In certain cases, super-resolution images comprise a blur of less than about 10 nm to about 40 nm. In certain cases, super-resolution images comprise a blur of less than about 40 nm to about 35 nm, about 40 nm to about 30 nm, about 40 nm to about 25 nm, about 40 nm to about 20 nm, about 40 nm to about 15 nm, about 40 nm to about 10 nm, about 35 nm to about 30 nm, about 35 nm to about 25 nm, about 35 nm to about 20 nm, about 35 nm to about 15 nm, about 35 nm to about 10 nm, about 30 nm to about 25 nm, about 30 nm to about 20 nm, about 30 nm to about 15 nm, about 30 nm to about 10 nm, about 25 nm to about 20 nm, about 25 nm to about 15 nm, about 25 nm to about 10 nm, about 20 nm to about 15 nm, about 20 nm to about 10 nm, or about 15 nm to about 10 nm. In certain cases, super-resolution images comprise a blur of less than about 40 nm, about 35 nm, about 30 nm, about 25 nm, about 20 nm, about 15 nm, or about 10 nm. In certain cases, super-resolution images comprise a blur of less than at least about 40 nm, about 35 nm, about 30 nm, about 25 nm, about 20 nm, or about 15 nm. In certain cases, super-resolution images comprise a blur of less than at most about 35 nm, about 30 nm, about 25 nm, about 20 nm, about 15 nm, or about 10 nm.

In certain cases, the reduced blur is achieved at a frame rate of about 20 frames per second (FPS) to about 150 FPS. In certain cases, the reduced blur is achieved at a frame rate of about 20 FPS to about 30 FPS, about 20 FPS to about 40 FPS, about 20 FPS to about 50 FPS, about 20 FPS to about 75 FPS, about 20 FPS to about 100 FPS, about 20 FPS to about 125 FPS, about 20 FPS to about 150 FPS, about 30 FPS to about 40 FPS, about 30 FPS to about 50 FPS, about 30 FPS to about 75 FPS, about 30 FPS to about 100 FPS, about 30 FPS to about 125 FPS, about 30 FPS to about 150 FPS, about 40 FPS to about 50 FPS, about 40 FPS to about 75 FPS, about 40 FPS to about 100 FPS, about 40 FPS to about 125 FPS, about 40 FPS to about 150 FPS, about 50 FPS to about 75 FPS, about 50 FPS to about 100 FPS, about 50 FPS to about 125 FPS, about 50 FPS to about 150 FPS, about 75 FPS to about 100 FPS, about 75 FPS to about 125 FPS, about 75 FPS to about 150 FPS, about 100 FPS to about 125 FPS, about 100 FPS to about 150 FPS, or about 125 FPS to about 150 FPS. In certain cases, the reduced blur is achieved at a frame rate of about 20 FPS, about 30 FPS, about 40 FPS, about 50 FPS, about 75 FPS, about 100 FPS, about 125 FPS, or about 150 FPS. In certain cases, the reduced blur is achieved at a frame rate of at least about 20 FPS, about 30 FPS, about 40 FPS, about 50 FPS, about 75 FPS, about 100 FPS, or about 125 FPS. In certain cases, the reduced blur is achieved at a frame rate of at most about 30

FPS, about 40 FPS, about 50 FPS, about 75 FPS, about 100 FPS, about 125 FPS, or about 150 FPS.

An encoder can be a sensor, transducer or readhead paired with a scale that encodes position. In certain cases, the sensor reads the scale (e.g., encoder counts) in order to convert the encoded position into an analog or digital signal, which can then be decoded into position by a digital readout (DRO) or motion controller. Thus, in certain cases, the position sensor (including position, velocity, and/or acceleration sensors) is a linear encoder that interfaces with encoder counts (or another scale) on the substrate or moveable stage. In certain cases, the encoder counts on the substrate are positioned at a distance of about 0.05 µm to about 30 µm. In certain cases, the encoder counts on the substrate are positioned at a distance of about 0.05 µm to about 0.1 µm, about 0.05 µm to about 1 µm, about 0.05 µm to about 2 µm, about 0.05 µm to about 3 µm, about 0.05 µm to about 5 µm, about 0.05 µm to about 7 µm, about 0.05 µm to about 10 µm, about 0.05 µm to about 15 µm, about 0.05 µm to about 20 µm, about 0.05 µm to about 25 µm, about 0.05 µm to about 30 µm, about 0.1 µm to about 1 µm, about 0.1 µm to about 2 µm, about 0.1 µm to about 3 µm, about 0.1 µm to about 5 µm, about 0.1 µm to about 7 µm, about 0.1 µm to about 10 µm, about 0.1 µm to about 15 µm, about 0.1 µm to about 20 µm, about 0.1 µm to about 25 µm, about 0.1 µm to about 30 µm, about 1 µm to about 2 µm, about 1 µm to about 3 µm, about 1 µm to about 5 µm, about 1 µm to about 7 µm, about 1 µm to about 10 µm, about 1 µm to about 15 µm, about 1 µm to about 20 µm, about 1 µm to about 25 µm, about 1 µm to about 30 µm, about 2 µm to about 3 µm, about 2 µm to about 5 µm, about 2 µm to about 7 µm, about 2 µm to about 10 µm, about 2 µm to about 15 µm, about 2 µm to about 20 µm, about 2 µm to about 25 µm, about 2 µm to about 30 µm, about 3 µm to about 5 µm, about 3 µm to about 7 µm, about 3 µm to about 10 µm, about 3 µm to about 15 µm, about 3 µm to about 20 µm, about 3 µm to about 25 µm, about 3 µm to about 30 µm, about 5 µm to about 7 µm, about 5 µm to about 10 µm, about 5 µm to about 15 µm, about 5 µm to about 20 µm, about 5 µm to about 25 µm, about 5 µm to about 30 µm, about 7 µm to about 10 µm, about 7 µm to about 15 µm, about 7 µm to about 20 µm, about 7 µm to about 25 µm, about 7 µm to about 30 µm, about 10 µm to about 15 µm, about 10 µm to about 20 µm, about 10 µm to about 25 µm, about 10 µm to about 30 µm, about 15 µm to about 20 µm, about 15 µm to about 25 µm, about 15 µm to about 30 µm, about 20 µm to about 25 µm, about 20 µm to about 30 µm, or about 25 µm to about 30 µm. In certain cases, the encoder counts on the substrate are positioned at a distance of about 0.05 µm, about 0.1 µm, about 1 µm, about 2 µm, about 3 µm, about 5 µm, about 7 µm, about 10 µm, about 15 µm, about 20 µm, about 25 µm, or about 30 µm. In certain cases, the encoder counts on the substrate are positioned at a distance of at least about 0.05 µm, about 0.1 µm, about 1 µm, about 2 µm, about 3 µm, about 5 µm, about 7 µm, about 10 µm, about 15 µm, about 20 µm, or about 25 µm. In certain cases, the encoder counts on the substrate are positioned at a distance of at most about 0.1 µm, about 1 µm, about 2 µm, about 3 µm, about 5 µm, about 7 µm, about 10 µm, about 15 µm, about 20 µm, about 25 µm, or about 30 µm. In certain cases, the resolution of position detectable by the encoder is 1 nm or less. This can be done for example, using interpolation between lines on a substrate or between encoder counts. The spacing between encoder counts can correlate with stage scan speed and frequency of position measurement.

The scale used by an encoder, such as a linear encoder, can be optical, magnetic, capacitive, inductive, based on eddy current. In certain cases, position detection can be done without a scale on the substrate or moveable stage, for example, by using an optical image sensor based on an image correlation method.

In certain cases, the super-resolution imaging system can be used to acquire data for genome sequencing. In some cases, provided herein are systems and methods to facilitate imaging of signals from analytes immobilized on a surface with a center-to-center spacing below the diffraction limit. These systems and methods use advanced imaging systems to generate high resolution images, and cycled detection to facilitate positional determination of molecules on the substrate with high accuracy and deconvolution of images to obtain signal identity for each molecule on a densely packed surface with high accuracy. These methods and systems allow single molecule sequencing by synthesis on a densely packed substrate to provide highly efficient and very high throughput polynucleotide sequence determination with high accuracy.

Figure 4:
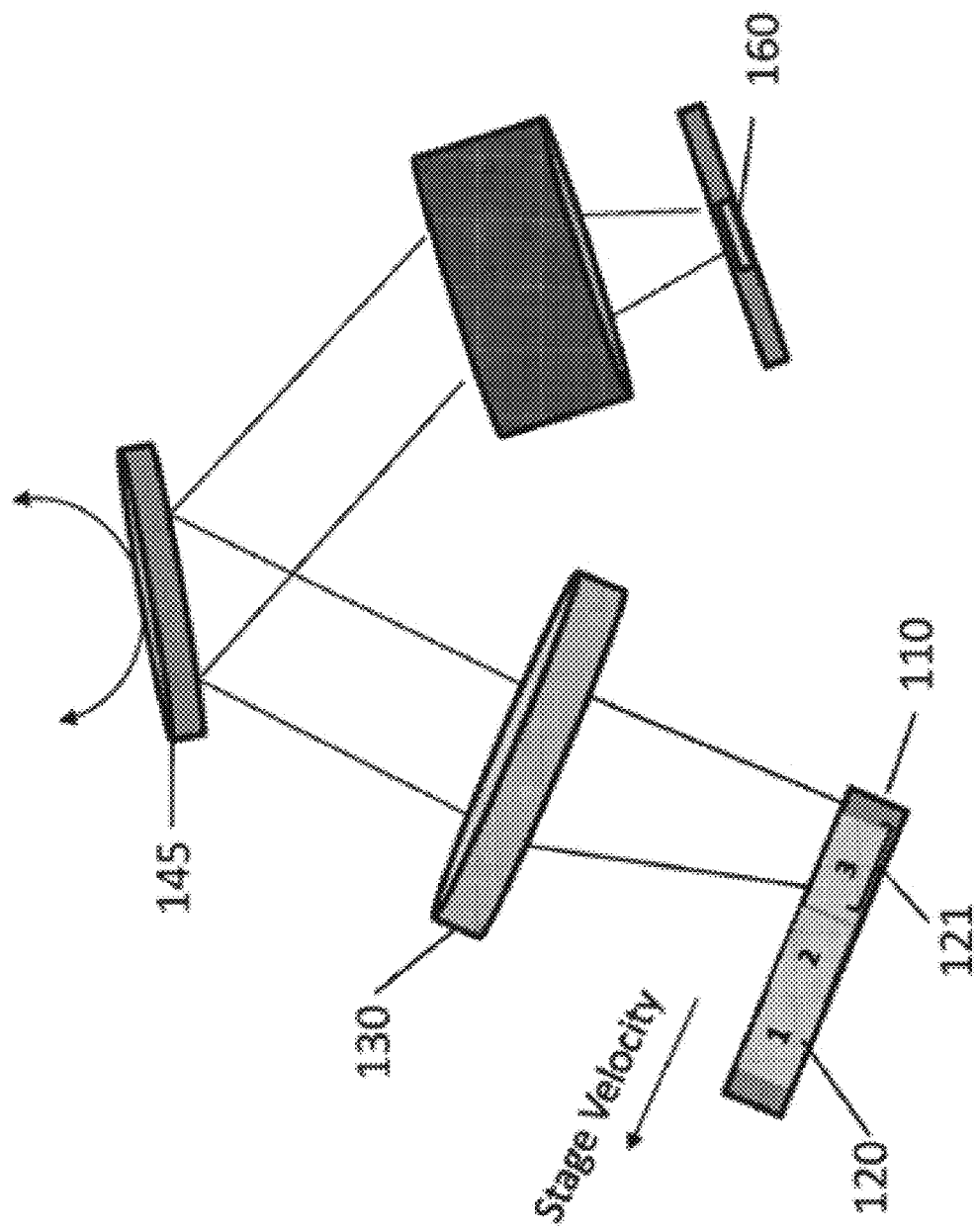
FIG. 4 is a diagram of components of an optical scanning device along an optical path from a substrate to a detector comprising a single motion tracking mirror (i.e., a single-mirror embodiment) according to an embodiment of the invention.

Scanning optics provided in a single mirror embodiment of the optical scanning system is shown in FIG. 4. In this embodiment, the optical scanning system comprises a moveable stage 110 configured to move a mounted substrate 120 along an axis. The substrate 120 comprises one or more fields 121 that are individually imaged by the optical scanning system as the stage is continuously moving. The substrate is illuminated by an illumination mechanism (not shown), and light from the substrate travels along an optical path through the objective lens 130. The image of the moving substrate is stabilized with respect to an image sensor by a motion tracking mirror 145. An image of the field 121 is captured by a camera 160 comprising an image sensor. The motion tracking mirror 145 is configured to rotate about an axis parallel to the plane of the image field. The rotation of the motion tracking mirror 145 adjusts the optical path to stabilize the image of a field during an image capture by the camera 160. Thus, the single-mirror embodiment of the optical scanning system provides a stabilized image with an improved sharpness or reduced pixel smear over a system that does not correct for stage velocity fluctuations while imaging a moving substrate.

The optical scanning system in several embodiments is configured to image a continuously moving object, such as a substrate mounted on a moveable stage, in a scanning fashion. In such embodiments, a substrate is typically mounted (or otherwise placed) on a moveable stage that is coupled to one or more mechanisms (e.g., motors or other actuators) that can continuously move the substrate under an objective lens while a camera captures an image of a field of the substrate. The moveable stage is configured and operative to move the substrate along a direction that is normal to the optical axis of the objective lens. In some embodiments, the axis of movement of the moveable stage is orthogonal to the operation of autofocus-types of mechanisms, which generally move an imaged object and/or an objective along the optical axis of the objective lens.

In various embodiments, the velocity of the moveable stage may be in a range from 0.1 mm per second to 1000 mm per second (or greater). In some embodiments, the velocity of the moveable stage may be in a range from 10 mm per second to 100 mm per second. In some embodiments the moveable stage (and therefore the substrate mounted thereon) can be configured to move at a constant velocity, although the stage is still subject to velocity fluctuation errors that are compensated for by the optical systems provided herein. In some embodiments, the moveable stage moves at a velocity of 10 to 50 mm per second. In some embodiments, the velocity of the moveable stage is about 25 mm per second. In other embodiments, the moveable stage can be configured to move with non-constant velocity. This non-constant velocity can also be subject to fluctuation errors that are compensated for by the optical systems provided herein.

In some embodiments, mechanisms may be used to facilitate the motion of the moveable stage at a given desired velocity. Such mechanisms may comprise one or more components that cause motion (e.g., such as linear motors, lead screws, screw motors, speed screws, etc.) and one or more components (e.g., such as various types of bearings) that reduce friction.

For example, in some embodiments, a moveable stage may use metal bearings (e.g., such as ball bearings, cylinder bearings, cross-roller ball bearings, etc.) that have repeatability of several microns to facilitate motion of the moveable stage at a given desired velocity. Repeatability is fundamentally the effect of rolling a metal bearing in oil—as the metal bearing rolls it bounces, and such bouncing introduces jitter in the motion of the object that is being moved on the bearings. The "repeatability" of such motion can be uniform only above a certain range because any two metal bearings can bounce in the same way only within a certain tolerance. Thus, embodiments that use ball bearings typically have greater velocity fluctuations, and thus introduce image blur (e.g., pixel smear). However, stages using ball bearings provide several advantages, including that they are lighter, smaller, and cheaper than comparable air bearing stages. Thus, provided herein according to some embodiments are improved scanning optics to reduce image blur or pixel smear due to moveable stage velocity fluctuations, including stages with ball bearings or other components that provide motion subject to some velocity fluctuations.

In some embodiments, the velocity of the moveable stage fluctuates from the intended velocity by more than 0.1% during continuous optical scanning. In some embodiments, the velocity of the moveable stage fluctuates from the intended velocity by more than 0.5% during continuous optical scanning. In some embodiments, the velocity of the moveable stage fluctuates by between 0.1% and 1% during continuous optical scanning. In some embodiments, the optical scanning system provided herein reduces an image blur or pixel smear from a moveable stage with a velocity fluctuation of between 0.1% and 1% to less than 0.1%. In some embodiments, the pixel smear for a stabilized image is less than +1¬1 pixel. In some embodiments, the moveable stage is configured to move a substrate in a continuous motion in a first known lateral direction with respect to the objective lens while a camera with a two dimensional full-frame electronic sensor produces the two-dimensional image. In some embodiments, the moveable stage is configured to move in a continuous serpentine fashion to image a plurality of rows or columns of fields on a substrate.

In some embodiments, a substrate is mounted (or otherwise placed) on a moveable stage. In some embodiments, the substrate comprises an array having target biomolecules disposed thereon. In some embodiments, the substrate comprises a multitude of distinct features that are targets for imaging. e.g., such as array chips. In some embodiments, the substrate comprises a randomly positioned array of targets for imaging.

In some embodiments, the substrate comprises a multitude of distinct features that are targets for imaging. For example, in some embodiments a substrate comprises a non-planar structure with a surface, such as a bead or a well, to which target biomolecules have been attached as the target features. In some embodiments, a substrate comprises an array chip. In some embodiments, the array chip is a solid phase support having a surface, e.g., a planar or substantially planar surface, that carries attachment sites to which biomolecules are attached as the target features. In some embodiments, the attachment sites on the array chip may be arranged in an ordered pattern or in random fashion. In some embodiments, the attachment sites are configured to have dimensions suitable for the attachment of target biomolecules. An attachment site is thus spatially defined and is not overlapping with other sites; that is, the attachment sites are spatially discrete on the array chip. When attached to the attachment sites, the biomolecules may be covalently or non-covalently bound to the array chip.

In some embodiments, the substrate is a biochip. In some embodiments, the biochip comprises high throughput microfluidics. In some embodiments, the biochip comprises biomolecules for detection of single molecules from a sample. In some embodiments, the substrate comprises an array having target nucleic acids disposed thereon. In another embodiment, the substrate comprises a multitude of distinct features that are targets for imaging.

In some embodiments the attachment sites on a substrate are divided into fields that are each imaged separately. A typical substrate may be divided into hundreds or thousands of fields that are arranged in a rectangular pattern of rows and columns. (For example, the rows and columns of fields may include track regions that are aligned substantially along a horizontal dimension and a vertical dimension, respectively).

In such embodiments, the techniques described herein provide for scanning and imaging a substrate field by field. In one example, an optical scanning system images a substrate in a scanning fashion (as described herein) while the moveable stage is moving the substrate along a y-direction in a plane and/or axis that is substantially normal to the optical axis of the objective lens. In this example, the optical scanning system ceases imaging when the end of the column of field(s) being imaged is reached in order to allow the moveable stage to position the substrate for imaging of the next column of field(s). In another example, an optical scanning system images a substrate in a scanning fashion (as described herein) while the moveable stage is moving the substrate backward and forward in a serpentine fashion (e.g., along a y-direction) in a plane that is substantially normal to the optical axis of the objective lens. In this example, the optical scanning system images a column of field(s) while the moveable stage is moving the substrate in one direction and then images the next/adjacent column of field(s) while the moveable stage is moving/returning the substrate in the opposite direction, e.g., the optical scanning system images the substrate by effectively traversing the columns of fields in a continuous serpentine fashion.

The objective lens of the optical scanning system is configured and operative to image a substrate or a portion thereof onto the camera. In some embodiments, the objective lens is an element or group of elements, in an optical scanning system, that comprises one or more lenses and is configured and operative to magnify an electromagnetic (e.g., such as optical) signal. In some embodiments, an objective lens has a large numerical aperture (NA) (e.g., NA in a range between 0.6 and 1.5) and performs imaging via air immersion or liquid immersion (e.g., such as water, oil, or other immersion fluids). In various embodiments, an objective lens may have a focal length in the range from 2 mm to 40 mm. The objective lens can be an off-the-shelf microscope objective or a custom-designed, multi-element optical component. In some embodiments, the objective lens is configured to image at least a two-dimensional portion of a substrate onto the two dimensional full-frame electronic sensor of the camera to produce a two-dimensional image.

The magnification of an objective lens is the ratio of the size of an image space pixel (i.e., a camera pixel) to the actual size of the object space area that corresponds to the image space pixel as observed by the camera. For example, a magnification of 16× allows a camera using 8 µm pixels to observe 500 nm object space pixels. In some embodiments, the objective lens has a magnification from 4× to 100×. In some embodiments, the objective lens has magnification of 20× to 50×. In some embodiments, the objective lens has a magnification of 40×.

In some embodiments, the objective lens is operably connected to an electrical motor for positioning the objective lens to allow auto-focusing. In some embodiments, the device comprises a focusing sensor. In some embodiments, the device comprises an array of focusing sensors.

In some embodiments, auto-focus mechanisms used are based on optical sensing methods. In some embodiments, auto-focusing is performed by image content analysis. In some embodiments, autofocusing is performed by obtaining multiple images of the substrate at multiple focal distances, determining an optimal focal distance for each of the images, and using a feedback loop to adjust the focal distance.

Autofocusing can be performed by directing a laser beam at the substrate, measuring a reflection of the laser beam off the substrate to provide a reference point, and using a feedback loop to adjust the focal distance. In some embodiments, non-optical types of non-contact position sensors are used. These sensors are capable of making position readings with high bandwidth and a tracking precision of 0.1 µm or less. In some embodiments, capacitive position sensors may be used (see, e.g., US 2002/0001403, whose disclosure is incorporated herein by reference).

In some embodiments, autofocus of the objective lens is achieved in less than 100 ms. In some embodiments, the range of autofocus provided by the device is +/−200 µm.

In some embodiments, the optical scanning device comprises an active autofocus system that measures distance to the subject independently of the optical system, and subsequently adjusts the objective lens to correct focus. In some embodiments, a passive autofocus system that determines correct focus by performing passive analysis of the image that is entering the optical system is used. Passive autofocusing can be achieved, for example, by phase detection or contrast measurement.

In some embodiments, the optical scanning system comprises a camera capable of capturing a 2-dimensional still image of a field of the substrate while the substrate is being moved by the moveable stage. In some embodiments, the optical scanning system comprises a full-frame camera. In some embodiments, the full-frame camera is a Complementary Metal-Oxide Semiconductor (CMOS) camera. These full frame cameras have high speed, high resolution, and low cost. Furthermore, they are compatible with the optical scanning system for capturing an image of a continuously moving substrate at a high resolution. In some embodiments, the camera is a scientific CMOS (sCMOS) camera. In some embodiments, the camera is a non-CMOS camera capable of operating in full-frame mode.

The optical scanning systems described herein are configured to use fast cameras in conjunction with a scanning optics (e.g., single mirror or dual mirror embodiments) in order to achieve continuous exposure of a still image while the substrate being imaged is moving. In some embodiments, the size (length and/or width) of a camera pixel is in a range from 5 µm to 10 µm, preferably but not exclusively in the range of 6-8 µm. In some embodiments, the size of a camera pixel is 6.5 µm. In some embodiments, the camera comprises an imaging sensor on the range of 15×15 mm to 10×10 mm.

In various embodiments, the optical scanning systems described herein are configured to scan a continuously moving substrate (e.g., such as an array chip) by using fast cameras that do not move the image through the camera, e.g., such as non-TDI cameras and other cameras (including TDI cameras) that operate in full-frame 2D mode. CMOS cameras are an example class of such cameras. CMOS cameras typically use an active-pixel sensor (APS) that is an image sensor comprising of an integrated circuit containing an array of pixels, where each pixel includes a photodetector and an active amplifier.

A high-speed camera may be defined in terms of the number of pixels that the camera can expose in a unit of time. For example, the speed of the camera may be defined by the mathematical product of the number of pixels in the field of view and the frames per second that the camera can take. Thus, a camera with a field of view of 5.5 megapixels (e.g., a view of 2560 pixels by 2160 pixels) running at 100 frames per second (fps) would be able to expose 550 megapixels per second; thus, such camera is termed herein as a "550" megapixel camera. Examples of such cameras include, without limitation, CMOS, sCMOS, and similar cameras. In various embodiments, the optical scanning systems described herein may use cameras in the range from 10 megapixels to 2500 megapixels. In some embodiments, the camera comprises a 2-dimensional, full frame electronic sensor.

Scanning optics described herein as part of the optical scanning system can include single tracking mirror and dual tracking mirror embodiments having one or more rotatable mirrors affixed along an optical path of the system between the imaged object and the camera. In a dual tracking mirror embodiment, two sets of scanning optics are used, each able to move in concert to track the motion of a moveable stage along an an axis during imaging. A first scanning optic (e.g., a velocity tracking mirror) is used to track the movement of a stage at an anticipated velocity or velocity pattern to enable imaging of a field by a camera while the field is in motion. A second scanning optic (e.g., an acceleration tracking mirror) is used to compensate for local stage accelerations that could result in unacceptable pixel smear, thus stabilizing the image. In single tracking mirror embodiments, a single set of scanning optics is used both to track the movement of a stage at an anticipated velocity or velocity pattern and to compensate for local stage accelerations (i.e. velocity fluctuations) that could result in unacceptable pixel smear, thus stabilizing the image. For single tracking mirror embodiments, a single set of scanning optics compensates for all stage motion including velocity and acceleration (or velocity fluctuations). In some embodiments, the single set of scanning optics includes a motion tracking mirror to indicate its compensation for both constant or anticipated velocity or velocity patterns and measured or predetermined velocity fluctuations (accelerations).

In some embodiments, the movement of a tracking mirror in response to velocity fluctuations of the moveable stage is based on a feedback control mechanism. In some embodiments, the feedback control mechanism comprises a device to measure position of a substrate over time, such as an encoder. In some embodiments, the movement of a mirror in response to velocity fluctuations is based on predetermined velocity fluctuations for a moveable stage. In some embodiments, all rotatable scanning optics are positioned along an optical path before any splitter used to split an image to multiple cameras.

In some embodiments, provided herein are optical scanning devices comprising a velocity tracking mirror configured to rotate to allow a camera sensor to image a field of a substrate moving along an axis on a moveable stage. The velocity tracking mirror is operably mounted to the device to reflect light along an optical path from the objective lens to the camera.

In order to maintain a still image of a moving substrate, the velocity tracking mirror is configured and operative to move in coordination with the moveable stage, while the moveable stage moves the substrate in the same specified direction, in order to reflect light from the objective lens to the camera. Thus, the velocity tracking mirror can be operably mounted to the device to rotate about a fixed axis. In some embodiments, the fixed axis is parallel to the plane of the 2-dimensional substrate image. In some embodiments, the fixed axis is orthogonal to the optical path. Thus, the velocity tracking mirror is configured and operative to perform an angular motion that allows the camera to acquire a still image of a field of the substrate through an objective lens while the substrate is being moved by the moveable stage.

The velocity tracking mirror can be operably coupled to an electrical motor to effect rotation of the velocity tracking mirror. In preferred embodiments, the electrical motor operably coupled to the velocity tracking mirror is a galvanometer, although other types of electrical motors may be used. An example of a suitable galvanometer is a Nutfield QS-7 OPD Galvanometer Scanner (Nutfield Technology). In some embodiments, other mechanisms to actuate the velocity tracking mirror, such as those based on hydraulics, pneumatics, or magnetic principles, may also be used. In some embodiments, the electrical motor is operatively coupled to the velocity tracking mirror and is operative to angularly move the velocity tracking mirror in coordination with the moveable stage, while the moveable stage moves the substrate, in order to keep an image of the substrate (or a field) still with respect to the camera while the image is being acquired through the objective lens.

The movement of the velocity tracking mirror can be coordinated through a position processing module configured to send a driving signal to the electrical motor operably connected to the velocity tracking mirror. The position processing module can include a motion controller component to generate a desired output or motion profile and a drive or amplifier component to transform the control signal from the motion controller into an electrical signal or a drive signal that actuates the electrical motor.

In some embodiments, the velocity tracking mirror has an angular range of rotation of about 60 degrees, 50 degrees, 40 degrees, 30 degrees, 20 degrees, 15 degrees, 10 degrees or 5 degrees. In some preferred embodiments, the velocity tracking mirror has an angular range of rotation of about 3 degrees, 2 degrees, 1 degree, ½ degree, ¼ degree, or ¹/₁₀ degree.

In an optical scanning system that uses a velocity tracking mirror to image a moving substrate, the mirror angle is adjusted with time so that a camera can view a fixed area on a moving substrate. This is referred to as the "forward scan" time. The velocity tracking mirror can then quickly rotate to return to its initial position. This is referred to as a "fly-back" time or "backscan" time. During the fly-back time, the image projected onto the camera is not stable.

Figure 2:
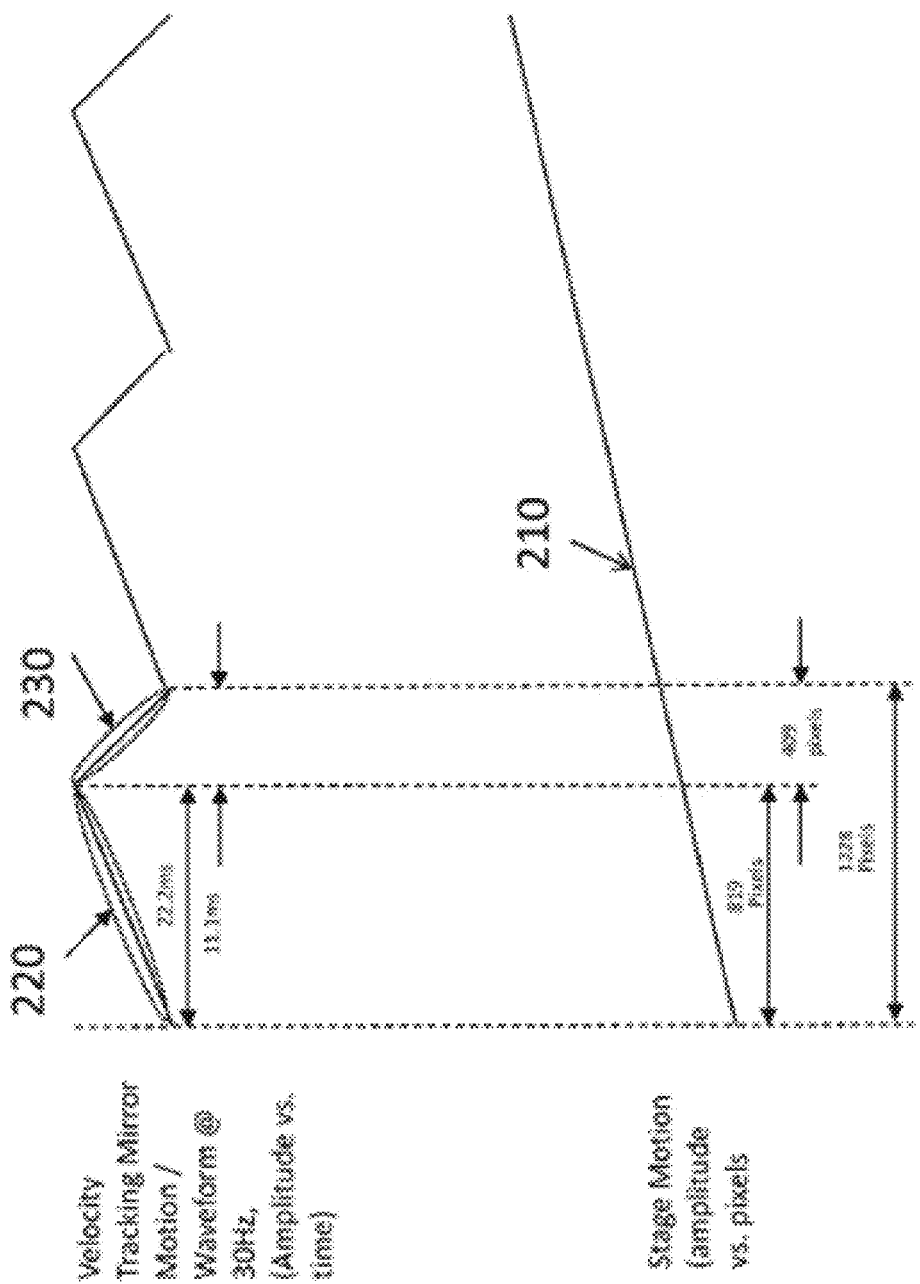
FIG. 2 is a representation of a sawtooth waveform to control the motion of a moving stage tracking mirror, such as a velocity tracking mirror, and its correlation to the change in position of a moveable stage along an axis over time according to an embodiment.

FIG. 2 illustrates a diagram of velocity tracking mirror angular movement and timing according to an example embodiment. In operation, the objective lens is focused on a substrate (e.g., an array chip) that is moving along an axis during imaging. FIG. 2 shows movement of the stage over time 210. During this movement, the velocity tracking mirror rotates from its initial position to its end position to track the movement of the substrate, which is represented as the forward scan time 220. During a single forward scan, a portion of the substrate is imaged, which is referred to herein as a field. The rotation of the velocity tracking mirror allows imaging of the substrate portion corresponding to the field by the camera during the exposure time, thereby allowing sufficient exposure onto the camera sensor. Any remaining movement of the field with respect to the camera can be due to velocity fluctuations, or deviations of the substrate velocity from the anticipated velocity. When the velocity tracking mirror reaches its extreme end position, it then moves back to its initial position in preparation for a new scan, which is represented by the waveform or motion of the mirror at 230 (fly-back time). Still images of the substrate are not acquired during the fly-back time intervals. The forward scan and fly-back motions of the velocity tracking mirror are represented as a sawtooth waveform (FIG. 2), which reflects both the motion of the velocity tracking mirror during scanning and flyback and the driving signal sent to an electrical motor operably connected to the velocity tracking mirror to actuate the mirror.

Figure 3:
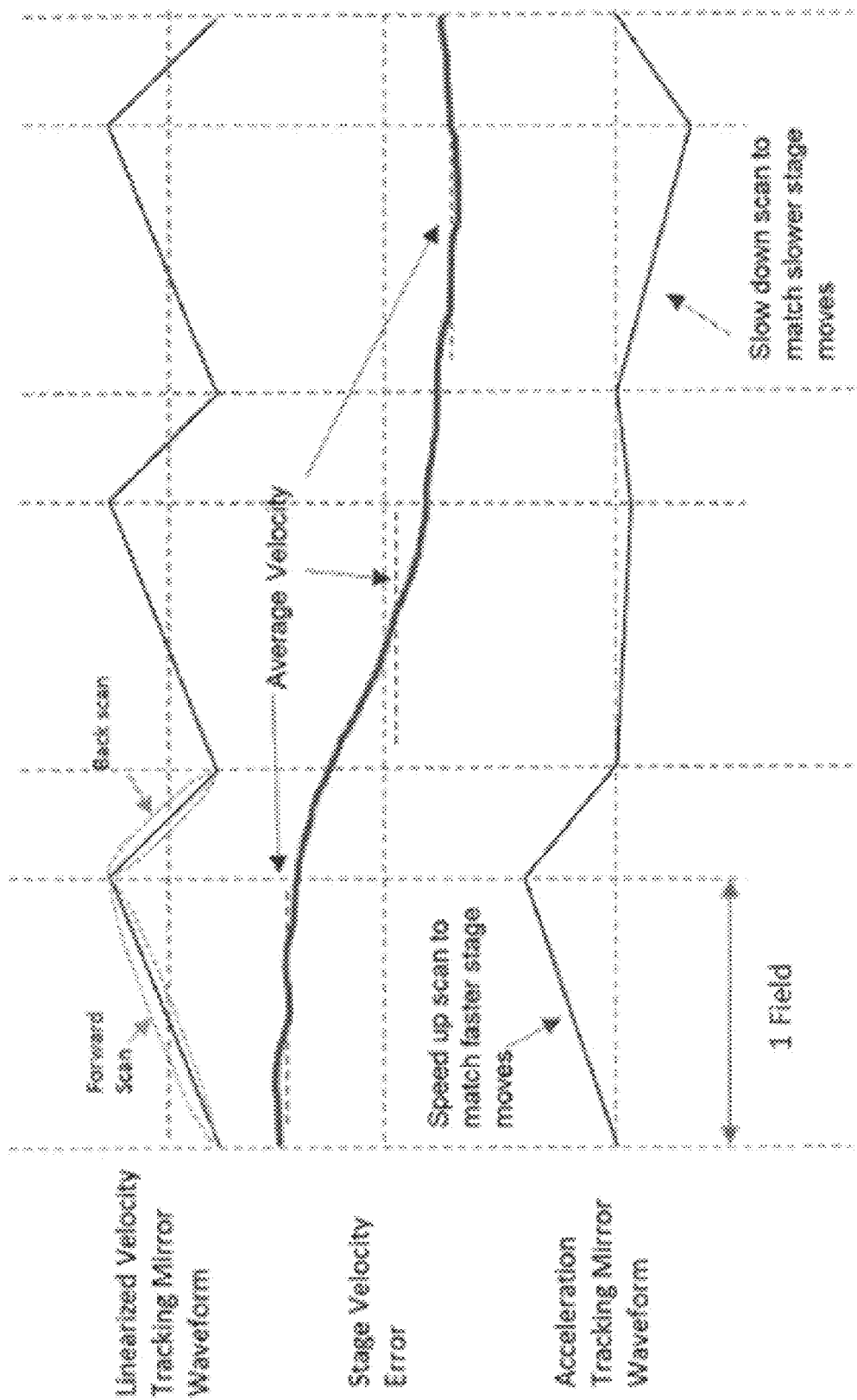
FIG. 3 provides an example of waveforms that can be used to generate driving signals for a velocity tracking mirror and an acceleration tracking mirror (in a dual mirror embodiment) to stabilize an image of a moving substrate based on a measured or anticipated stage velocity error and an anticipated stage velocity.

An embodiment of a sawtooth waveform to drive the mirror (including a forward scan and backscan segments) is shown in FIGS. 2 and 3. In some embodiments, the velocity tracking mirror may have a non-linear response over segments of its range of motion. In this case, the velocity tracking mirror response may be linearized by adjusting the waveform or driving signal so that you to linearize the response from the velocity tracking mirror.

In some embodiments, the velocity tracking mirror is operably coupled to an electrical motor to effect rotation of the acceleration tracking mirror. In preferred embodiments, the electrical motor operably coupled to the velocity tracking mirror is a galvanometer, or electric coil in a magnetic field that moves in response to an electrical current. In some embodiments, other mechanisms to provide actuation of the velocity tracking mirror, such as those based on hydraulics, pneumatics, or magnetic principles, may also be used. In some embodiments, the electrical motor operatively coupled to the velocity tracking mirror is operative to generate angular motion of the velocity tracking mirror as a function of a velocity of the moveable stage or substrate.

In some embodiments, the movement of the velocity tracking mirror is coordinated through a position processing module configured to send a driving signal to the electrical motor operably coupled with the velocity tracking mirror. The position processing module can include a motion controller component to generate a desired output or motion profile and a drive or amplifier component to transform the control signal from the motion controller into energy that is presented to the electrical motor as an electrical signal or a drive signal.

In some embodiments, the driving signal or electrical signal sent to the electrical motor operably coupled with the velocity tracking mirror can be a linearized velocity tracking error waveform defined as a function of G(0,o.),c(0)), where G is a modified triangle wave with 0=angular position, o.)=frequency, and 6(0)=amplitude.

The movement of a tracking mirror can be characterized by its duty cycle, defined as the portion of time the tracking minor is operably moving in the forward scan motion to allow active imaging of the substrate. For example, if the tracking mirror tracks the substrate to allow imaging by the camera during at least 90% of the tracking mirror cycle (e.g., when the tracking mirror fly-back time is equal to or less than 10% of the cycle), then this technique allows the camera to operate with at least a—90% overall readout efficiency.

In some embodiments, such as fluorescence imaging where longer exposure times may be needed, the scan time interval, during which an image is collected by the camera, must be long enough to build up adequate signal-to-noise ratios as fluorescence imaging light levels are typically very weak.

The duty cycle is also impacted by the speed with which the tracking mirror returns to its initial position. This fly-back time interval can be configured to be only a small fraction of the tracking mirror cycle, thus maximizing the duty cycle. For better efficiency, the amount of time spent by a tracking mirror on each imaged area is made commensurate with the camera's frame rate, thereby allowing sufficient time to expose an image of each field onto the camera.

In some embodiments, the duty cycle is greater than 60%. In some embodiments, the duty cycle is from 60% to 90%. In some embodiments, the duty cycle of the image capture is at least 1%, 2%, 3%, 4%, 5%, 6%, 7%, 8%, 9% or 10%. In some embodiments, the duty cycle can be as low as 10%, or can be in the range of 20%, 30%, 40%, 50%, 60%, 70%, 80% or 90%. In some embodiments, these duty cycles are achieved with an imaging frequency of from 30 to 200 Hz. In some embodiments, these duty cycles are achieved with an imaging frequency of from 30 to 40 Hz. In some embodiments, these duty cycles are achieved with an imaging frequency of 30 Hz, 35 Hz, 40 Hz, 45 Hz, or 50 Hz.

During the fly-back time intervals, the optical scanning system should cease imaging because the image being acquired is not stable. Thus, in various embodiments various mechanisms can be used to prevent image exposure to the camera during the fly-back time intervals. For example, in some embodiments an acousto-optic modulator (AOM) switch (or other type of fast switch) may be used to turn on and off the illumination light that is incident onto the substrate being imaged. In other embodiments, a suitable aperture can be placed in the optical path of the illumination light, where the illumination light is allowed to overscan but the aperture prevents the light from illuminating the substrate during the flyback time intervals by blocking out the light outside of the field of view. In yet other embodiments, a suitable shutter can be placed in the optical path of the illumination light, where the shutter is kept open during exposure intervals and is closed during the tracking mirror fly-back time intervals.

In dual tracking mirror embodiments, the optical scanning device further comprises an acceleration tracking mirror configured and operative to provide offset corrections to an optical path to stabilize the transmission of light from a substrate to the camera during imaging of the substrate (or a portion thereof). The offset corrections are a function of velocity fluctuations in the movement of the moveable stage along an axis as compared to the velocity tracked by the velocity tracking mirror. These velocity fluctuations can impact the accuracy of tracking of the moveable stage by the velocity tracking mirror and result in an image with unacceptable pixel smear. The rotation of the acceleration tracking mirror, as provided herein, stabilizes the image of the field captured by the camera to reduce pixel smear from velocity fluctuations of the stage or substrate.

FIG. 3 provides one example of an acceleration tracking mirror waveform generated in response to an average stage velocity error for a field. When the stage velocity has a positive error, an acceleration tracking mirror waveform is generated to track the additional velocity of the stage. Conversely, when the stage velocity has a negative velocity error, an acceleration tracking waveform is generated to track the slower velocity of the stage (i.e., it rotates in the opposite direction as a positive velocity error). In some embodiments, the acceleration tracking mirror waveform is generated and converted to a driving signal immediately after sensing the velocity error. In some embodiments, the acceleration tracking mirror waveform is generated based on an average measurement of velocity during imaging of a field n−1, and the driving signal is generated from this waveform to drive movement of the acceleration tracking mirror during imaging of field n.

Stage velocity error can be modeled as a function of amplitude (A), stage position (x), and time (t), to give the following function:

$$F(A,x,t) = A(x) * \text{Err}(x,t)$$

In some embodiments, the electrical signal or driving signal (D) to control movement of an electrical motor operably connected to the acceleration tracking mirror can be determined based on the stage velocity error by a function represented as follows:

$$D(F,C,x,E) = F(A,x,t)y * C * x + E,$$

where C is a scaling factor, x=stage position and E is an offset. F(A,x,t)y is the average value of F(A,x,t) over the ramp range=y, or over a prior field, as described herein. A function to smooth discontinuities can also be used to generate the acceleration tracking mirror driving signal.

In some embodiments, the acceleration tracking mirror is operably coupled to an electrical motor to effect rotation of the acceleration tracking mirror. In preferred embodiments, the electrical motor operably coupled to the acceleration tracking mirror is a piezoelectric actuator, although other types of electrical motors may be used. In some embodiments, other mechanisms to provide actuation of the acceleration tracking mirror, such as those based on hydraulics, pneumatics, or magnetic principles, may also be used. In some embodiments, the electrical motor operatively coupled to the acceleration tracking mirror is operative to generate angular motion of the acceleration tracking mirror as a function of fluctuations in the velocity of the moveable stage to compensate for velocity fluctuations during imaging.

In some embodiments, the movement of the acceleration tracking mirror is coordinated through a position processing module configured to send a driving signal to an electrical motor operably connected to the acceleration tracking mirror. The position processing module can include a motion controller component to generate a desired output or motion profile and a drive or amplifier component to transform the control signal from the motion controller into energy that is presented to the electrical motor as an electrical signal or a drive signal. Since the movement of the acceleration tracking mirror is a function of fluctuations in velocity of the moveable stage, the position processing module can further comprise a position, velocity or acceleration sensor. This sensor can act as a type of feedback sensor that determines information about the position and/or motion of the substrate or moveable stage. In some embodiments, the sensor comprises an encoder (e.g., a linear encoder) or an interferometer operably mounted to the scanning device. In some embodiments, the encoder is a non-interferometric encoder. In some embodiments, an accelerometer could be used to determine changes in velocity. In some embodiments, the sensor is a component that provides information from a velocity fluctuation table that includes anticipated velocity fluctuation values for a stage to incorporate into the driving signal for the electrical motor operably coupled to the acceleration tracking mirror.

The position measurements from a substrate or stage position or motion sensor are used to provide a set of data that represents the measured velocity of the substrate or moveable stage. The measured velocity can be compared with an anticipated velocity to determine velocity fluctuations in the stage. These velocity fluctuations can then be translated into an electrical signal (e.g., a driving signal) which effects controlled movement of an electrical motor operably connected to the acceleration tracking mirror. The controlled movement of the acceleration tracking mirror adjusts the position of the optical path between the substrate and the camera to provide an image with increased stability, increased sharpness, and/or reduced blur or pixel smear.

An electrical motor can be selected on the basis of its ability to quickly respond to a driving signal comprising a correction term based on measured velocity fluctuations. To provide a quick response, in some embodiments, the electrical motor has a total angular range of rotation of less than one degree. In some embodiments, the electrical motor is a piezoelectric actuator or another motor with a similar response time to the correction signal. In some embodiments, the position sensor acquires position information at a rate of equal to or greater than 500 Hz, 1 kHz, 2 kHz, 3 kHz, 4 kHz, 5 kHz, 10 kHz, 20 kHz, 50 kHz, 100 kHz and 250 kHz. In certain embodiments, a higher frequency of position detection, e.g., 5 kHz or more, allows a more precise measurement of the stage to increase the resolution of velocity fluctuation and therefore provide a sharper image. However, lower frequencies may be used that are sufficient to provide correction to prevent a pixel smear of greater than two pixels.

For example, in some embodiments an encoder provides substrate or stage position or motion measurement information to logic executing in a computing device, such as a motion controller, where the logic uses the measurement information to compute the necessary correction term for the direction of stage movement and to cause a servo mechanism, such as an electrical motor, to rotate the acceleration tracking mirror based on the computed correction term that is a function of velocity fluctuation of the moveable stage.

The determination of velocity fluctuation can be determined from two or more position measurements from the position sensor. In some embodiments, near instantaneous velocity can determined from the most recent 2 or 3 positions measured from the substrate.

In some embodiments, velocity fluctuation used to generate a driving signal is determined from a pre-calculated table. A velocity fluctuation may already be known for a stage, and can be recorded into a table which is accessed by the motion controller component. Thus, in these embodiments, the position sensor is a component of the position processing module that provides data from a velocity fluctuation table to a motion controller.

By using an acceleration tracking mirror as described herein, an optical scanning system can use a camera that operates in a full-frame mode (e.g., such as a CMOS camera that does not operate in TDI mode) to acquire still images of a moving substrate within an accuracy of +7-one pixel. In some embodiments that are employed for biological imaging, e.g., DNA sequencing or other single molecule detection techniques, the extreme alignment accuracy requirements of fluorescence imaging may necessitate the use of at least one velocity and acceleration tracking mirror pair to correct for movement, including velocity fluctuations, of a substrate along an axis to remove nonlinearities in the motion of the moveable stage.

In some embodiments, tracking of the movement of the stage, including both a velocity of a stage and velocity fluctuations of the stage along an axis, is performed by a single tracking mirror (the single-mirror embodiment), referred to herein as a motion tracking mirror. In this embodiment, a single motion tracking mirror performs the functions of both the velocity and acceleration tracking mirrors described above. Therefore, in a single mirror embodiment, a drive signal is sent to an electrical motor operably coupled to the single motion tracking mirror that is a function of a predetermined stage velocity including both scanning and flyback waveforms (e.g., a sawtooth wave) and is also a function of velocity fluctuations of the stage or substrate, which can be predetermined or can be based on one or more measurements that provide information about the motion of the substrate or moveable stage to determine a velocity fluctuation of the stage or substrate.

Scanning optics provided in a single mirror embodiment of the optical scanning system is shown in FIG. 4. In this embodiment, the optical scanning system comprises a moveable stage 110 configured to move a mounted substrate 120 along an axis. The substrate 120 comprises one or more fields 121 that are individually imaged by the optical scanning system as the stage is continuously moving. The substrate is illuminated by an illumination mechanism (not shown), and light from the substrate travels along an optical path through the objective lens 130. The image of the moving substrate is stabilized with respect to an image sensor by a motion tracking mirror 145. An image of the field 121 is captured by a camera 160 comprising an image sensor. The motion tracking mirror 145 is configured to rotate about an axis parallel to the plane of the image field. The rotation of the motion tracking mirror 145 adjusts the optical path to stabilize the image of a field during an image capture by the camera 160. Rotation of the motion tracking mirror 145 is a function of both a predetermined stage velocity and velocity fluctuations of the stage or substrate. Thus, the single-mirror embodiment of the optical scanning system provides a stabilized image with an improved sharpness or reduced pixel smear over a system that does not correct for stage velocity fluctuations while imaging a moving substrate.

A position processing module configured to drive the movement of the single motion tracking mirror includes components of both a position processing module operably connected to a velocity tracking mirror and components of a position processing module operably connected to an acceleration tracking mirror, as described in the two-mirror embodiment above. Therefore, in some embodiments, the position processing module comprises a motion controller component that generates a desired output or motion profile, a drive or amplifier component to transform the control signal from the motion controller into an electrical signal or drive signal. The position processing module can also include a position, velocity, or acceleration sensor configured to determine the position or motion of the substrate or moveable stage, and to send this signal to the motion controller component to be used to generate the desired output or motion profile as a function of the information from the sensor. The motion controller component can then generate a motion profile for the single motion tracking mirror that is a function of both the constant or otherwise anticipated velocity of the substrate or stage (e.g., a sawtooth waveform) and velocity fluctuations determined from the signal from the sensor or that are predetermined for the stage. Thus, the sawtooth waveform used to track velocity can be modified according to a real time velocity measurement determined from a signal from a positional sensor or from predetermined velocity fluctuations.

Figure 5:
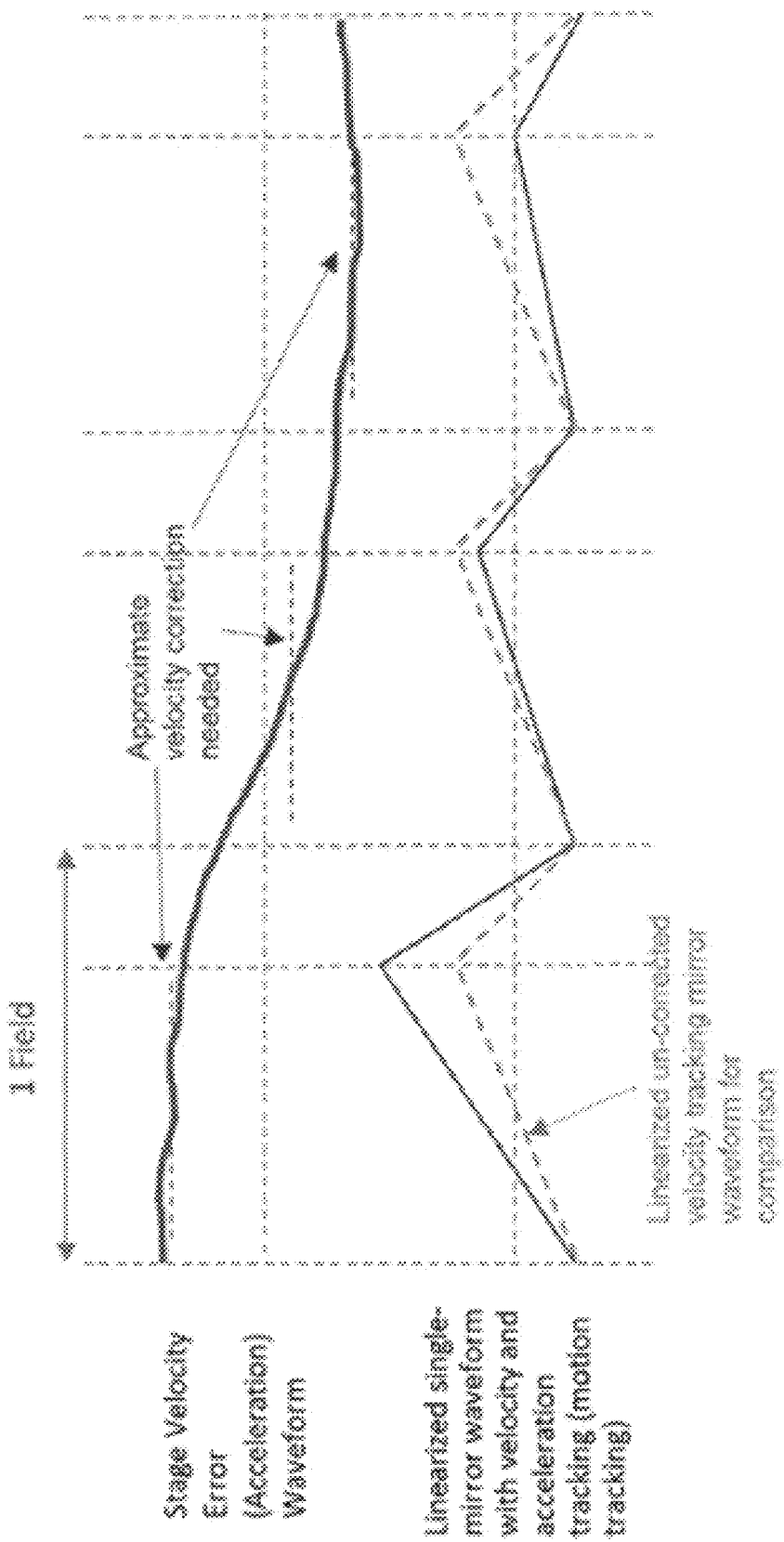
FIG. 5 provides an example of waveforms that can be used to generate driving signals for a motion tracking mirror (in a single mirror embodiment) to stabilize an image of a moving substrate based on a measured or anticipated stage velocity error and an anticipated stage velocity.

FIG. 5 provides an example stage velocity error waveform generated from data provided by a position, velocity or acceleration sensor. Also shown are approximate velocity corrections needed, otherwise known as the average velocity error for a field. The next waveform (solid line) shows a velocity tracking waveform modified by a correction term that is a function of an average velocity error (e.g., an average velocity error for a field). The dashed line represents a linearized, un-corrected motion tracking mirror waveform (similar to the waveform used to drive a velocity tracking mirror in the dual-mirror embodiment). When there is a positive velocity error, the slope of the waveform during scanning is increased, thereby increasing the speed of the rotation of the mirror to compensate for the velocity error. When there is a negative velocity error, the slope of the waveform is decreased, thereby decreasing the speed of the rotation of the mirror to compensate for the velocity error.

In some embodiments, the sensor determines an average velocity of the stage or substrate based on a plurality of measurements taken during imaging of a field. In some embodiments, the sensor is a position sensor. In some embodiments, the position sensor is an encoder (e.g., a linear encoder) or an interferometer operably mounted to the scanning device. The signal from the position sensor can be used to determine the average velocity of the moveable stage or substrate using two or more of the most recent positional measurements captured by the position sensor. In some embodiments, these measurements can be used to adjust the angle of the motion tracking mirror after sensing.

Figure 6:
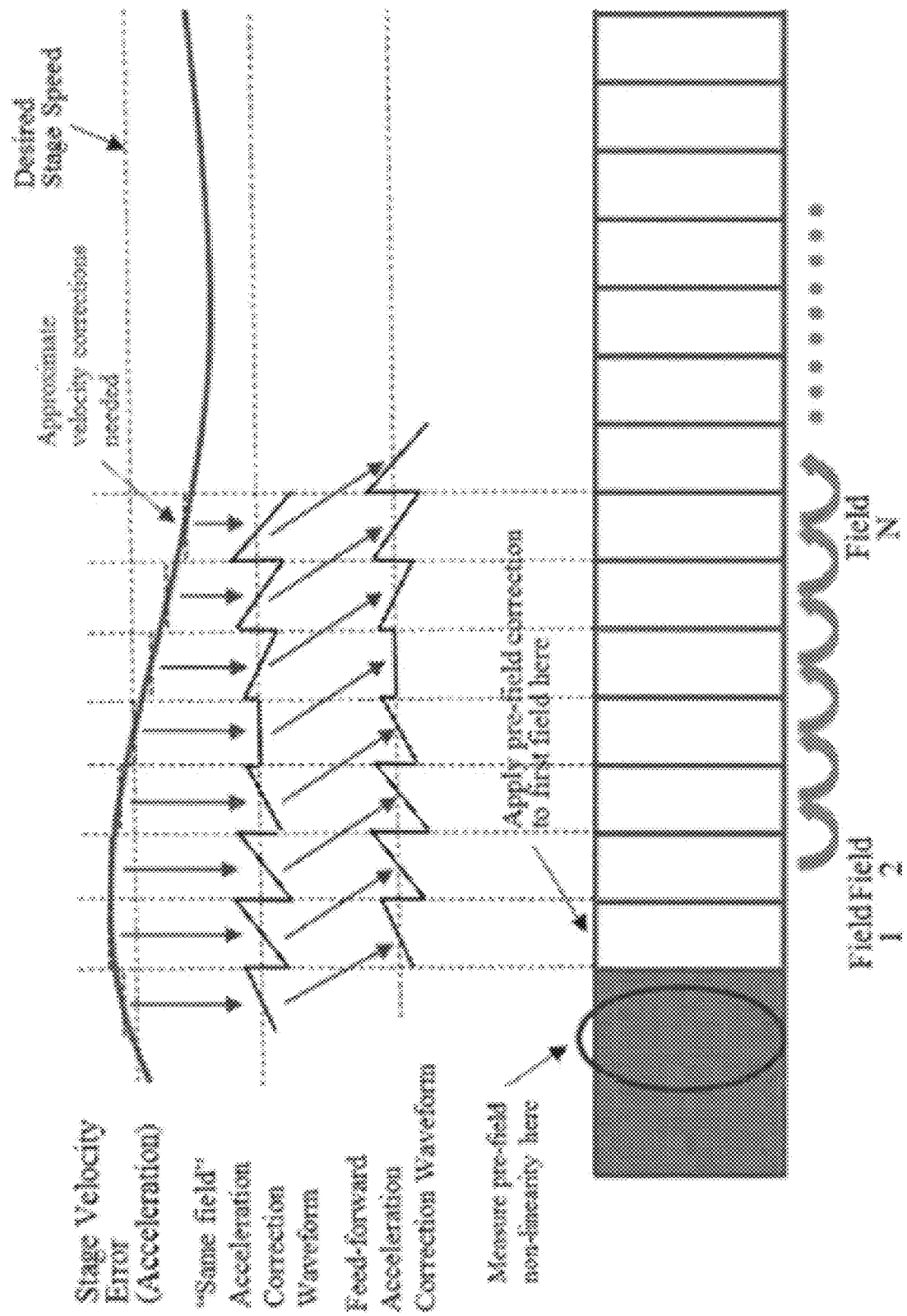
FIG. 6 provides a schematic of one possible implementation of a field level feed-forward mechanism to provide a correction term to adjust a drive signal provided to a mirror of the device capable of moving in response to velocity fluctuations of the substrate or moveable stage.

In some embodiments, the average velocity of a substrate or stage is determined over a field n−1 and is used to provide a correction term which is used for generating the motion profile of the motion tracking mirror for field n. This is known as the field level feed forward mechanism, as illustrated in FIG. 6. In some embodiments of the field level feed forward correction mechanism, the motion controller component generates a motion profile for movement of the motion tracking mirror (in the single mirror embodiment) or the acceleration tracking mirror (in the dual mirror embodiment) as a function of the average velocity of the previous imaged field. A field level feed-forward velocity tracking and correction mechanism is distinct from other types of correction, such as a scanline level feed forward mechanisms. Field-level feed forward corrections are advantageous in that they reduce the stringency of immediate signal processing while still providing sufficient correction information to generate an acceptably sharp image for monitoring information in single pixels (i.e., a pixel smear of no more than +/− one pixel). Some image blur or pixel smear may not be corrected by field level feed forward mechanisms, however, in some embodiments, such as in single molecule imaging applications (e.g., for biomolecular sensing), a pixel smear of up to +/− one pixel is acceptable, and field-level feed forward corrections can generate an acceptable smear when there is a velocity fluctuation from field n−1 to field n that is within an acceptable level (e.g., results in a pixel smear of no more than +/− one pixel).

Provided in FIG. 6 is a diagram of an embodiment of field level feed-forward correction. In this embodiment, velocity tracking measurements of a chip or stage are obtained to generate a mirror rotation drive signal that incorporates velocity fluctuations of the moving stage. Here, the stage begins moving, and positional information is obtained over time (or velocity information is obtained) to determine a pre-field non-linearity of the velocity of the stage (velocity fluctuations). When the first field is imaged, a driving signal that is a function of the average velocity measured in the pre-field stage is sent to the motion tracking mirror (or acceleration tracking mirror in two-mirror embodiments). For the next consecutive fields, the process is repeated using velocity error determined from positional information of the prior field (N−1) over time. The driving signal is determined as a function of this velocity error and sent to the motion tracking mirror for rotation during field N. FIG. 6 shows stage velocity error over time and also the approximate velocity error per field. The first arrow down from the stage velocity error indicates that determination of an average velocity error from the field, and the translation into a "same field" acceleration correction waveform. The feed forward mechanism is indicated by the second arrow down, translating this waveform to drive the mirror for the next field n based on the waveform derived from field n−1. In this manner, the stage velocity error is approximated for each field based on the prior field n−1.

In one embodiment, the field level feed forward mechanism proceeds according to the following steps: Measure multiple positions of the substrate over field n−1. Determine an average velocity for field n−1. Calculate the velocity fluctuation for field n−1 and a correction term based on this velocity fluctuation. Apply correction term to motion profile (e.g., an electric motor waveform) to send to driver or amplifier. Send a driving signal to an electric motor operably linked to a motion tracking mirror or acceleration tracking mirror to generate movement of the tracking mirror during image capture of field n. Repeat process for remaining fields in a lane.

In some embodiments, the total feedback loop in the servomechanism based on field level feed-forward velocity tracking is less than 100 ms, less than 90 ms, less than 80 ms, less than 70 ms, less than 60 ms, less than 50 ms, less than 40 ms, less than 30 ms, less than 20 ms, less than 10 ms, less than 5 ms, or less than 2 ms. In some embodiments, feed-forward velocity tracking is used to adjust the movement of an acceleration tracking mirror in the two mirror optical path alignment correction embodiment.

In some embodiments, in order to minimize error due to the linear ramp of an electric motor-controlled single mirror, the electric motor driving signal or waveform is adjusted to compensate for systematic errors in tracking. Minimization of error in generating a linear ramp (e.g., a forward scan or fly-back) of an electric motor can also be achieved by reducing the speed of motion of the mirror, such as by reducing the imaging frequency of the optical scanning system. In some embodiments, the frequency of the sawtooth waveform to control the electric motor in the single mirror embodiment is kept at or below 200 Hz. In some embodiments, the frequency of the sawtooth waveform to control the electric motor in the single mirror embodiment is from 50 Hz to 30 Hz. In some embodiments, the frequency of the sawtooth waveform to control the electric motor in the single mirror embodiment is from 45 Hz to 35 Hz. In some embodiments, the duty cycle of the sawtooth waveform to control the electric motor in the single mirror embodiment is 70% or less. In some embodiments, the duty cycle of the sawtooth waveform to control the electric motor in the single mirror embodiment is from 60% to 80%. In some embodiments, the frequency of image capture and the duty cycle in the single mirror embodiment are adjusted to have a total velocity tracking error of less than 2%. In some embodiments, the frequency of image capture and the duty cycle in the single mirror embodiment are adjusted to have a total pixel smear of less than 2 pixels or less than 1 pixel.

As discussed herein, according to some embodiments, the position processing module refers to a collection of components including i) sensors to determine states of parts of the optical scanning system (e.g., a stage position sensor) for feedback control, ii) mechanisms that calculate or otherwise provides waveforms for effecting movement of components of the optical scanning device (e.g., a sawtooth wave to drive a velocity tracking mirror), or iii) mechanisms that send a driving signal to an actuator based on the waveform to effect movement of a component.

For example, as discussed above, the position processing module can be used to create the correct waveforms to drive the movement of certain components, such as rotatable mirrors to adjust the optical path, and synchronize them to stage motion based on stage encoder or master clock values. The waveform for a velocity tracking mirror can be a sawtooth waveform with a ramp that tilts the velocity tracking mirror at the right speed to match of the velocity of the stage. The waveform sent to an acceleration tracking mirror or to a single rotatable mirror in the single mirror embodiment must include a term to correct for velocity fluctuations that occur in the moveable stage velocity. This waveform can be created by "mapping" out the stage velocity non-linearities using a reticle with calibration marks on it, or it can be created by taking the measured stage velocity from the previous field, creating a waveform that compensates for velocity non-linearities and using that waveform to correct for velocity fluctuations in the next field, i.e., the field level "feed-forward" approach. The waveform can also be created by providing information from a velocity fluctuation table to the position processing module.

According to the techniques described herein, one or more computing devices and/or various logic thereof are configured and operative to control the coordinated motions of the scanning mirror or mirrors (e.g., the acceleration and velocity tracking mirrors) and the moveable stage. Thus, in some embodiments the moveable stage (and therefore the substrate mounted thereon) can be configured to move with constant velocity, in which case the back-scan motion of the tracking mirror will also be at a suitable constant velocity. In other embodiments, the moveable stage can be configured to move with non-constant velocity, in which case the back-scan motion of the tracking mirror will also be at a suitable non-constant constant velocity.

The position processing module can also be used to synchronize components of the optical scanning device to enable capture of an image of a field of a substrate on a moving stage. In addition to linking motion of the rotatable mirrors to the velocity of a moveable stage, the position processing module can also control other components of the device. In some embodiments, the position processing module comprises a mechanism to control illumination of the field. For example, the position processing module may send a signal to an illumination device, such as a laser, to time illumination with the image capture process. In some embodiments, illumination state is dependent upon the sawtooth waveform sent to a velocity tracking mirror. In some embodiments, the position processing module sends a signal to control movement of the moveable stage at a selected velocity or along a selected path, such as a serpentine path to image several fields on a substrate.

Figure 7A:
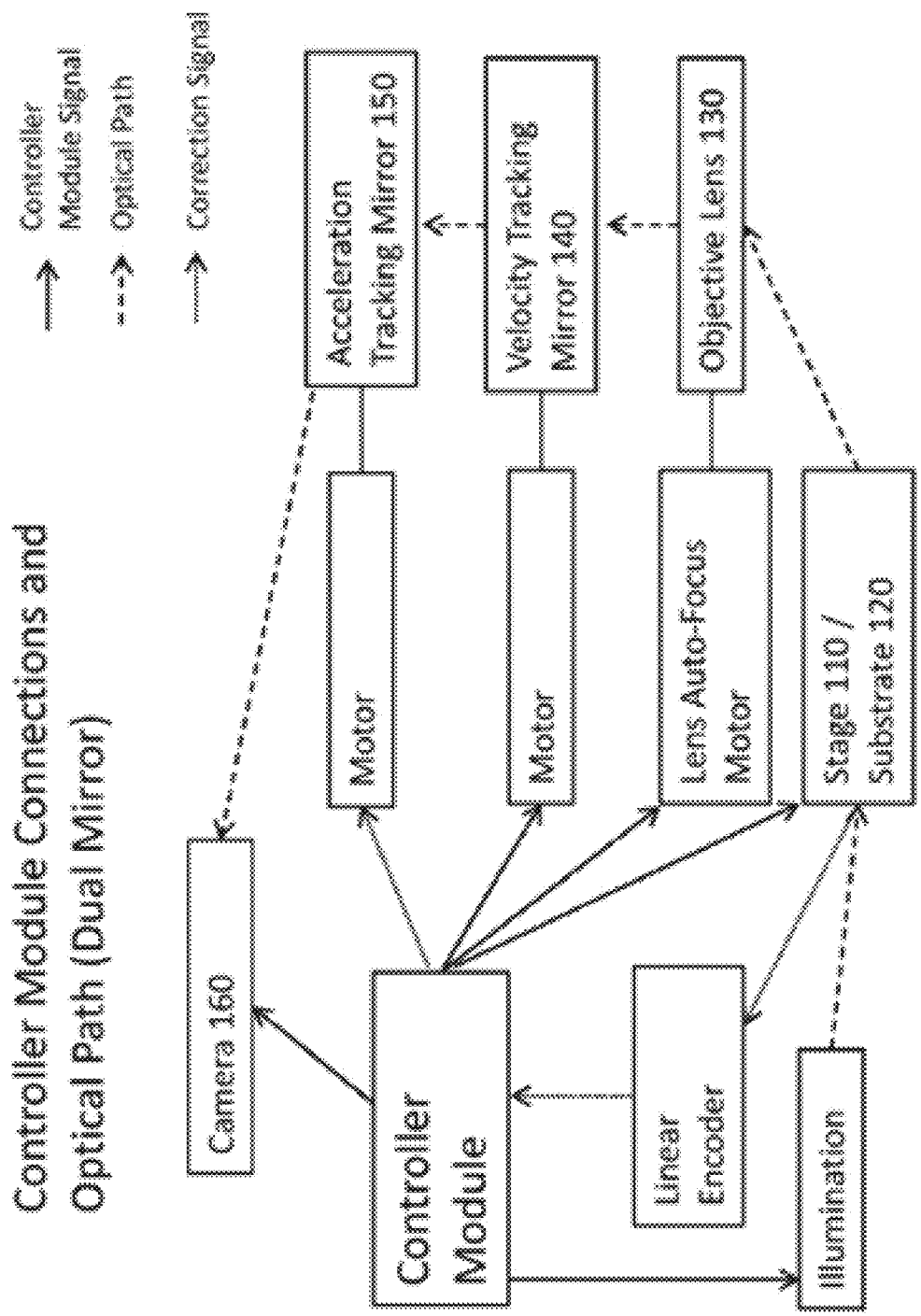
FIGS. 7A and 7B are diagrams of components of a position processing module and its connections to certain components of the device, including the adjustable tracking mirror(s) and substrate or moveable stage position sensing devices. Connections are indicated by arrows. A solid arrow indicates a signal sent from the position processing module to the respective component. Dotted arrow indicates the path for measurement of velocity fluctuations of the stage or substrate and translation into a driving signal that controls the motor operably connected to an acceleration or motion tracking mirror. Dashed arrows indicate the movement of light from along an optical path among components of the optical scanning system.
Figure 7B:
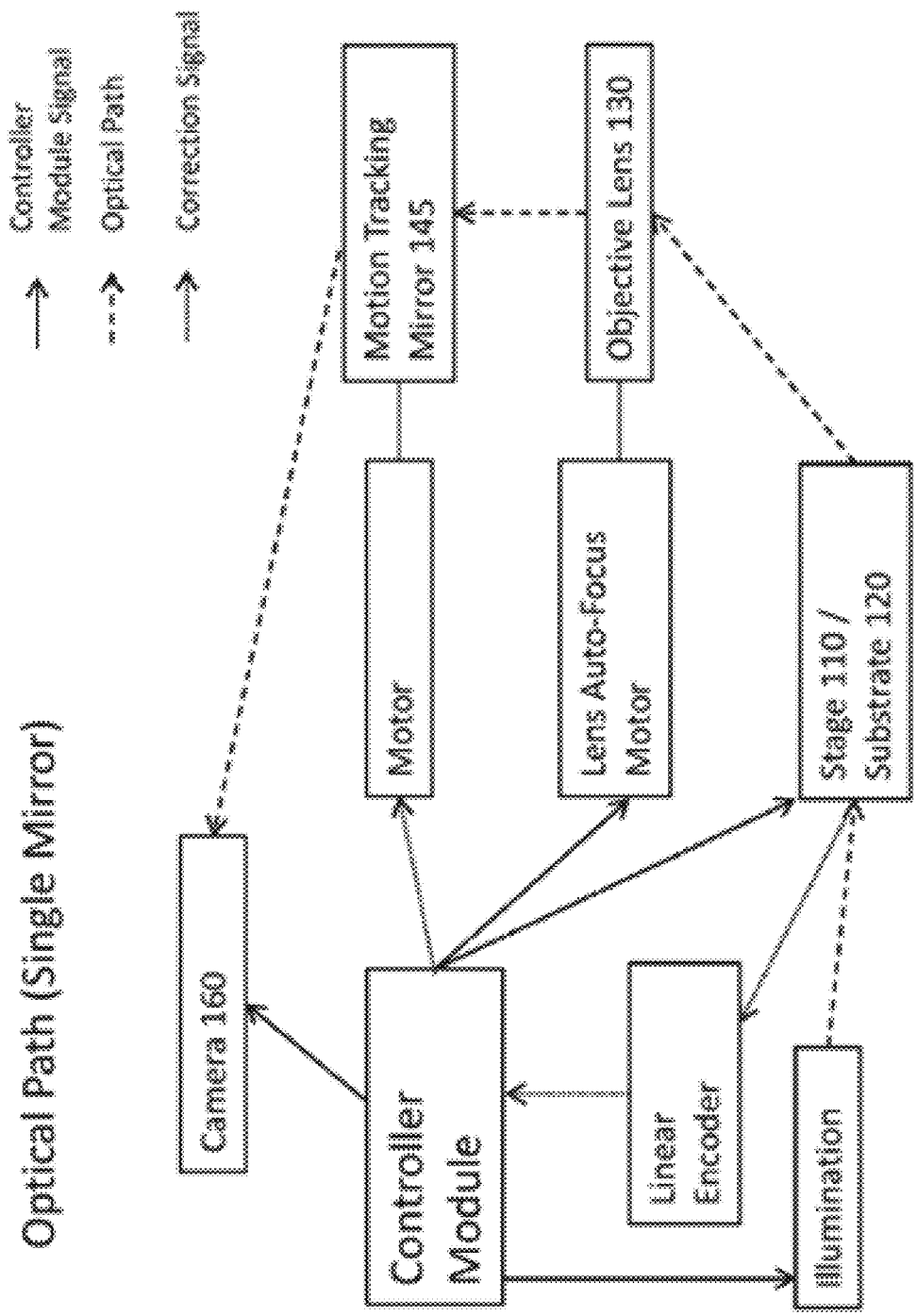

The connection of the position processing module to certain components of an optical scanning system, according to a dual-mirror embodiment, is shown in FIG. 7A. As illustrated in this embodiment, the position processing module is operably connected to an illumination component to control illumination of a substrate, such as by timing illumination with image capture timing. The position processing module is operably connected to a camera to control image capture by the camera to coordinate with the motion of the rotating mirrors, e.g., such that an image is acquired during tracking of each field, and no image is acquired during the fly-back period of a tracking mirror. As described in more detail herein, the position processing module can comprise a memory, a processor, and a driver. The memory can hold a predetermined velocity or velocity fluctuation information to be used by the processor to generate a waveform. The memory can also hold a predetermined waveform. The waveform can be sent to the driver to generate a driving signal. In some embodiments, the position processing module is operably connected to an encoder (e.g., a linear encoder) to receive positional information about the moving stage over time. The position processing module can then generate a drive signal as a function of velocity fluctuation from the information from the linear encoder, which can then be sent to the driver to send a driving signal to an acceleration tracking mirror (or substrate tracking mirror in the one-mirror embodiment (FIG. 7B)). The path from data collection from the stage to movement of a tracking mirror is indicated by the dotted arrows, which also include a driving signal sent from the position processing module to a motor operably connected to an acceleration tracking mirror 150 or motion tracking mirror 145. FIGS. 7A and 7B also depicts the optical path of light from an illumination source to detection by the camera according to a dual-mirror embodiment. Solid lines (not arrows) in FIGS. 7A and 7B indicate an operable connection between a motor and a component of the device actuated by the motor.

In an example embodiment, the optical scanning system further comprises an illumination light source. In various embodiments, the illumination source can emit light of various wavelengths that are compatible with various fluorophores that can be used in biomolecular detection, for example, light of wavelength in a range from 400 nm to 800 nm.

In some embodiments, the wavelength of light is in the range of about 400 nm to about 800 nm. In some embodiments, the wavelength of light is in the range of about 400 nm to about 450 nm, about 400 nm to about 500 nm, about 400 nm to about 550 nm, about 400 nm to about 600 nm, about 400 nm to about 650 nm, about 400 nm to about 700 nm, about 400 nm to about 750 nm, about 400 nm to about 800 nm, about 450 nm to about 500 nm, about 450 nm to about 550 nm, about 450 nm to about 600 nm, about 450 nm to about 650 nm, about 450 nm to about 700 nm, about 450 nm to about 750 nm, about 450 nm to about 800 nm, about 500 nm to about 550 nm, about 500 nm to about 600 nm, about 500 nm to about 650 nm, about 500 nm to about 700 nm, about 500 nm to about 750 nm, about 500 nm to about 800 nm, about 550 nm to about 600 nm, about 550 nm to about 650 nm, about 550 nm to about 700 nm, about 550 nm to about 750 nm, about 550 nm to about 800 nm, about 600 nm to about 650 nm, about 600 nm to about 700 nm, about 600 nm to about 750 nm, about 600 nm to about 800 nm, about 650 nm to about 700 nm, about 650 nm to about 750 nm, about 650 nm to about 800 nm, about 700 nm to about 750 nm, about 700 nm to about 800 nm, or about 750 nm to about 800 nm. In some embodiments, the wavelength of light is in the range of about 400 nm, about 450 nm, about 500 nm, about 550 nm, about 600 nm, about 650 nm, about 700 nm, about 750 nm, or about 800 nm. In some embodiments, the wavelength of light is in the range of at least about 400 nm, about 450 nm, about 500 nm, about 550 nm, about 600 nm, about 650 nm, about 700 nm, or about 750 nm. In some embodiments, the wavelength of light is in the range of at most about 450 nm, about 500 nm, about 550 nm, about 600 nm, about 650 nm, about 700 nm, about 750 nm, or about 800 nm.

In some embodiments, the illumination source is mounted underneath the substrate, such that light collected by the objective lens is transmitted through the field to the objective lens. In other embodiments, the illumination source is mounted above the substrate, such that light collected by the objective lens is reflected by the field to the objective lens.

The optical scanning system can further comprise a dichroic mirror. In an example embodiment, the optical scanning system further comprises an illumination source and a dichroic mirror, where the dichroic mirror is configured and operative at least to: (a) reflect light from the illumination source to illuminate a field of the substrate or a portion thereof; and (b) pass through light that is emitted by the sample and passes through the objective lens.

In some embodiments, the optical scanning system further comprises a splitter. The splitter can be placed along the optical path after the acceleration and velocity tracking mirrors (or single tracking mirror) to split the optical signal comprising the field image to two or more cameras.

The optical scanning system can also comprise a tube lens component positioned in an optical path between the tracking mirror and the objective lens, so that the tracking mirror can be situated at the pupil of the objective lens. Relay lenses or tube lenses may also be used along the optical path at other locations to invert an image or to extend the optical path.

In some embodiments, the optical scanning system comprises a relay lens system used to create a region in the optical path which has all rays nominally parallel and also has a small beam diameter. In some embodiments, scanning optical elements are placed where the optical path has a small beam diameter to ensure that their placement: (i) minimizes power loss, (ii) minimizes image degradation and (iii) minimizes the size of the optical elements so that their mass can be as small as possible. This enables higher scanning frequencies and a lighter weight system.

The use of a relay lens system can facilitate fluorescence-based optical scanning systems that are used for biomolecular detection on a substrate, as these systems typically employ very low light levels with dim fluorescence images. Thus, relay lenses are effective to increase the efficiency and sensitivity of the optical scanning system to keep image acquisition time to a minimum. Further, in some embodiments, illumination intensity must remain below the point where it can damage biomolecules on the substrate.

Figure 8A:
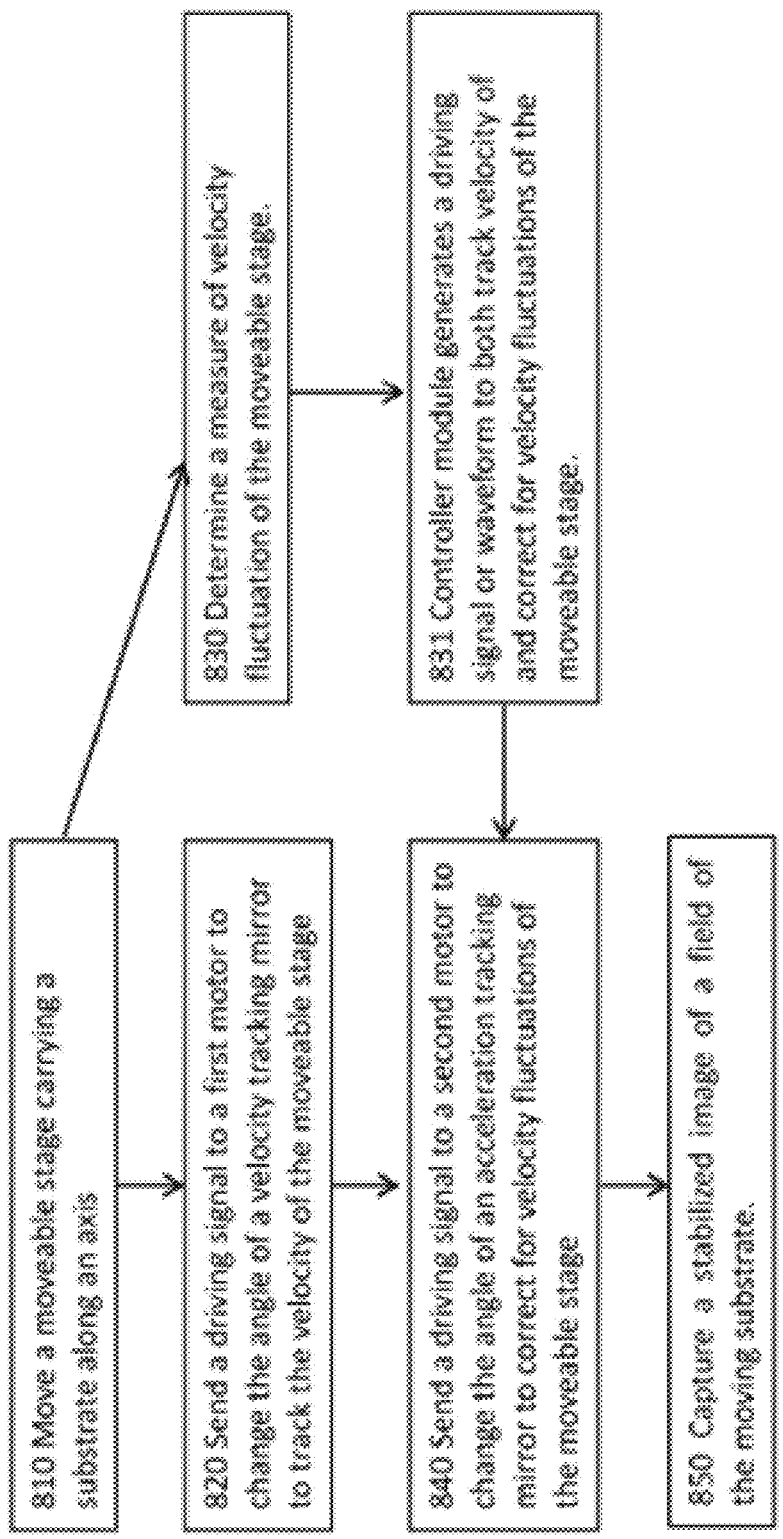
FIG. 8A provides a flowchart of a method of operating a dual tracking mirror embodiment of a device to capture a stabilized image of a field of a moving substrate.

FIG. 8A illustrates an example method for imaging a substrate according to a dual-mirror embodiment. The method in FIG. 8A is not limited to being performed by any particular type of machine or device, and therefore the method description hereinafter is to be regarded in an illustrative rather than a restrictive sense.

In step 810, a moveable stage moves a substrate under an objective lens in a plane that is normal to the optical axis of the objective lens. While the substrate is in motion, in step 820, a servo mechanism (e.g., an electric motor) changes the angle of a velocity tracking mirror to track the velocity of the moving stage during the capture of an image of a field of the substrate. In some aspects, a position processing module that is part of or coupled to, the velocity tracking mirror executes logic that controls the servo mechanism operably connected to the velocity tracking mirror. In step 840 a servo mechanism changes the angle of an acceleration tracking mirror to track velocity fluctuations of the moving stage during the capture of an image of a field of the substrate. In some aspects, a position processing module that is part of or coupled to, the acceleration tracking mirror executes logic that controls the servo mechanism in coordination with the moveable stage. In some embodiments, logic receives feedback control information that represents the movement (e.g., velocity fluctuations) of the moveable stage and uses this information to adjust the input signal to the servo mechanism, which in turn changes the angle of the acceleration tracking mirror, thereby synchronizing the combined motion of the velocity tracking mirror and acceleration tracking mirror with the movement of the moveable stage. In some aspects, this feedback information is received 831 from an linear controller that detects whether there are any nonlinearities in the motion of the moveable stage 830. The logic then uses this information to compute offset corrections and passes the offset corrections as an input signal to a servo mechanism that controls the angle of the acceleration tracking mirror in the optical path between the tracking mirror and the camera. In this manner, by making mirror adjustments to the angle of the acceleration tracking mirror, the logic effectively removes from the image being acquired any errors that are caused by nonlinearities in the motion of the moveable stage.

In step 850, the camera records the still image of the substrate (or a portion thereof) while the substrate is being moved by the moveable stage.

Figure 8B:
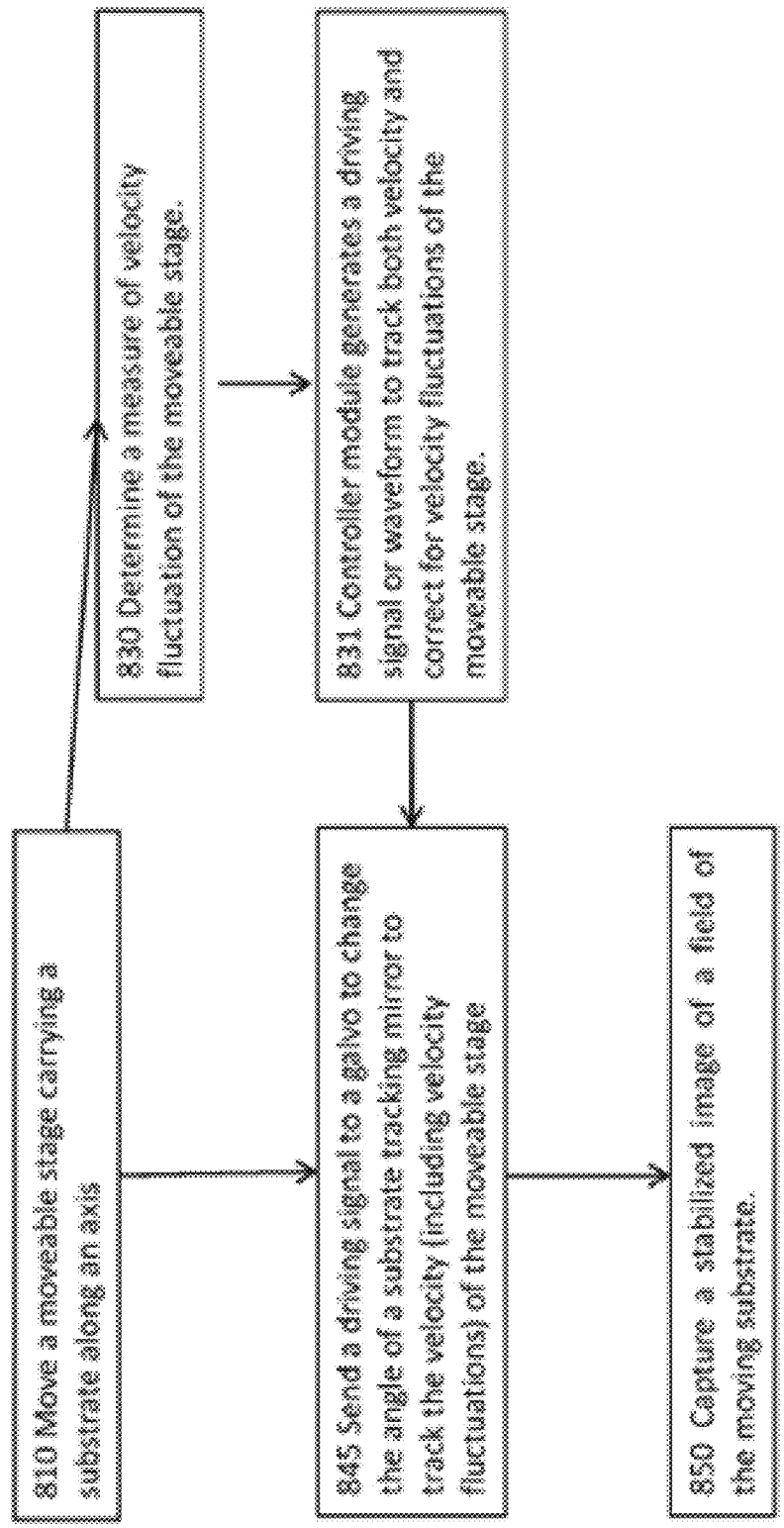
FIG. 8B provides a flowchart of a method of operating a single tracking mirror embodiment of a device to capture a stabilized image of a field of a moving substrate.

FIG. 8B illustrates an example method for imaging a substrate according to a single-mirror embodiment. The method in FIG. 8B is not limited to being performed by any particular type of machine or device, and therefore the method description hereinafter is to be regarded in an illustrative rather than a restrictive sense.

In step 810, a moveable stage moves a substrate under an objective lens in a plane that is normal to the optical axis of the objective lens, where the substrate comprises a multitude of distinct features that are the targets of the imaging.

While the substrate is in motion, in step 845 a servo mechanism changes the angle of a motion tracking mirror to track velocity fluctuations of the moving stage during the capture of an image of a field of the substrate. In some aspects, a position processing module that is part of or coupled to, the motion tracking mirror executes logic that controls the servo mechanism in coordination with the moveable stage. In some embodiments, logic receives feedback control information that represents the movement (e.g., velocity fluctuations) of the moveable stage and uses this information to adjust the input signal to the servo mechanism, which in turn changes the angle of the motion tracking mirror to compensate for velocity fluctuations of the moveable stage. In some embodiments, the position processing module incorporates the velocity fluctuation of the moveable stage into a sawtooth waveform for tracking a predetermined velocity, which is used as a driving signal to control movement of the motion tracking mirror. In some aspect, this feedback information is received 831 from a linear controller that detects whether there are any nonlinearities in the motion of the moveable stage 830. The logic then uses this information to compute offset corrections and passes the offset corrections as an input signal to a servo mechanism that controls the angle of the motion tracking mirror in the optical path. In this manner, by making mirror adjustments to the angle of the motion tracking mirror, the logic effectively removes from the image being acquired any errors that are caused by nonlinearities in the motion of the moveable stage.

In step 850, the camera records the still image of the substrate (or a portion thereof) while the substrate is being moved by the moveable stage.

Optical scanning systems provided herein compensate for stage velocity (or any other imaging of moving components) non-linearities (e.g., local stage accelerations) that would normally result in a blurry image in a device that tracks only stage velocity, but does not have a mechanism to compensate for stage velocity fluctuations. In some embodiments, the optical scanning system is capable of generating stabilized images of a continuously moving substrate or other object at 30 frames per second. In some embodiments, the optical scanning system is capable of generating still images of a continuously moving substrate or other object at from 10 to 30 frames per second. In some embodiments, the optical scanning system is capable of generating still images of a continuously moving substrate or other object at 40 frames per second. In some embodiments, the optical scanning system is capable of generating still images of a continuously moving substrate or other object at more than 30 frames per second, 40 frames per second, 50 frames per second, 60 frames per second, 70 frames per second, 80 frames per second, 90 frames per second, 100 frames per second, 120 frames per second, 150 frames per second or 200 frames per second.

In some embodiments, the stage velocity fluctuation of the optical scanning system is greater than +/−0.5%. In some embodiments, the stage velocity fluctuation of the optical scanning system is greater than +/−0.1%. In some embodiments, the stage velocity fluctuation of the optical scanning system is greater than +/−0.1%, and is reduced to less than +/−0.1% as observed by the camera.

In some embodiments, the stage velocity fluctuation of the optical scanning system is greater than +/−1%. In some embodiments, the stage velocity fluctuation of the optical scanning system is greater than +/−1%, and is reduced to less than +/−1% as observed by the camera.

In some embodiments, the optical scanning system described herein provides an increased sharpness of an image over a system that does not compensate for velocity fluctuations in a continuously moving stage.

In some embodiments, the total distance a substrate moves during the imaging of a field deviates by more than +/−1 pixel (as measured by the image of the substrate projected onto the sensor) from a predetermined movement based on an anticipated velocity during a capture of a field image, while the optical scanning system generates an image with a pixel blur of less than 1. In some embodiments, a pixel is correlated to an area of the field of —150 nm×150 nm. In some embodiments, a pixel is correlated to an area of the field of —162.5 nm×162.5 nm. In some embodiments, a pixel is correlated to an area of the field that is greater than the size of a single fluorophore.

Pixel smear is one measure of image sharpness and refers to an image artifact that results from the movement of a substrate in an optical field with respect to an image sensor. One way to measure pixel smear is by looking at the ratio of the major and minor axes of a single spot, also known as the eccentricity. In some embodiments, the eccentricity of an image generated by the optical scanning system is less than 3. In some embodiments, the eccentricity of the image is reliable single fluorophore detection.

Figure 9A:
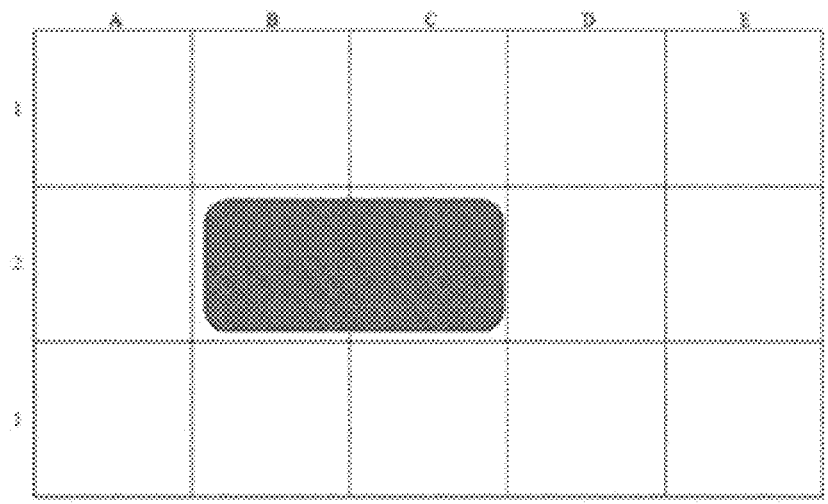
FIGS. 9A and 9B illustrate an example of a pixel smear of an image of +1 and +2 respectively. Each square represents a pixel.
Figure 9B:
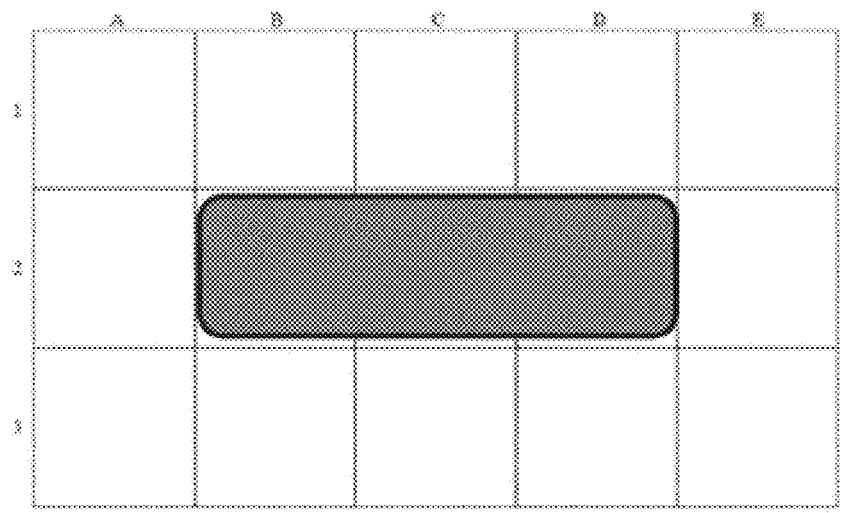

FIGS. 9A and 9B provides an example of pixel smear and eccentricity of a resulting image of a substrate from the optical scanning system provided herein. The blue spot represents a single illuminated fluorophore, and each square is a pixel of ~162 nm. Shown in FIG. 9A is an example of a pixel smear of +1 pixel, within a preferred range of +/−1 pixel, with an eccentricity of 2. Shown in FIG. 9B is an example of a pixel smear of +2 pixels, outside of the preferred range of +/− one pixel, with an eccentricity of 3.

Figure 10:
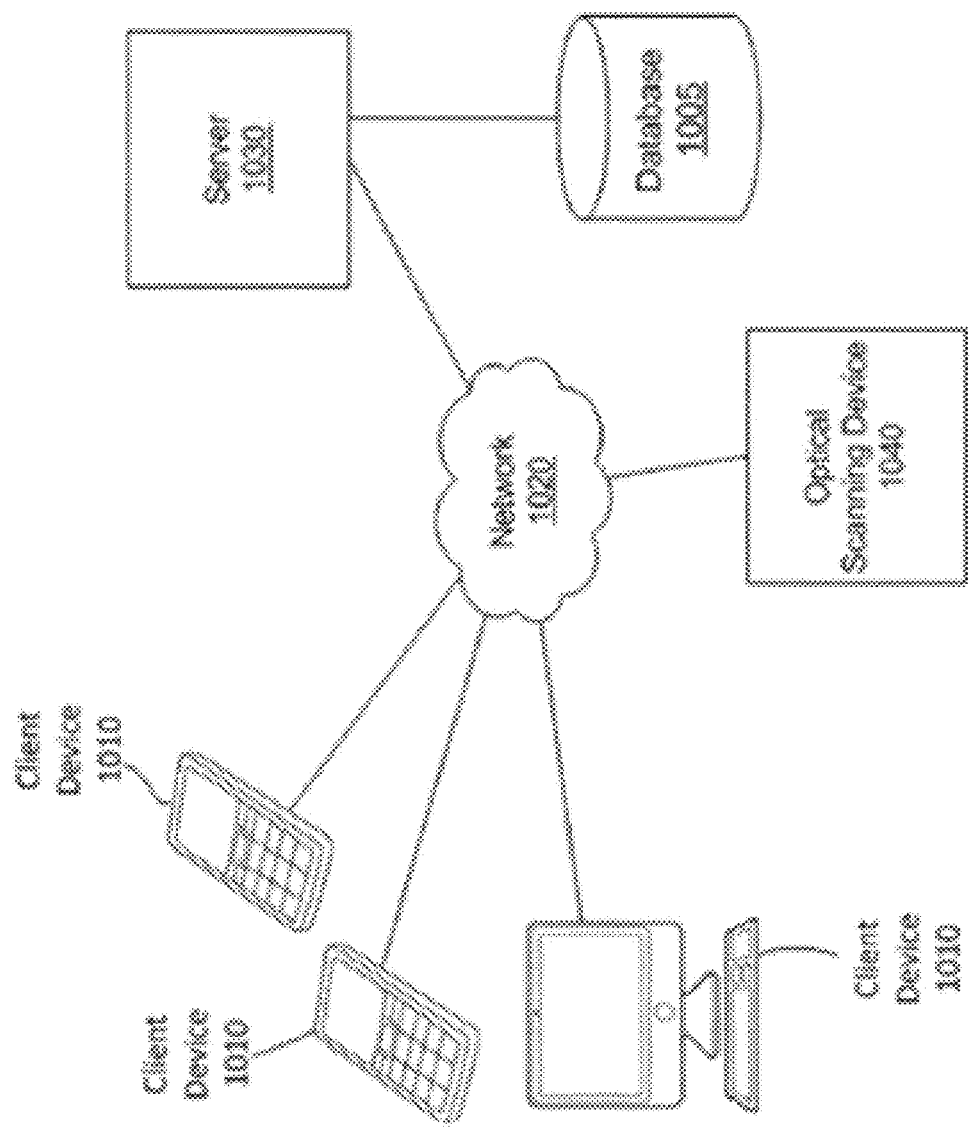
FIG. 10 illustrates an embodiment of the optical scanning system, including components for controlling and storing data from the system.

FIG. 10 illustrates a system environment for transferring information to or from the optical scanning device. The system environment can include one or more client devices 1010, one or more servers 1030, a database 1005 accessible to the server 1030, where all of these parties are connected through a network 1020. In other embodiments, different and/or additional entities can be included in the system environment.

The system environment allows the results from the optical scanning device 1040 to be shared via network 1020 with one or more other users at their client devices 1010. Results can also be uploaded to the web.

The network 1020 facilitates communications between the components of the system environment. The network 1020 may be any wired or wireless local area network (LAN) and/or wide area network (WAN), such as an intranet, an extranet, or the Internet. In various embodiments, the network 1020 uses standard communication technologies and/or protocols. Examples of technologies used by the network 1020 include Ethernet, 802.11, 3G, 4G, 802.16, or any other suitable communication technology. The network 1020 may use wireless, wired, or a combination of wireless and wired communication technologies. Examples of networking protocols used for communicating via the network 1020 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 1020 may be represented using any suitable format, such as hypertext markup language (HTML) or extensible markup language (XML). In some embodiments, all or some of the communication links of the network 1020 may be encrypted using any suitable technique or techniques.

The client device(s) 1010 are computing devices capable of receiving user input as well as transmitting and/or receiving data via the network 1020. In one embodiment, a client device 1010 is a conventional computer system, such as a desktop or laptop computer. Alternatively, a client device 1010 may be a device having computer functionality, such as a personal digital assistant (PDA), a mobile telephone, a smartphone or another suitable device. A client device 1010 is configured to communicate via the network 1020.

In some embodiments, the system environment may include one or more servers, for example where the diagnostic system is includes a service that is managed by an entity that communicates via the network 1020 with the optical scanning device 1040 and/or any of the client devices 1010. The server 1030 can store data in database 1005 and can access stored data in database 1005. The server 1030 may also store data in the cloud. In some embodiments, the server 1030 may occasionally push updates to the optical scanning device 1040, or may receive result data from the optical scanning device 1040 and perform certain analyses on that result data and provide the analyzed data back to the optical scanning device 1040 or to a client device 1010.

In some embodiments, the optical scanning device 1040 functionality can be included in a client device 1010, such as a mobile phone, and can be operated via a mobile application installed on the phone. The mobile application stored on the phone can process the results read from the optical scanning device and share the results with other devices 810 on the network 820.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

Sequencing

Provided herein are systems and methods to facilitate imaging of signals from analytes disposed on a surface with a center-to-center spacing below the diffraction limit—$\lambda/(2*NA)$. These systems and methods use advanced imaging systems to generate high resolution images, and cycled detection to facilitate positional determination of molecules on the substrate with high accuracy and deconvolution of images to obtain signal identity for each molecule on a densely packed surface with high accuracy. These methods and systems allow single molecule sequencing by synthesis on a densely packed substrate to provide highly efficient and very high throughput polynucleotide sequence determination with high accuracy.

The major cost components for sequencing systems are primarily the consumables which include biochip and reagents and secondarily the instrument costs. To reach a $10 30× genome, a 100 fold cost reduction, the amount of data per unit area needs to increase by 100 fold and the amount of reagent per data point needs to drop by 100 fold.

FIG. 11 shows sequencer throughput versus array pitch and outlines a system design which meets the criteria needed for a $10 genome. The basic idea is that to achieve a 100 fold cost reduction, the amount of data per unit area needs to increase by 100 fold and the amount of reagent per data point needs to drop by 100 fold. To achieve these reduction in costs, provided herein are methods and systems that facilitate reliable sequencing of polynucleotides immobilized on the surface of a substrate at a density below the diffraction limit. These high density arrays allow more efficient usage of reagents and increase the amount of data per unit area. In addition, the increase in the reliability of detection allows for a decrease in the number of clonal copies that must be synthesized to identify and correct errors in sequencing and detection, further reducing reagent costs and data processing costs.

High Density Distributions of Analytes on a Surface of a Substrate

Figure 12A:
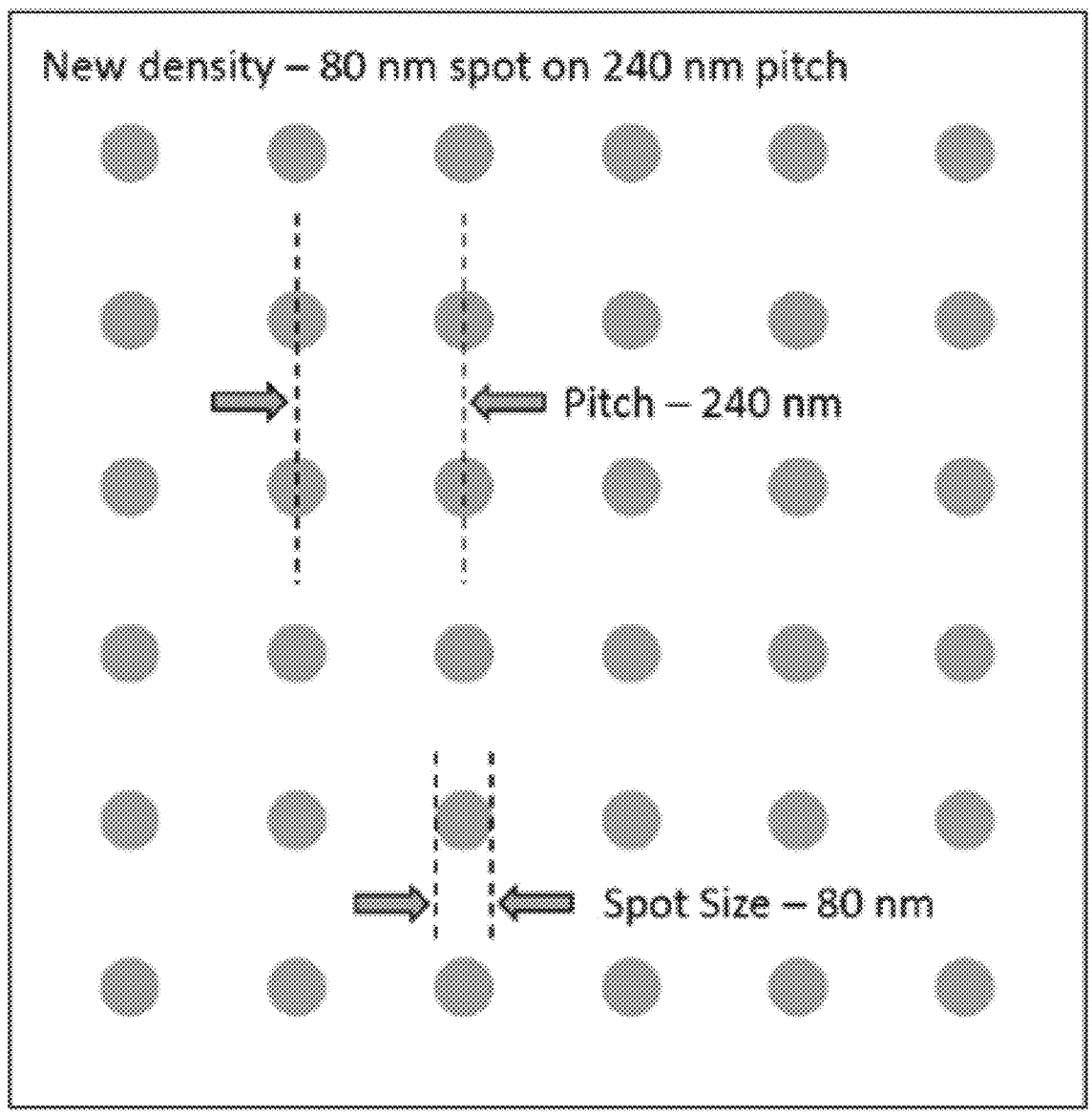
FIG. 12A shows a proposed embodiment of a high-density region of 80 nm diameter binding regions (spots) on a 240 nm pitch for low cost sequencing.

FIG. 12A shows a proposed embodiment of a high-density region of 80 nm diameter binding regions (spots) on a 240 nm pitch. In this embodiment, an ordered array can be used where single-stranded DNA molecule exclusively binds to specified regions on chip. In some embodiments, concatemers (i.e., a long continuous DNA molecule that contains multiple copies of the same DNA sequence linked in series) smaller than 40 kB are used so as to not overfill the spot. The size of the concatemers scales roughly with area, meaning the projected length of the smaller concatemer will be approximate 4 kB to 5 kB resulting in approximately 10 copies if the same amplification process is used. It is also possible to use 4 kB lengths of DNA and sequence single molecules directly. Another option is to bind a shorter segment of DNA with unsequenced filler DNA to bring the total length up to the size needed to create an exclusionary molecule.

Figure 12B:
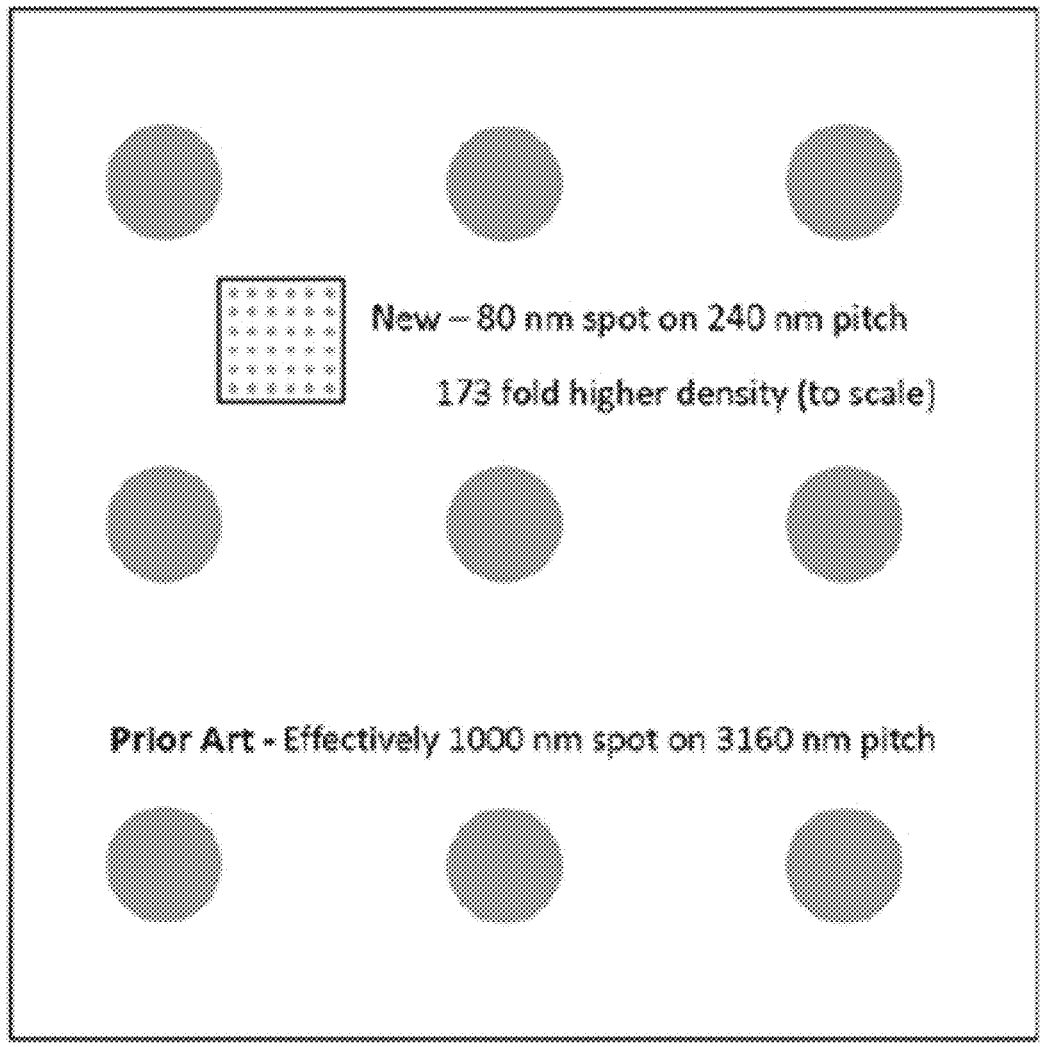
FIG. 12B is a comparison of the proposed substrate density compared to a sample effective density used for a $1,000 genome.

FIG. 12B is a comparison of the proposed pitch compared to a sample effective pitch used for a $1,000 genome. The density of the new array is 170 fold higher, meeting the criteria of achieving 100 fold higher density. The number of copies per imaging spot per unit area also meets the criteria of being at least 100 fold lower than the prior existing platform. This helps ensure that the reagent costs are 100 fold more cost effective than baseline.

Imaging Densely Packed Single Biomolecules and the Diffraction Limit

The primary constraint for increased molecular density for an imaging platform is the diffraction limit. The equation for the diffraction limit of an optical system is:

$D=\lambda/2*NA$ where D is the diffraction limit, $\lambda$ is the wavelength of light, and NA is the numerical aperture of the optical system. Typical air imaging systems have NA's of 0.6 to 0.8. Using $\lambda=600$ nm, the diffraction limit is between 375 nm and 500 nm. For a water immersion system, the NA is ~1.0, giving a diffraction limit of 300 nm.

If features on an array or other substrate surface comprising biomolecules are too close, two optical signals will overlap so substantially so you just see a single blob that cannot be reliably resolved based on the image alone. This can be exacerbated by errors introduced by the optical imaging system, such as blur due to inaccurate tracking of a moving substrate, or optical variations in the light path between the sensor and the surface of a substrate.

The transmitted light or fluorescence emission wavefronts emanating from a point in the specimen plane of the microscope become diffracted at the edges of the objective aperture, effectively spreading the wavefronts to produce an image of the point source that is broadened into a diffraction pattern having a central disk of finite, but larger size than the original point. Therefore, due to diffraction of light, the image of a specimen never perfectly represents the real details present in the specimen because there is a lower limit below which the microscope optical system cannot resolve structural details.

The observation of sub-wavelength structures with microscopes is difficult because of the diffraction limit. A point object in a microscope, such as a fluorescent protein or nucleotide single molecule, generates an image at the intermediate plane that consists of a diffraction pattern created by the action of interference. When highly magnified, the diffraction pattern of the point object is observed to consist of a central spot (diffraction disk) surrounded by a series of diffraction rings. Combined, this point source diffraction pattern is referred to as an Airy disk.

The size of the central spot in the Airy pattern is related to the wavelength of light and the aperture angle of the objective. For a microscope objective, the aperture angle is described by the numerical aperture (NA), which includes the term sin θ, the half angle over which the objective can gather light from the specimen. In terms of resolution, the radius of the diffraction Airy disk in the lateral (x,y) image plane is defined by the following formula: Abbe Resolutionx, y=λ/2NA, where λ is the average wavelength of illumination in transmitted light or the excitation wavelength band in fluorescence. The objective numerical aperture (NA=n·sin(θ)) is defined by the refractive index of the imaging medium (n; usually air, water, glycerin, or oil) multiplied by the sine of the aperture angle (sin(θ)). As a result of this relationship, the size of the spot created by a point source decreases with decreasing wavelength and increasing numerical aperture, but always remains a disk of finite diameter. The Abbe resolution (i.e., Abbe limit) is also referred to herein as the diffraction limit and defines the resolution limit of the optical system.

If the distance between the two Airy disks or point-spread functions is greater than this value, the two point sources are considered to be resolved (and can readily be distinguished). Otherwise, the Airy disks merge together and are considered not to be resolved.

Thus, light emitted from a single molecule detectable label point source with wavelength λ, traveling in a medium with refractive index n and converging to a spot with half-angle θ will make a diffraction limited spot with a diameter: d=λ/2*NA. Considering green light around 500 nm and a NA (Numerical Aperture) of 1, the diffraction limit is roughly d=λ/2=250 nm (0.25 µm), which limits the density of analytes such as single molecule proteins and nucleotides on a surface able to be imaged by conventional imaging techniques. Even in cases where an optical microscope is equipped with the highest available quality of lens elements, is perfectly aligned, and has the highest numerical aperture, the resolution remains limited to approximately half the wavelength of light in the best case scenario. To increase the resolution, shorter wavelengths can be used such as UV and X-ray microscopes. These techniques offer better resolution but are expensive, suffer from lack of contrast in biological samples and may damage the sample.

Deconvolution

Deconvolution is an algorithm-based process used to reverse the effects of convolution on recorded data. The concept of deconvolution is widely used in the techniques of signal processing and image processing. Because these techniques are in turn widely used in many scientific and engineering disciplines, deconvolution finds many applications.

In optics and imaging, the term "deconvolution" is specifically used to refer to the process of reversing the optical distortion that takes place in an optical microscope, electron microscope, telescope, or other imaging instrument, thus creating clearer images. It is usually done in the digital domain by a software algorithm, as part of a suite of microscope image processing techniques.

The usual method is to assume that the optical path through the instrument is optically perfect, convolved with a point spread function (PSF), that is, a mathematical function that describes the distortion in terms of the pathway a theoretical point source of light (or other waves) takes through the instrument. Usually, such a point source contributes a small area of fuzziness to the final image. If this function can be determined, it is then a matter of computing its inverse or complementary function, and convolving the acquired image with that. Deconvolution maps to division in the Fourier co-domain. This allows deconvolution to be easily applied with experimental data that are subject to a Fourier transform. An example is NMR spectroscopy where the data are recorded in the time domain, but analyzed in the frequency domain. Division of the time-domain data by an exponential function has the effect of reducing the width of Lorenzian lines in the frequency domain. The result is the original, undistorted image.

However, for diffraction limited imaging, deconvolution is also needed to further refine the signals to improve resolution beyond the diffraction limit, even if the point spread function is perfectly known. It is very hard to separate two objects reliably at distances smaller than the Nyquist distance. However, described herein are methods and systems using cycled detection, analyte position determination, alignment, and deconvolution to reliably detect objects separated by distances much smaller than the Nyquist distance.

Sequencing

Optical detection imaging systems are diffraction-limited, and thus have a theoretical maximum resolution of ~300 nm with fluorophores typically used in sequencing. To date, the best sequencing Systems have had center-to-center spacings between adjacent polynucleotides of ~600 nm on their arrays, or ~2× the diffraction limit. This factor of 2× is needed to account for intensity, array & biology variations that can result in errors in position. In order to achieve a $10 genome, an approximately 200 nm center to center spacing is required, which requires sub-diffraction-limited imaging capability.

For sequencing, the purpose of the system and methods described herein are to resolve polynucleotides that are sequenced on a substrate with a center-to-center spacing below the diffraction limit of the optical system.

As described herein, we provide methods and systems to achieve sub-diffraction-limited imaging in part by identifying a position of each analyte with a high accuracy (e.g., 10 nm RMS or less). By comparison, state of the art Super Resolution systems (Harvard/STORM) can only identify location with an accuracy down to 20 nm RMS, 2× worse than this system. Thus, the methods and system disclosed herein enable sub-diffraction limited-imaging to identify densely-packed molecules on a substrate to achieve a high data rate per unit of enzyme, data rate per unit of time, and high data accuracy to achieve a $10 genome. These sub-diffraction limited imaging techniques are broadly applicable to techniques using cycled detection as described herein.

Imaging and Cycled Detection

As described herein, each of the detection methods and systems required cycled detection to achieve sub-diffraction limited imaging. Cycled detection includes the binding and imaging or probes, such as antibodies or nucleotides, bound to detectable labels that are capable of emitting a visible light optical signal. By using positional information from a series of images of a field from different cycles, deconvolution to resolve signals from densely packed substrates can be used effectively to identify individual optical signals from signals obscured due to the diffraction limit of optical imaging. After multiple cycles the precise location of the molecule will become increasingly more accurate. Using this information additional calculations can be performed to aid in crosstalk correction regarding known asymmetries in the crosstalk matrix occurring due to pixel discretization effects.

Methods and systems using cycled probe binding and optical detection are described in US Publication No. 2015/0330974, Digital Analysis of Molecular Analytes Using Single Molecule Detection, published Nov. 19, 2015, incorporated herein by reference in its entirety.

In some embodiments, the raw images are obtained using sampling that is at least at the Nyquist limit to facilitate more accurate determination of the oversampled image. Increasing the number of pixels used to represent the image by sampling in excess of the Nyquist limit (oversampling) increases the pixel data available for image processing and display.

Theoretically, a bandwidth-limited signal can be perfectly reconstructed if sampled at the Nyquist rate or above it. The Nyquist rate is defined as twice the highest frequency component in the signal. Oversampling improves resolution, reduces noise and helps avoid aliasing and phase distortion by relaxing anti-aliasing filter performance requirements. A signal is said to be oversampled by a factor of N if it is sampled at N times the Nyquist rate.

Thus, in some embodiments, each image is taken with a pixel size no more than half the wavelength of light being observed. In some embodiments, a pixel size of 162.5 nm×162.5 nm is used in detection to achieve sampling at or above the Nyquist limit. Sampling at a frequency of at least the Nyquist limit during raw imaging of the substrate is preferred to optimize the resolution of the system or methods described herein. This can be done in conjunction with the deconvolution methods and optical systems described herein to resolve features on a substrate below the diffraction limit with high accuracy.

Processing Images from Different Cycles

There are several barriers overcome by the present invention to achieve sub-diffraction limited imaging.

Pixelation error is present in raw images and prevents identification of information present from the optical signals due to pixelation. Sampling at least at the Nyquist frequency and generation of an oversampled image as described herein each assist in overcoming pixilation error.

The point-spread (PSF) of various molecules overlap because the PSF size is greater than the pixel size (below Nyquist) and because the center-to-center spacing is so small that crosstalk due to spatial overlap occurs. Nearest neighbor variable regression (for center-to center crosstalk) can be used to help with deconvolution of multiple overlapping optical signals. But this can be improved if we know the relative location of each analyte on the substrate and have good alignment of images of a field.

After multiple cycles the precise location of the molecule will become increasingly more accurate. Using this information additional calculations can be performed to aid in deconvolution by correcting for known asymmetries in the spatial overlap of optical signals occurring due to pixel discretization effects and the diffraction limit. They can also be used to correct for overlap in emission spectrum from different emission spectrum.

Highly accurate relative positional information for each analyte can be achieved by overlaying images of the same field from different cycles to generate a distribution of measured peaks from optical signals of different probes bound to each analyte. This distribution can then be used to generate a peak signal that corresponds to a single relative location of the analyte. Images from a subset of cycles can be used to generate relative location information for each analyte. In some embodiments, this relative position information is provided in a localization file.

The specific area imaged for a field for each cycle may vary from cycle to cycle. Thus, to improve the accuracy of identification of analyte position for each image, an alignment between images of a field across multiple cycles can be performed. From this alignment, offset information compared to a reference file can then be identified and incorporated into the deconvolution algorithms to further increase the accuracy of deconvolution and signal identification for optical signals obscured due to the diffraction limit. In some embodiments, this information is provided in a Field Alignment File.

Signal Detection (Cross-Talk/Nearest Neighbor)

Once relative positional information is accurately determined for analytes on a substrate and field images from each cycle are aligned with this positional information, analysis of each oversampled image using crosstalk and nearest neighbor regression can be used to accurately identify an optical signal from each analyte in each image.

In some embodiments, a plurality of optical signals obscured by the diffraction limit of the optical system are identified for each of a plurality of biomolecules immobilized on a substrate and bound to probes comprising a detectable label. In some embodiments, the probes are incorporated nucleotides and the series of cycles is used to determine a sequence of a polynucleotide immobilized on the array using single molecule sequencing by synthesis.

Simulations of Deconvolution Applied to Images

Figure 13:
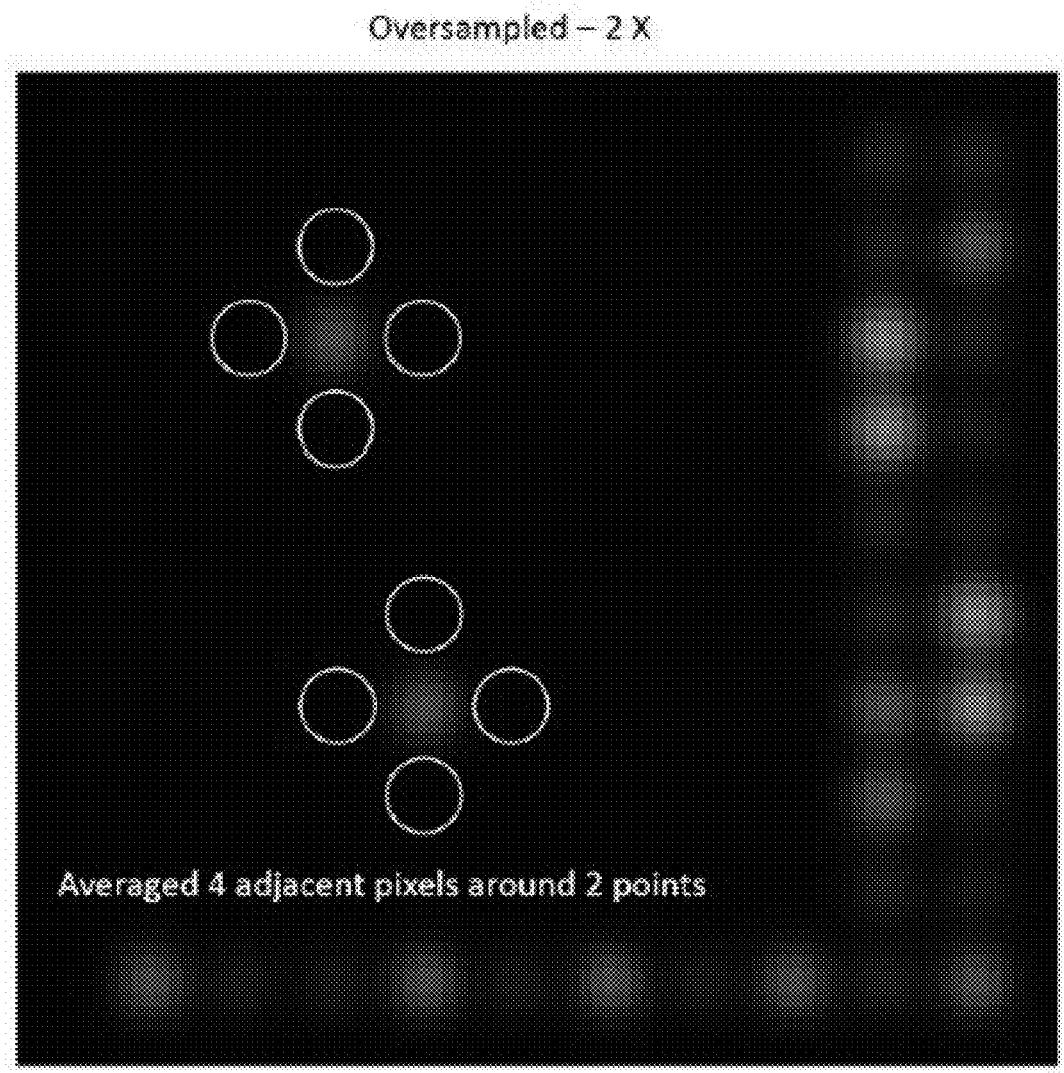
FIG. 13 shows crosstalk calculations for simulated single molecules on a 600 nm pitch processed with a 2× filter.

Molecular densities are limited by crosstalk from neighboring molecules. FIG. 13 depicts simulated images of single molecules. This particular image is a simulation of a single molecule array on a 600 nm pitch that has been processed with a 2× oversampled filter. Crosstalk into eight adjacent spots is averaged as a function of array pitch and algorithm type.

Figure 14:
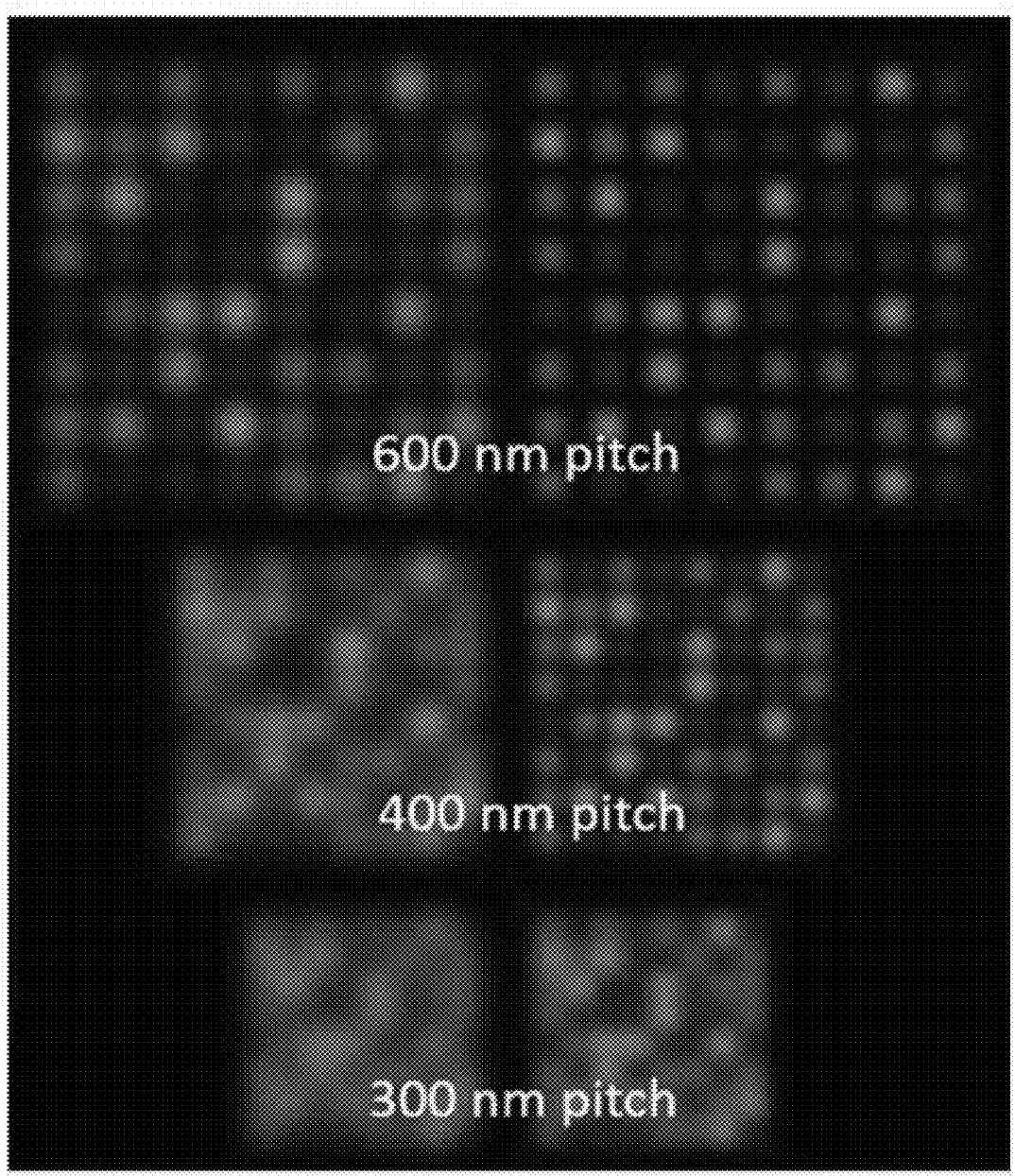
FIG. 14 shows Oversampled 2× (left) vs. Oversampled 4× and Deconvolved (right) simulations of images of detection of single molecule analytes on a substrate at center-to-center distances of 600 nm, 400 nm, and 300 nm.
Figure 15:
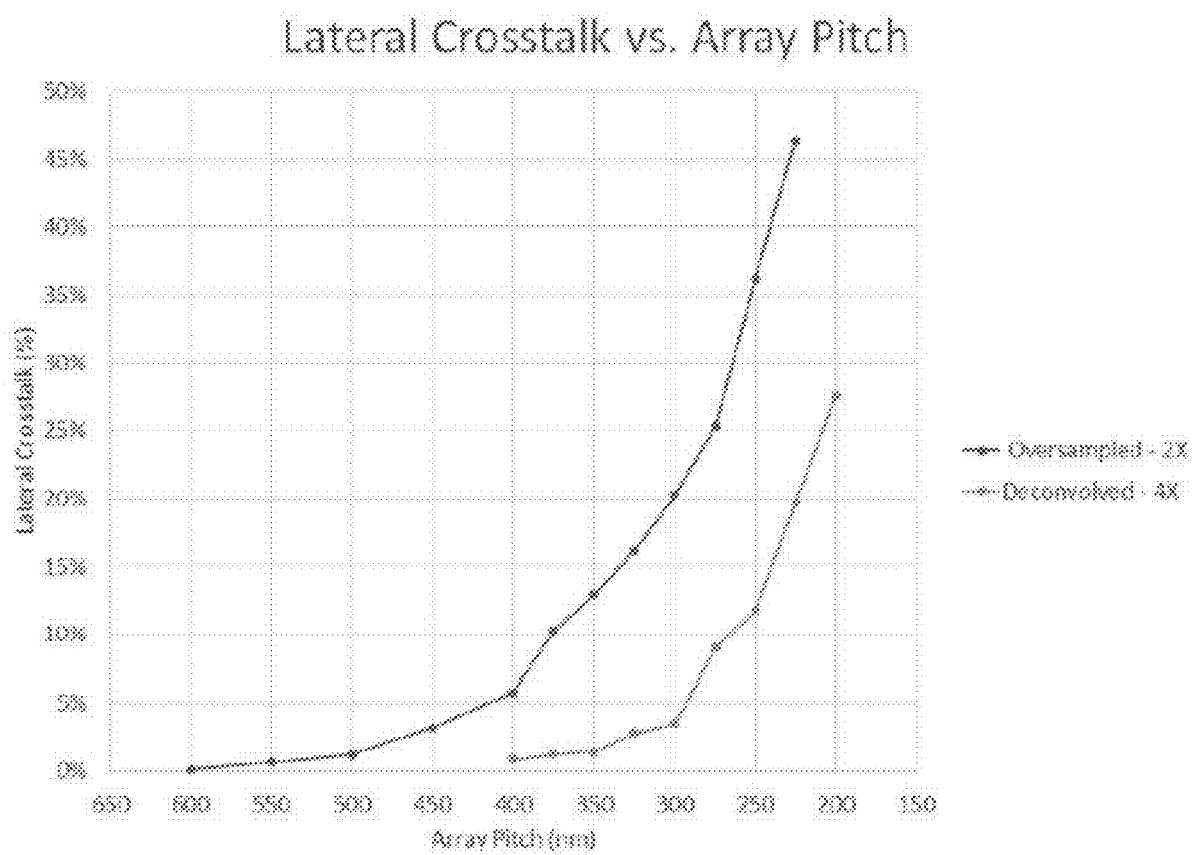
FIG. 15 shows a plot of crosstalk between adjacent spots at different center-to-center distances between single analytes (array pitch (nm)) processed using Oversampled 2× vs. Oversampled 4× and Deconvolved simulations.

FIG. 14 is a series of images processed with multiple pitches and two variations of image processing algorithms, the first is a 2× oversampled image and the second is a 4× oversampled image with deconvolution, as described herein. FIG. 15 is the crosstalk analysis of these two types of image processing at pitches down to 200 nm. Acceptable crosstalk levels at or below 25% with 2× oversample occurs for pitches at or above 275 nm. Acceptable crosstalk levels at or below 25% with 4× deconvolution using the point spread function of the optical system occurs for pitches at or above 210 nm.

The physical size of the molecule will broaden the spot roughly half the size of the binding area. For example, for an 80 nm spot the pitch will be increased by roughly 40 nm. Smaller spot sizes may be used, but this will have the trade-off that fewer copies will be allowed and greater illumination intensity will be required. A single copy provides the simplest sample preparation but requires the greatest illumination intensity.

Methods for sub-diffraction limit imaging discussed to this point involve image processing techniques of oversampling, deconvolution and crosstalk correction. Described herein are methods and systems that incorporate determination of the precise relative location analytes on the substrate using information from multiple cycles of probe optical signal imaging for the analytes. Using this information additional calculations can be performed to aid in crosstalk correction regarding known asymmetries in the crosstalk matrix occurring due to pixel discretization effects.

Methods

Figure 16:
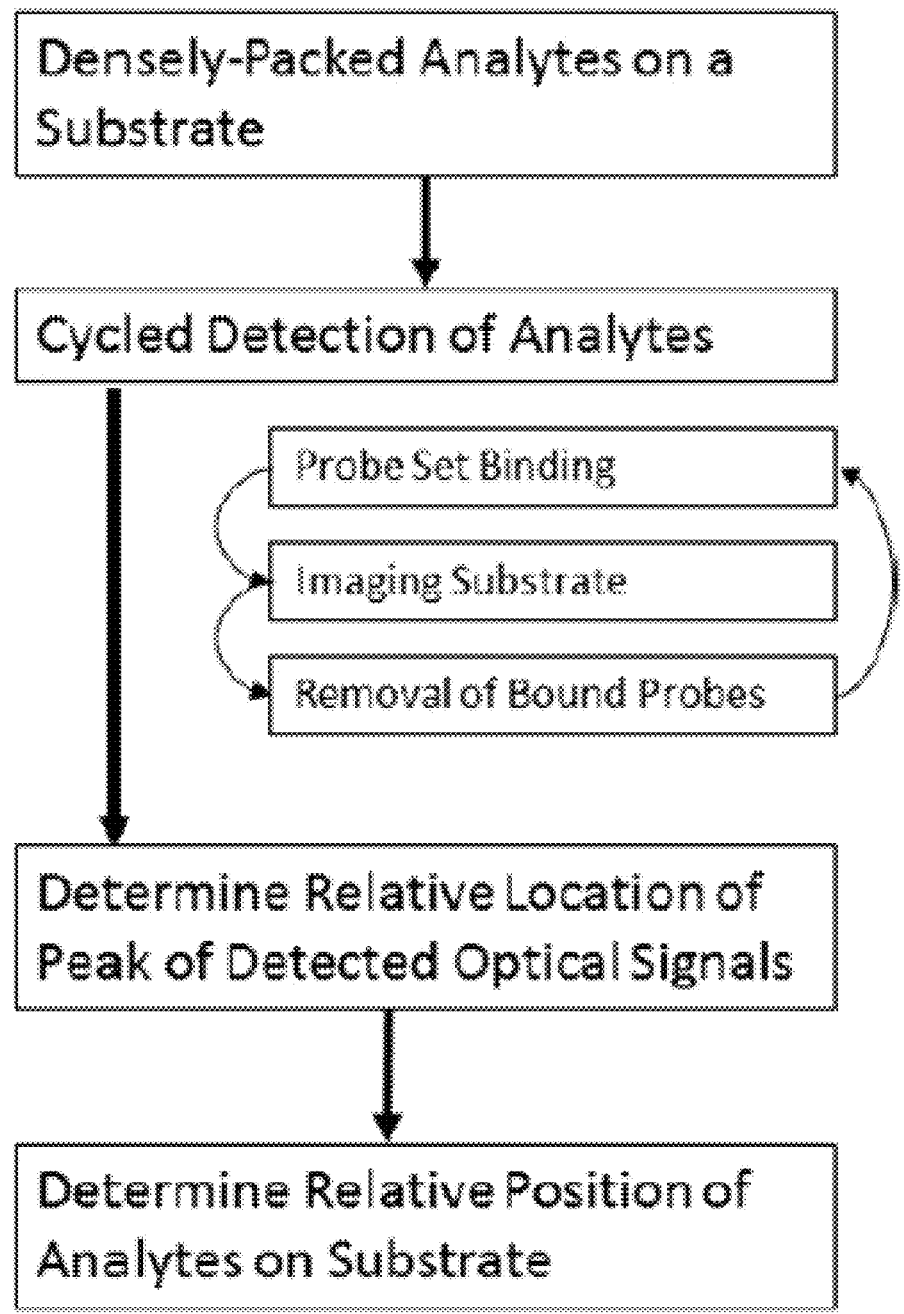
FIG. 16 depicts a flowchart for a method of determining the relative positions of analytes on a substrate with high accuracy, according to an embodiment of the invention.

In some embodiments, as shown in FIG. 16, provided herein is a method for accurately determining a relative position of analytes immobilized on the surface of a densely packed substrate. The method includes first providing a substrate comprising a surface, wherein the surface comprises a plurality of analytes immobilized on the surface at discrete locations. Then, a plurality of cycles of probe binding and signal detection on said surface is performed. Each cycle of detection includes contacting the analytes with a probe set capable of binding to target analytes immobilized on the surface, imaging a field of said surface with an optical system to detect a plurality of optical signals from individual probes bound to said analytes at discrete locations on said surface, and removing bound probes if another cycle of detection is to be performed. From each image, a peak location from each of said plurality of optical signals from images of said field from at least two of said plurality of cycles is detected. The location of peaks for each analyte is overlaid, generating a cluster of peaks from which an accurate relative location of each analyte on the substrate is then determined.

Figure 17:
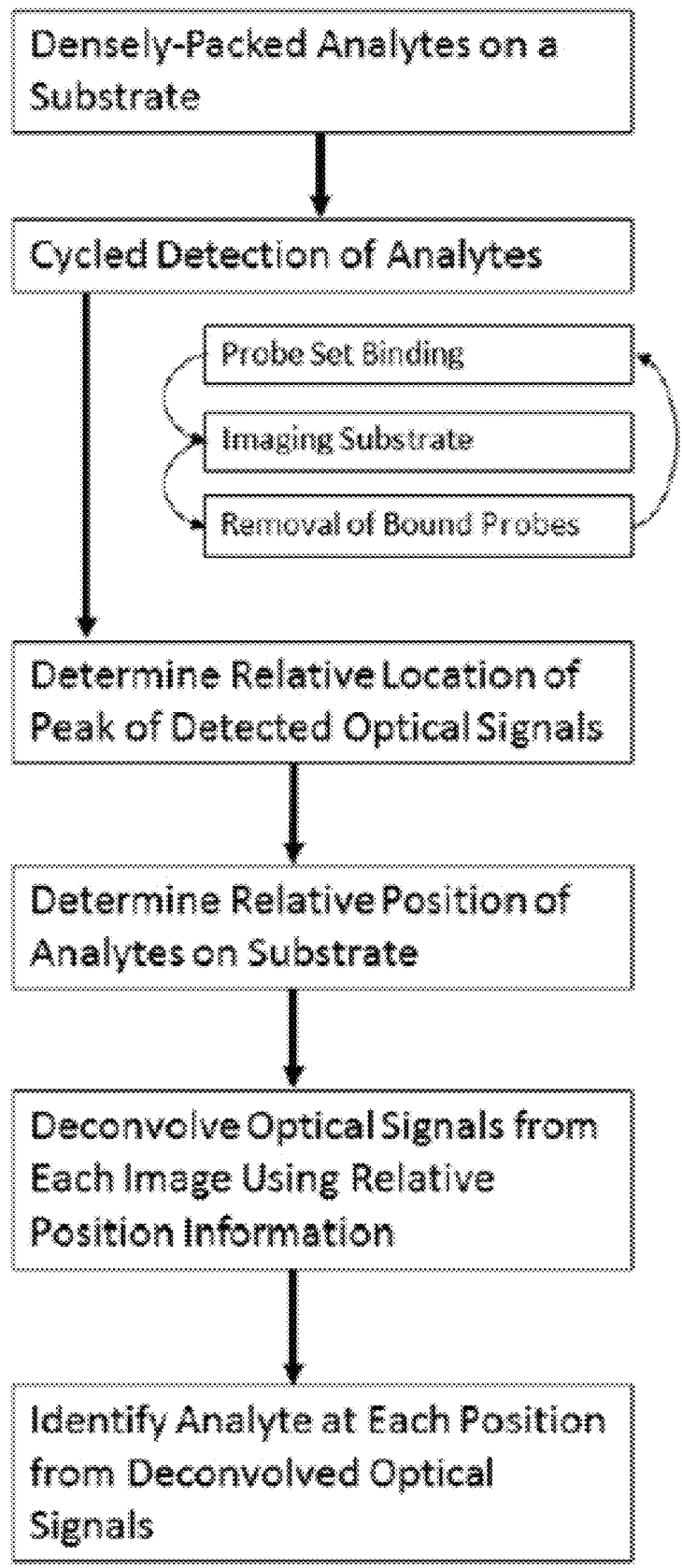
FIG. 17 depicts a flowchart for a method of identifying individual analytes from deconvolved optical signals detected from a substrate, according to an embodiment of the invention.

In some embodiments, as shown in FIG. 17, the accurate position information for analytes on the substrate is then used in a deconvolution algorithm incorporating position information (e.g., for identifying center-to-center spacing between neighboring analytes on the substrate) can be applied to the image to deconvolve overlapping optical signals from each of said images. In some embodiments, the deconvolution algorithm includes nearest neighbor variable regression for spatial discrimination between neighboring analytes with overlapping optical signals.

Figure 18:
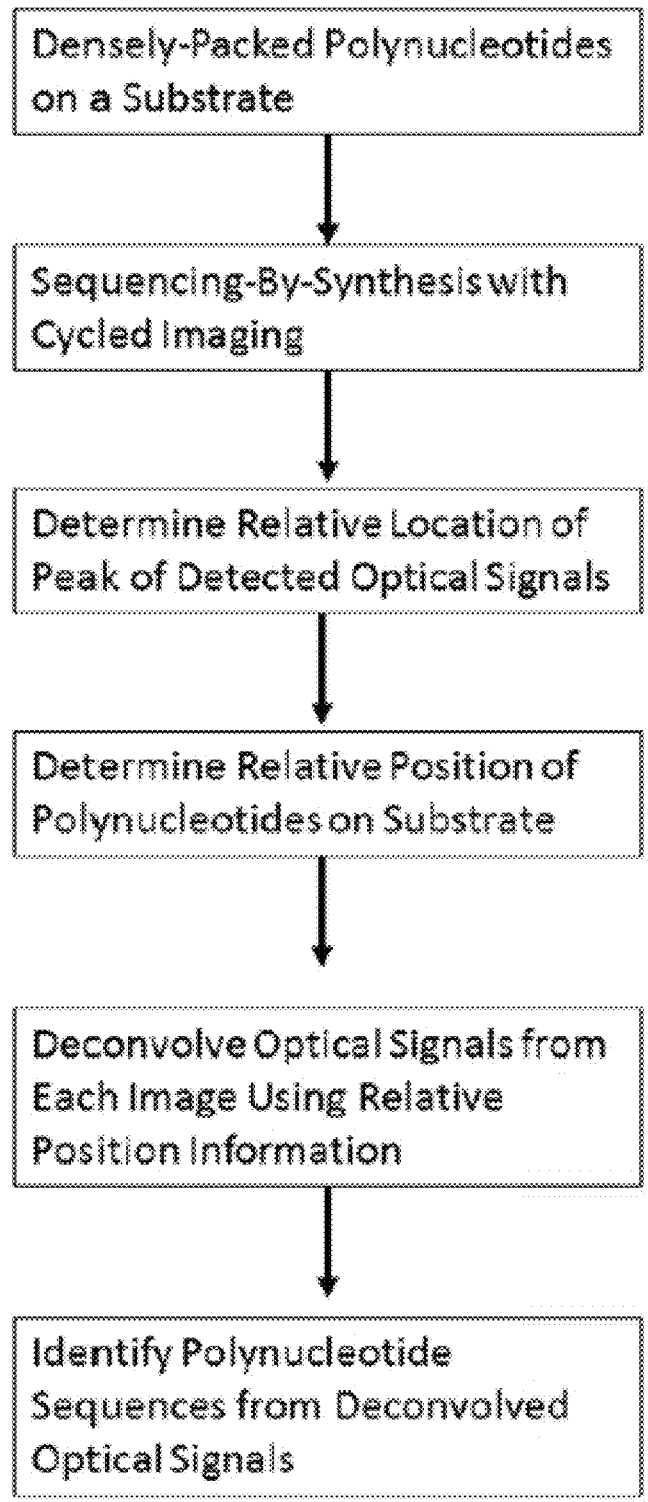
FIG. 18 depicts a flowchart for a method of sequencing polynucleotides immobilized on a substrate, according to an embodiment of the invention.

In some embodiments, as shown in FIG. 18, the method of analyte detection is applied for sequencing of individual polynucleotides immobilized on a substrate.

Figure 19:
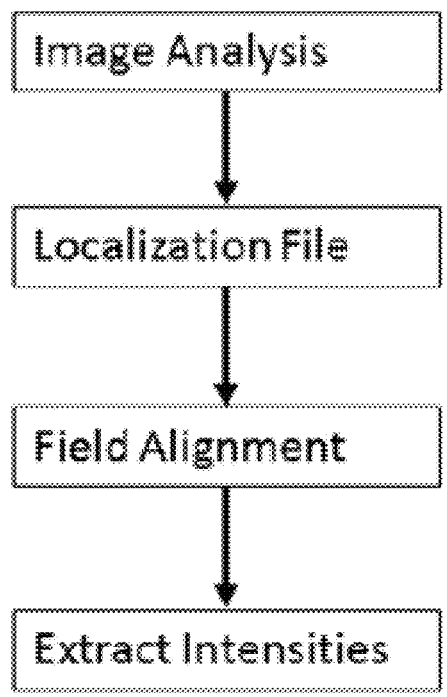
FIG. 19 shows an overview of steps in an optical signal detection process from cycled detection, according to an embodiment of the invention.

In some embodiments, optical signals are deconvolved from densely packed substrates as shown in FIG. 11. The steps can be divided into four different sections as shown in FIG. 19: 1) Image Analysis, which includes generation of oversampled images from each image of a field for each cycle, and generation of a peak file (i.e., a data set) including peak location and intensity for each detected optical signal in an image. 2) Generation of a Localization File, which includes alignment of multiple peaks generated from the multiple cycles of optical signal detection for each analyte to determining an accurate relative location of the analyte on the substrate. 3) Generation of a Field Alignment file, which includes offset information for each image to align images of the field from different cycles of detection with respect to a selected reference image. 4) Extract Intensities, which uses the offset information and location information in conjunction with deconvolution modeling to determine an accurate identity of signals detected from each oversampled image. The "Extract Intensities" step can also include other error correction, such as previous cycle regression used to correct for errors in sequencing by synthesis processing and detection. The steps performed in each section are described in further detail below.

Figures 20A, 20B:
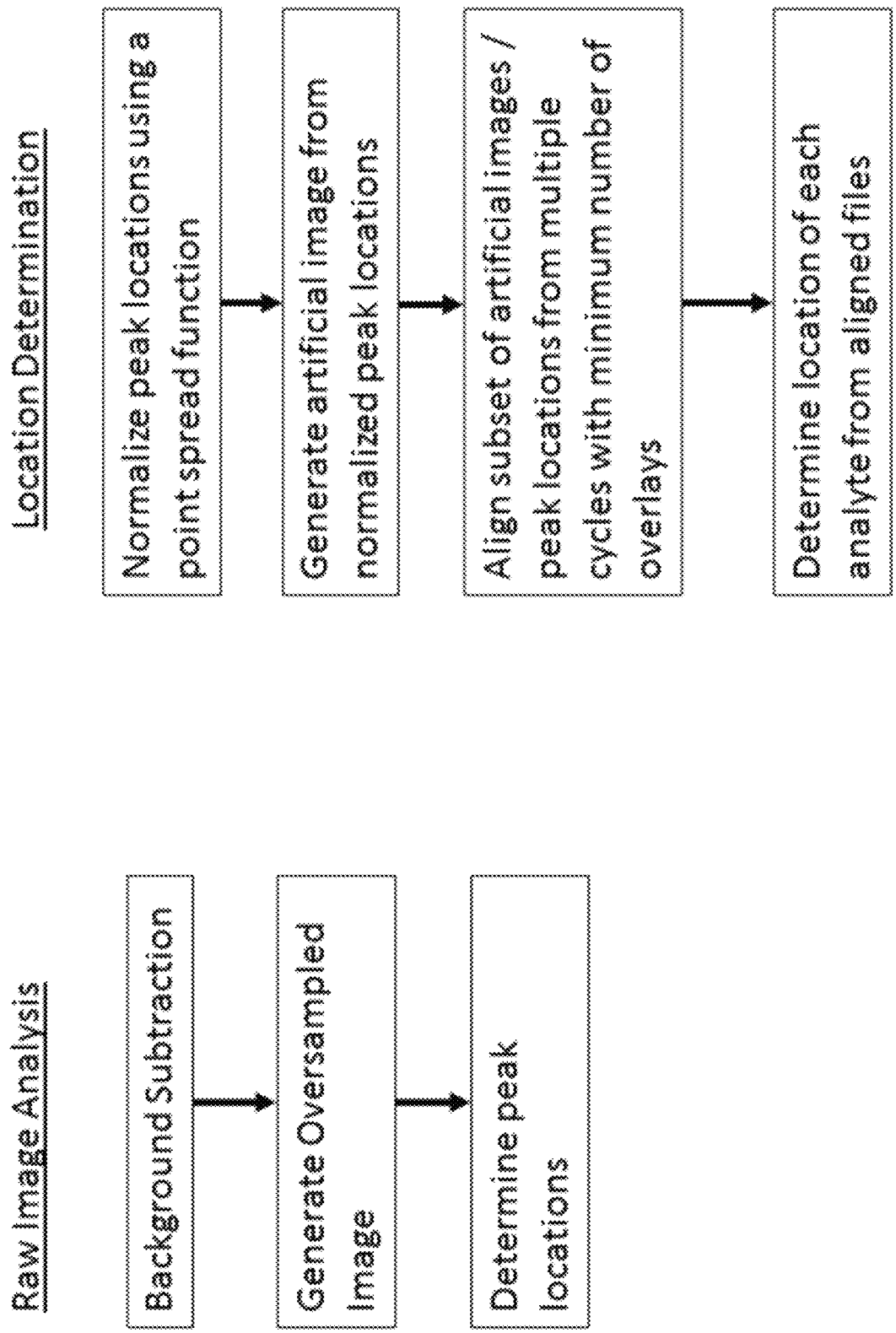
FIG. 20A shows a flowchart of steps for initial raw image analysis, according to an embodiment of the invention.
FIG. 20B shows a flowchart of steps for location determination from optical signal peak information from a plurality of cycles, according to an embodiment of the invention.
Figure 21:
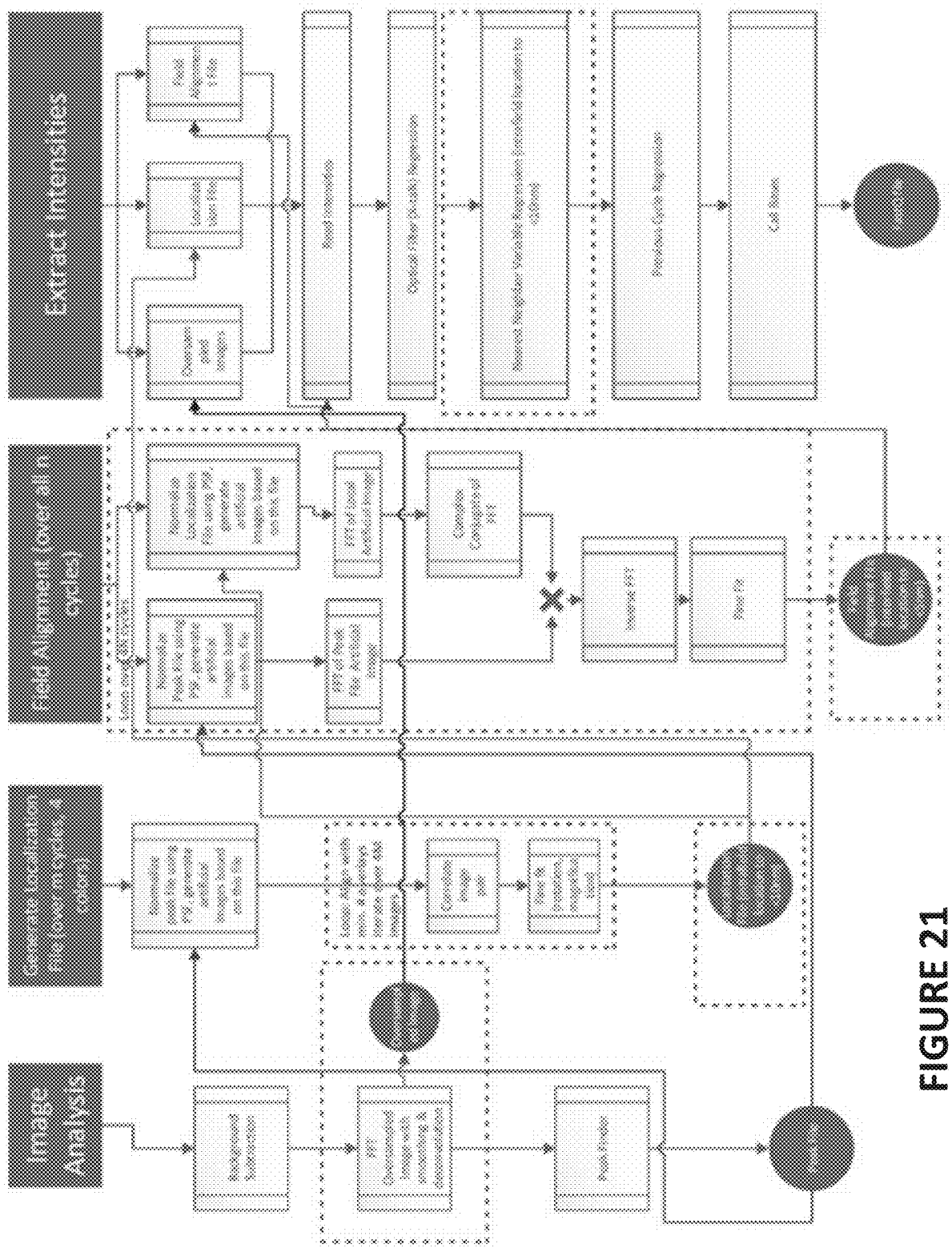
FIG. 21 depicts a detailed flowchart of steps for an optical signal detection and deconvolution process for images from cycled detection of a densely-packed substrate, according to an embodiment of the invention.

Under the image analysis steps shown in FIG. 20A and FIG. 21, the images of each field from each cycle are processed to increase the number of pixels for each detected signal, sharpen the peaks for each signal, and identify peak intensities form each signal. This information is used to generate a peak file for each field for each cycle that includes a measure of the position of each analyte (from the peak of the observed optical signal), and the intensity, from the peak intensity from each signal. In some embodiments, the image from each field first undergoes background subtraction to perform an initial removal of noise from the image. Then, the images are processed using smoothing and deconvolution to generate an oversampled image, which includes artificially generated pixels based on modeling of the signal observed in each image. In some embodiments, the oversampled image can generate 4 pixels, 9 pixels, or 16 pixels from each pixel from the raw image.

Peaks from optical signals detected in each raw image or present in the oversampled image are then identified and intensity and position information for each detected analyte is placed into a peak file for further processing.

In some embodiments, N raw images corresponding to all images detected from each cycle and each field of a substrate or output into N oversampled images and N peak files for each imaged field. The peak file comprises a relative position of each detected analyte for each image. In some embodiments, the peak file also comprises intensity information for each detected analyte. In some embodiments, one peak file is generated for each color and each field in each cycle. In some embodiments, each cycle further comprises multiple passes, such that one peak file can be generated for each color and each field for each pass in each cycle. In some embodiments, the peak file specifies peak locations from optical signals within a single field.

In preferred embodiments, the peak file includes XY position information from each processed oversampled image of a field for each cycle. The XY position information comprises estimated coordinates of the locations of each detected detectable label from a probe (such as a fluorophore) from the oversampled image. The peak file can also include intensity information from the signal from each individual detectable label.

Generation of an oversampled image is used to overcome pixelation error to identify information present that cannot be extracted due to pixelation. Initial processing of the raw image by smoothing and deconvolution helps to provide more accurate information in the peak files so that the position of each analyte can be determined with higher accuracy, and this information subsequently can be used to provide a more accurate determination of signals obscured in diffraction limited imaging.

In some embodiments, the raw images are obtained using sampling that is at least at the Nyquist limit to facilitate more accurate determination of the oversampled image. Increasing the number of pixels used to represent the image by sampling in excess of the Nyquist limit (oversampling) increases the pixel data available for image processing and display.

Theoretically, a bandwidth-limited signal can be perfectly reconstructed if sampled at the Nyquist rate or above it. The Nyquist rate is defined as twice the highest frequency component in the signal. Oversampling improves resolution, reduces noise and helps avoid aliasing and phase distortion by relaxing anti-aliasing filter performance requirements. A signal is said to be oversampled by a factor of N if it is sampled at N times the Nyquist rate.

Thus, in some embodiments, each image is taken with a pixel size no more than half the wavelength of light being observed. In some embodiments, a pixel size of 162.5 nm×162.5 nm is used in detection to achieve sampling at or above the Nyquist limit.

Smoothing uses an approximating function capture important patterns in the data, while leaving out noise or other fine-scale structures/rapid phenomena. In smoothing, the data points of a signal are modified so individual points are reduced, and points that are lower than the adjacent points are increased leading to a smoother signal. Smoothing is used herein to smooth the diffraction limited optical signal detected in each image to better identify peaks and intensities from the signal.

Although each raw image is diffraction limited, described herein are methods that result in collection of multiple signals from the same analyte from different cycles. An embodiment of this method is shown in the flowchart in FIG. 20B. These multiple signals from each analyte are used to determine a position much more accurate than the diffraction limited signal from each individual image. They can be used to identify molecules within a field at a resolution of less than 5 nm. This information is then stored as a localization file, as shown in FIG. 21. The highly accurate position information can then be used to greatly improve signal identification from each individual field image in combination with deconvolution algorithms, such as cross-talk regression and nearest neighbor variable regression.

As shown in FIG. 21, the steps for generating a localization file use the location information provided in the peak files to determine relative positions of a set of analytes on the substrate. In some embodiments, each localization file contains relative positions from sets of analytes from a single imaged field of the substrate. The localization file combines position information from multiple cycles to generate highly accurate position information for detected analytes below the diffraction limit.

In some embodiments, the relative position information for each analyte is determined on average to less than a 10 nm standard deviation (i.e., RMS, or root mean square). In some embodiments, the relative position information for each analyte is determined on average to less than a 10 nm 2× standard deviation. In some embodiments, the relative position information for each analyte is determined on average to less than a 10 nm 3× standard deviation. In some embodiments, the relative position information for each analyte is determined to less than a 10 nm median standard deviation. In some embodiments, the relative position information for each analyte is determined to less than a 10 nm median 2× standard deviation. In some embodiments, the relative position information for each analyte is determined to less than a 10 nm median 3× standard deviation.

From a subset of peak files for a field from different cycles, a localization file is generated to determine a location of analytes on the array. As shown in FIG. 21, in some embodiments, a peak file is first normalized using a point spread function to account for aberrations in the optical system. The normalized peak file can be used to generate an artificial normalized image based on the location and intensity information provided in the peak file. Each image is then aligned. In some embodiments, the alignment can be performed by correlating each image pair and performing a fine fit. Once aligned, position information for each analyte from each cycle can then be overlaid to provide a distribution of position measurements on the substrate. This distribution is used to determine a single peak position that provides a highly accurate relative position of the analyte on the substrate. In some embodiments, a Poisson distribution is applied to the overlaid positions for each analyte to determine a single peak.

The peaks determined from at least a subset of position information from the cycles are then recorded in a localization file, which comprises a measure of the relative position of each detected analyte with an accuracy below the diffraction limit. As described, images from only subset of cycles are needed to determine this information.

As shown in FIG. 21, a normalized peak file from each field for each cycle and color and the normalized localization file can be used to generate offset information for each image from a field relative to a reference image of the field. This offset information can be used to improve the accuracy of the relative position determination of the analyte in each raw image for further improvements in signal identification from a densely packed substrate and a diffraction limited image. In some embodiments, this offset information is stored as a field alignment file. In some embodiments, the position information of each analyte in a field from the combined localization file and field alignment file is less than 10 nm RMS, less than 5 nm RMS, or less than 2 nm RMS.

In some embodiments, a field alignment file is generated by alignment of images from a single field by determining offset information relative to a master file from the field. One field alignment file is generated for each field. This file is generated from all images of the field from all cycles, and includes offset information for all images of the field relative to a reference image from the field.

In some embodiments, before alignment, each peak file is normalized with a point spread function, followed by generation of an artificial image from the normalized peak file and Fourier transform of the artificial image. The Fourier transform of the artificial image of the normalized peak file is then convolved with a complex conjugate of the Fourier transform of an artificial image from the normalized localization file for the corresponding field. This is done for each peak file for each cycle. The resulting files then undergo an inverse Fourier transform to regenerate image files, and the image files are aligned relative to the reference file from the field to generate offset information for each image file. In some embodiments, this alignment includes a fine fit relative to a reference file.

The field alignment file thus contains offset information for each oversampled image, and can be used in conjunction with the localization file for the corresponding field to generate highly accurate relative position for each analyte for use in the subsequent "Extract Intensities" steps.

As an example where 20 cycles are performed on a field, and one image is generated for each of 4 colors to be detected, thus generating 80 images of the field, one Field Alignment file is generated for all 80 images (20 cycles*4 colors) taken of the field. In some embodiments, the field alignment file contents include: the field, the color observed for each image, the step type in the cycled detection (e.g., binding or stripping), and the image offset coordinates relative to the reference image.

In some embodiments, during the alignment process XY "shifts" or "residuals" needed to align 2 images are calculated, and the process is repeated for remaining images, best fit residual to apply to all is calculated.

Figure 20C:
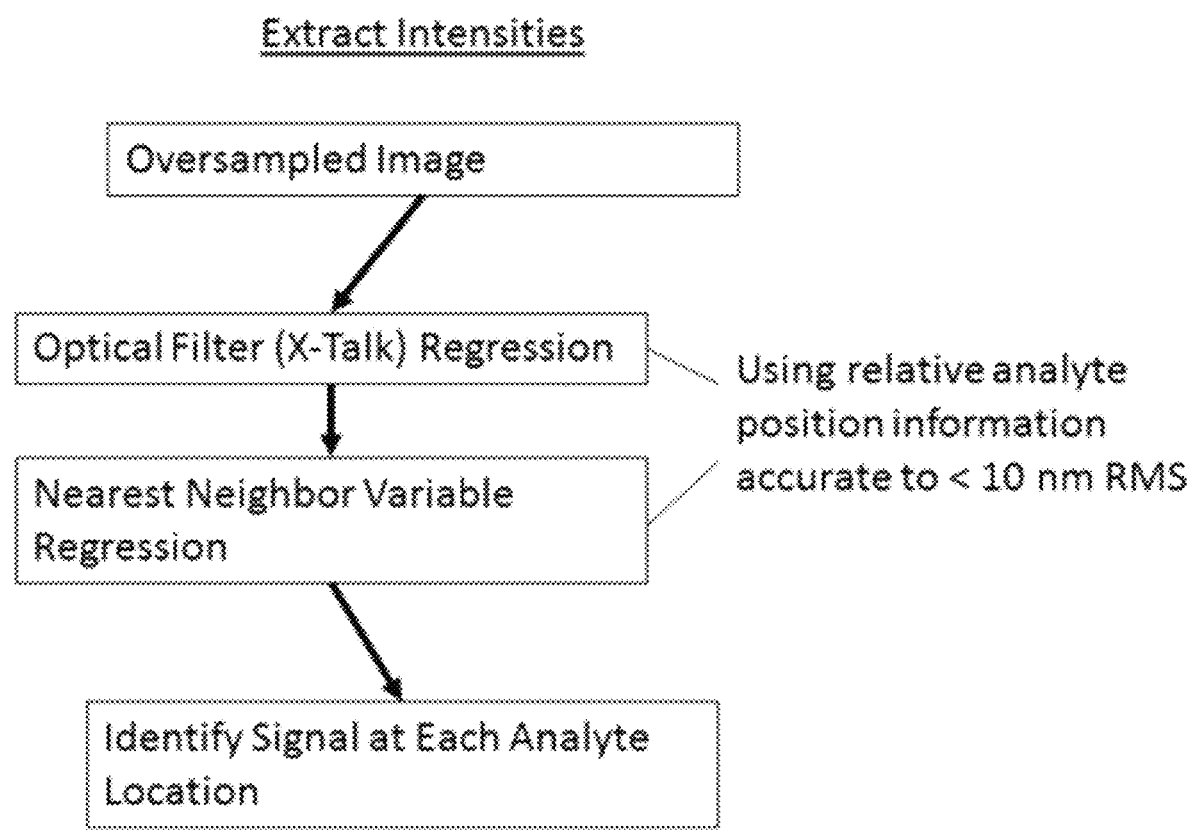
FIG. 20C shows a flowchart of steps for identification of overlapping optical signals from an image using accurate relative positional information and image deconvolution algorithms, according to an embodiment of the invention.

In some embodiments, residuals that exceed a threshold are thrown out, and best fit is re-calculated. This process is repeated until all individual residuals are within the threshold Each oversampled image is then deconvolved using the accurate position information from the localization file and the offset information from the field alignment file. An embodiment of the intensity extraction step is shown in FIG. 20C and FIG. 21. The Point Spread Function (PSF) of various molecules overlap because the center-to-center spacing is so small that the point-spread function of signals from adjacent analytes overlaps. Nearest neighbor variable regression in combination with the accurate analyte position information and/or offset information can be used to deconvolve signals from adjacent analytes that have a center-to-center distance that inhibits resolution due to the diffraction limit. The use of the accurate relative position information for each analyte facilitates spatial deconvolution of optical signals from neighboring analytes below the diffraction limit. In some embodiments, the relative position of neighboring analytes is used to determine an accurate center-to-center distance between neighboring analytes, which can be used in combination with the point spread function of the optical system to estimate spatial cross-talk between neighboring analytes for use in deconvolution of the signal from each individual image. This enables the use of substrates with a density of analytes below the diffraction limit for optical detection techniques, such as polynucleotide sequencing.

In certain embodiments, emission spectra overlap between different signals (i.e. "cross-talk"). For example, during sequencing by synthesis, the four dyes used in the sequencing process typically have some overlap in emission spectra.

In particular embodiments, a problem of assigning a color (for example, a base call) to different features in a set of images obtained for a cycle when cross talk occurs between different color channels and when the cross talk is different for different sets of images can be solved by cross-talk regression in combination with the localization and field alignment files for each oversampled image to remove overlapping emission spectrums from optical signals from each different detectable label used. This further increases the accuracy of identification of the detectable label identity for each probe bound to each analyte on the substrate.

Thus, in some embodiments, identification of a signal and/or its intensity from a single image of a field from a cycle as disclosed herein uses the following features: 1) Oversampled Image—provides intensities and signals at defined locations. 2) Accurate Relative Location—Localization File (provides location information from information from at least a subset of cycles) and Field Alignment File (provides offset/alignment information for all images in a field). 3) Image Processing—Nearest Neighbor Variable Regression (spatial deconvolution) and Cross-talk regression (emission spectra deconvolution) using accurate relative position information for each analyte in a field. Accurate identification of probes (e.g., antibodies for detection or complementary nucleotides for sequencing) for each analyte.

Image Processing Simulations

The effects of the methods and systems disclosed herein are illustrated in simulated cross-talk plots shown in FIG. 22A, FIG. 22B, FIG. 23A and FIG. 23B. For each of these figures, a cross-talk plot showing the intensity of emission spectrum correlated with one of four fluorophores at each detected analyte in a 10 µm×10 µm region is shown. Each axis corresponding to one of the four fluorophores extends to each corner of the plot. Thus, a spot located in the center of the plot will have equal contribution of intensity from all four fluorophores. Emission intensity detected from an individual fluorophore during an imaging cycle is assigned to move the spot in a direction either towards X, Y; X, −Y; −X, Y; or −X, −Y. Thus, separation of populations of spots along these four axes indicates a clear deconvolved signal from a fluorophore at an analyte location. Each simulation is based on detection of 1024 molecules in a 10.075 µm×10.075 µm region, indicating a density of 10.088 molecules per micron squared, or an average center-to-center distance between molecules of about 315 nm. This is correlated with an imaging region of about 62×62 pixels at a pixel size of 162.5 nm×162.5 nm.

Figures 23A, 23B:
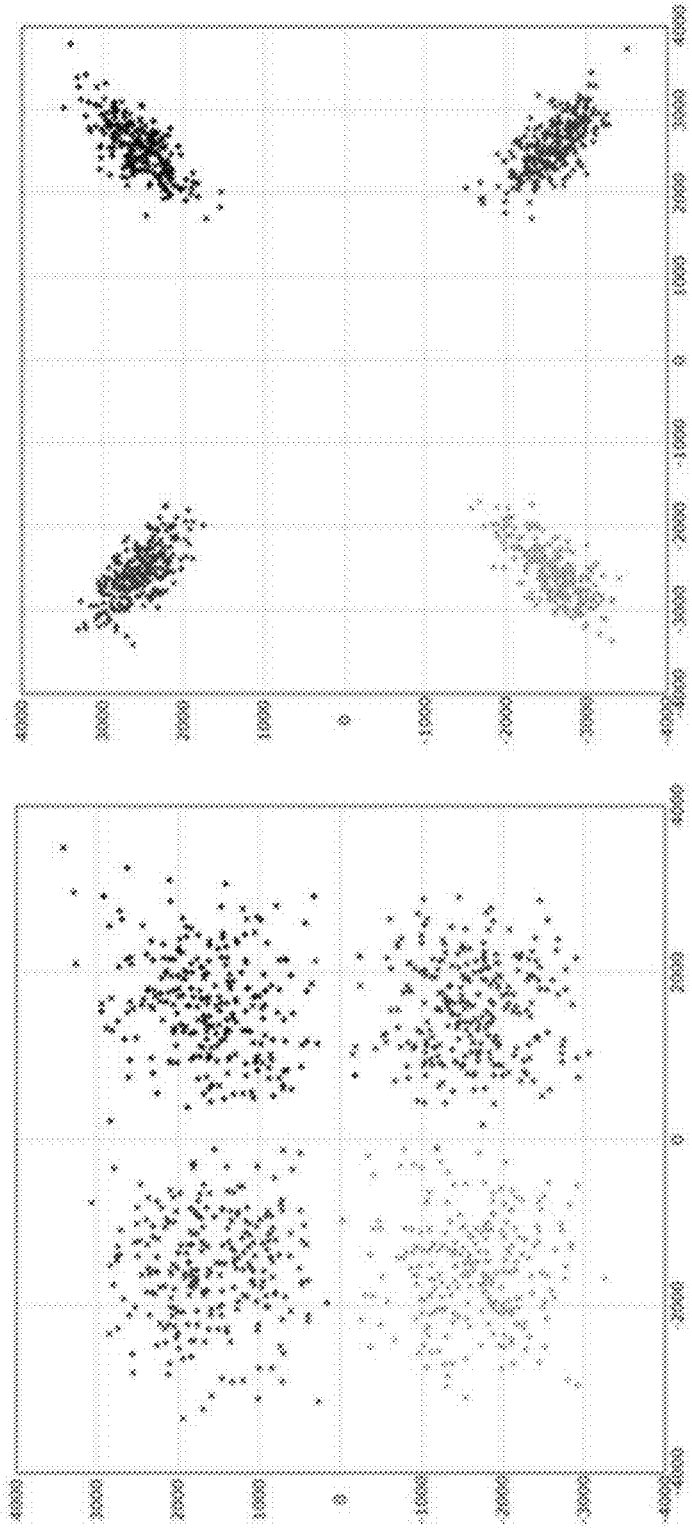
FIG. 23A shows a cross-talk plot of fluorophore intensity between four fluorophores from a 4× oversampled image.
FIG. 23B shows a cross-talk plot for the same imaging region but with deconvolution and nearest neighbor regression performed as shown in FIG. 11 and described herein.

FIG. 22A shows the cross-talk plot of fluorophore intensity between the four fluorophores from optical signals detected from the raw image. FIG. 22B and FIG. 23A each shows the separation between the four fluorophores achieved by generating a 4× oversampled image, indicating the achievement of some removal of cross-talk at each analyte. FIG. 23B shows a cross-talk plot for the same imaging region but with deconvolution and nearest neighbor regression performed as shown in FIG. 21 and described herein. As compared with FIG. 23A and FIG. 22A, each analyte detected shows clear separation of its optical signal from the other fluorophores, indicating a highly accurate fluorophore identification for each analyte.

Figures 24A, 24B:
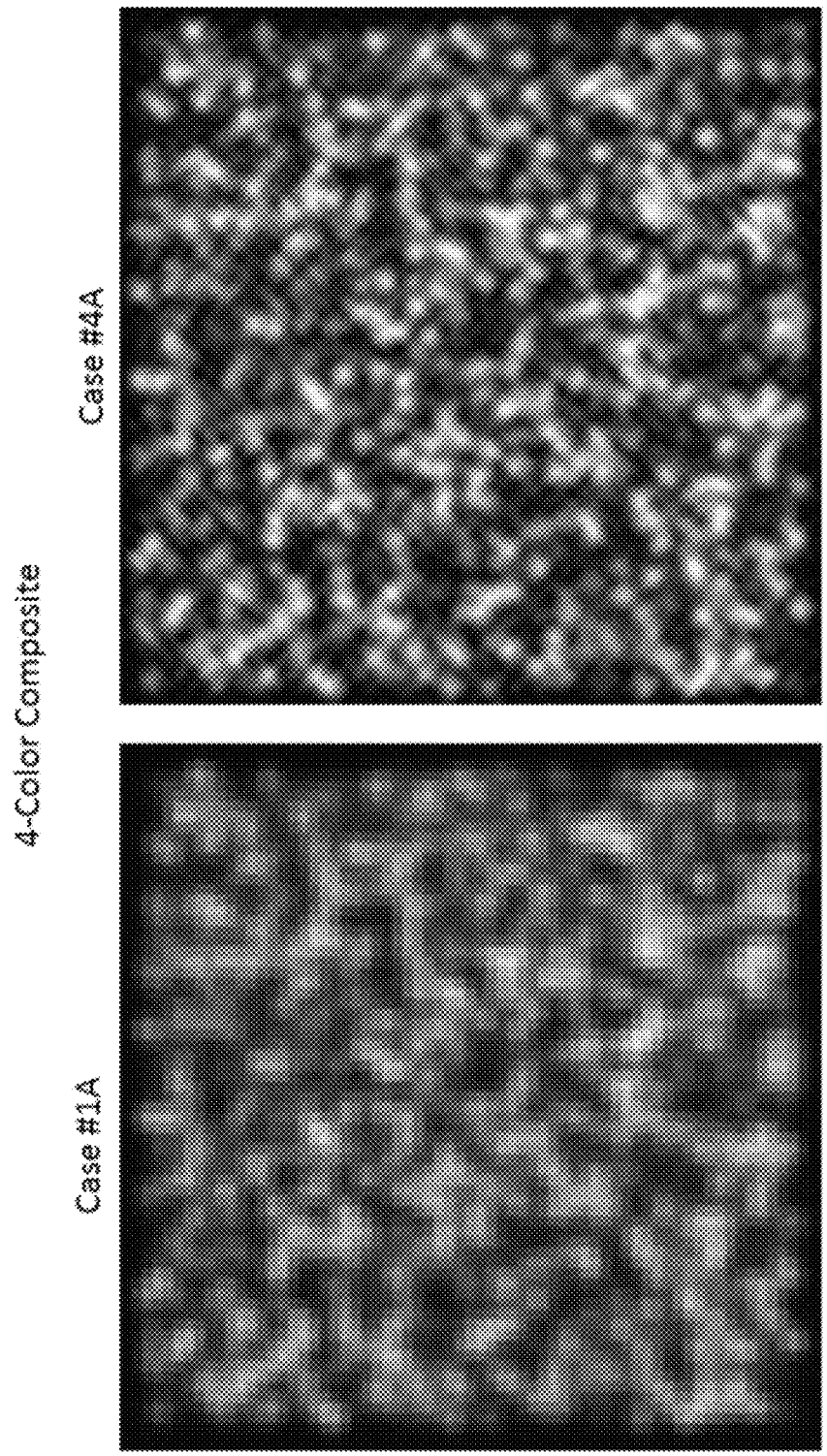
FIG. 24A shows a simulated four-color composite of a raw image of a field at a center-to-center spacing between analytes of about 315 nm.
FIG. 24B shows a simulated four-color composite of a deconvolved image at a center-to-center spacing between analytes of about 315 nm.
Figure 25A:
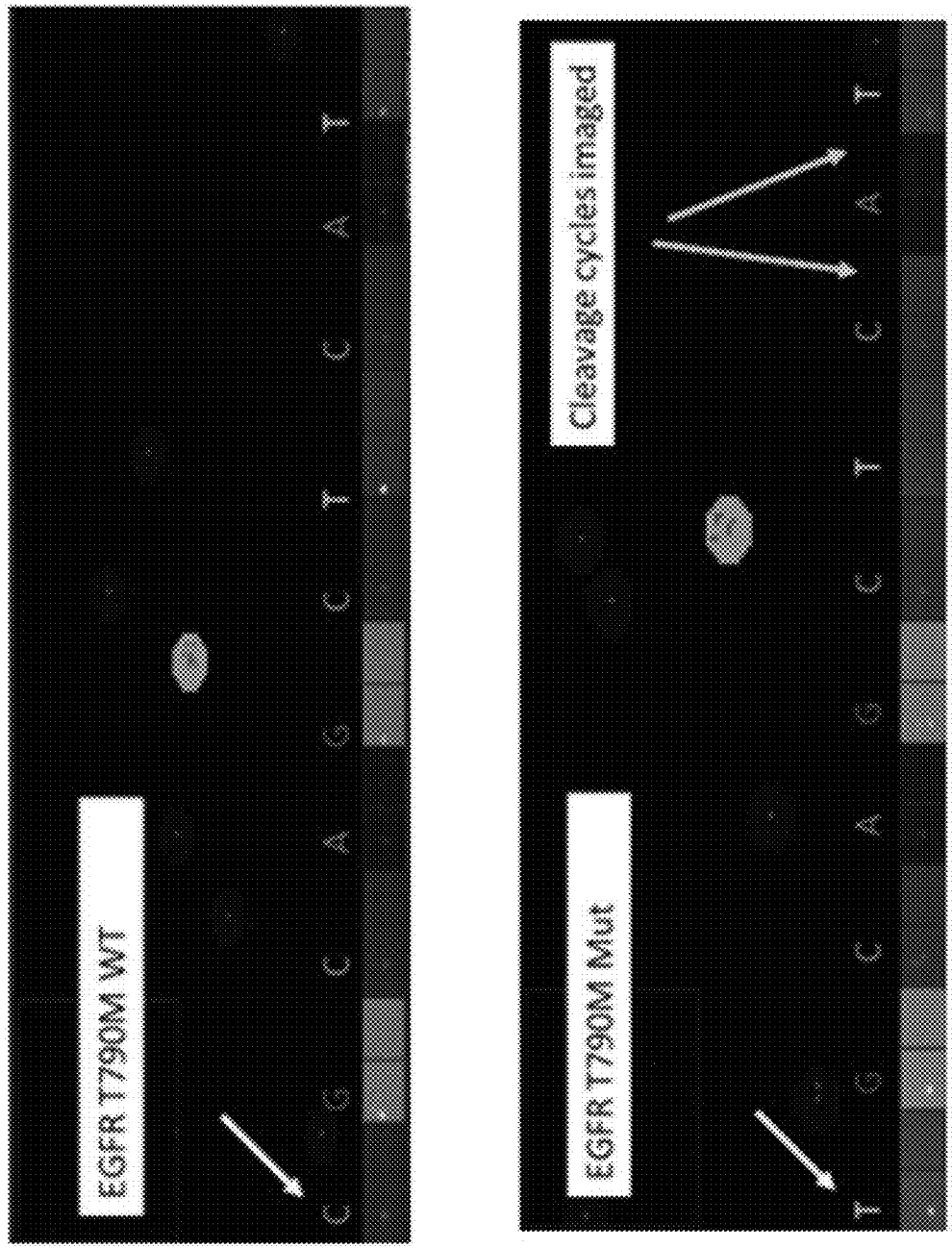
FIG. 25A shows results of sequencing of a 1:1 mixture of synthetic oligonucleotide templates corresponding to the region around codon 790 in the EGFR gene containing equal amounts of mutant and wild type (WT) targets.
Figure 26:
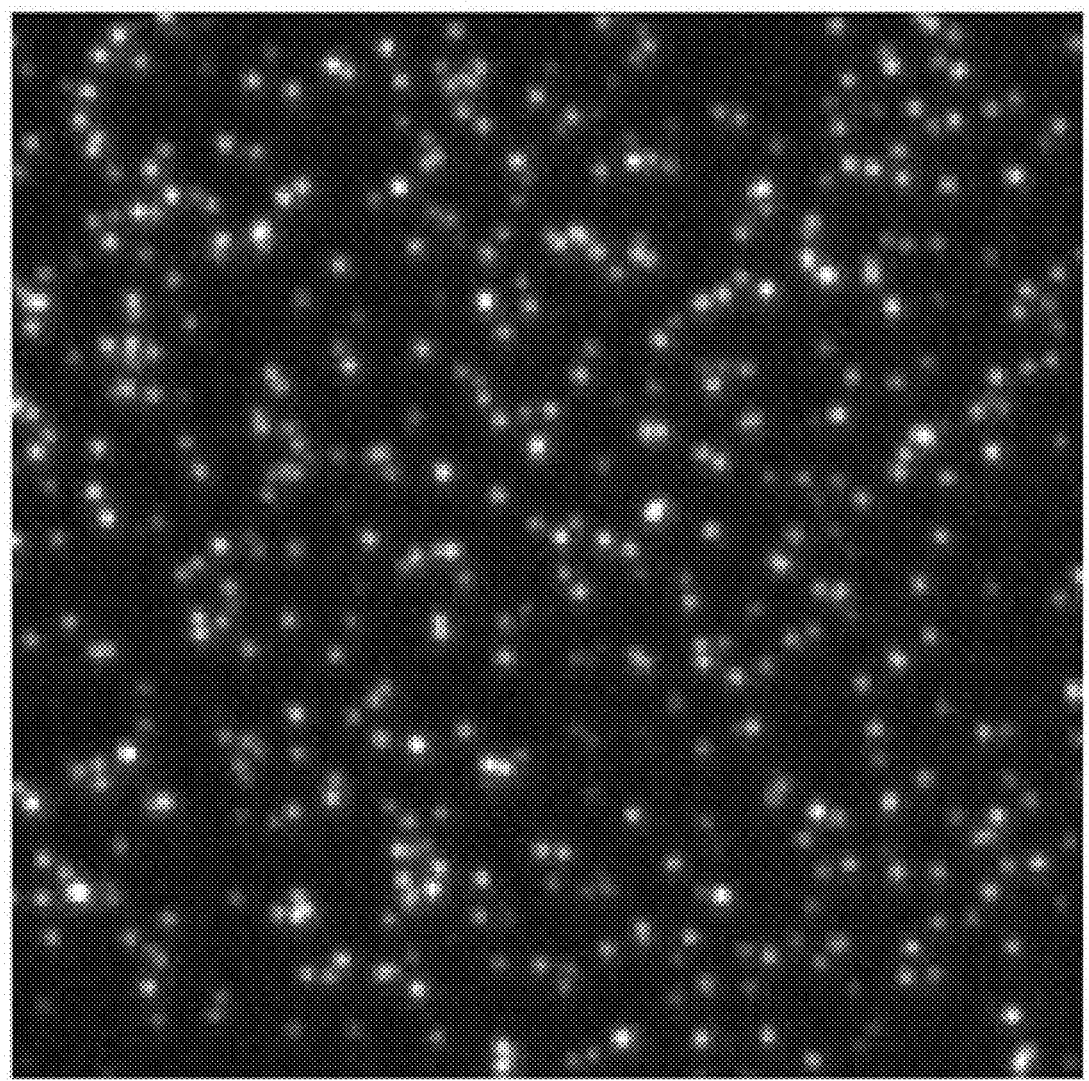
FIG. 26 is an image of single molecules immobilized on a substrate and bound by a probe comprising a fluorophore generated by the systems and methods described herein.
Figure 27:
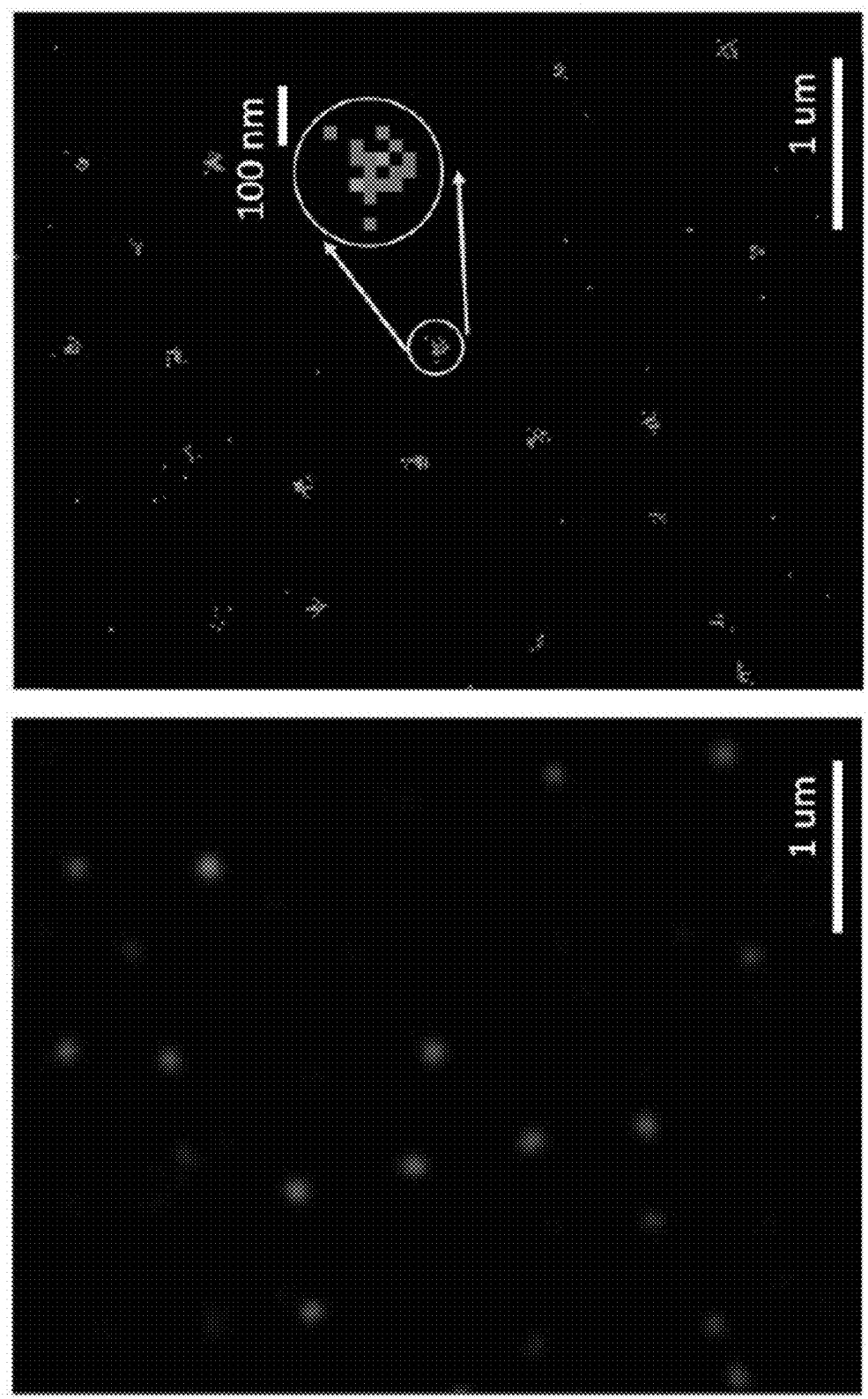
FIG. 27, right panel, shows peaks from oversampled images of a field from each cycle overlaid from several analytes on a substrate (clusters of peaks). The left panel is the smoothed version of the right panel, recapitulating a Gaussian distribution of peaks from an analyte across a plurality of cycles with a highly accurate peak indicating relative positional information.

FIG. 24A and FIG. 24B show a simulated four-color composite of each detected 10.075 µm×10.075 µm region as simulated above. This visually represents the clarity between analytes form the raw image (FIG. 24A) and the image processed as described herein (FIG. 24B).

Sequencing

The methods described above and in FIG. 21 also facilitate sequencing by sequencing by synthesis using optical detection of complementary reversible terminators incorporated into a growing complementary strand on a substrate comprising densely packed polynucleotides. Thus, signals correlating with the sequence of neighboring polynucleotides at a center-to-center distance below the diffraction limit can be reliably detected using the methods and optical detection systems described herein. Image processing during sequencing can also include previous cycle regression based on clonal sequences repeated on the substrate or on the basis of the data itself to correct for errors in the sequencing reaction or detection. In some embodiments, the polynucleotides immobilized on the substrate for sequencing are concatemers. A concatemer can comprise multiple identical copies of a polynucleotide to be sequenced. Thus, each optical signal identified by the methods and systems described herein can refer to a single detectable label (e.g., a fluorophore) from an incorporated nucleotide, or can refer to multiple detectable labels bound to multiple locations on a single concatemer, such that the signal is an average from multiple locations. The resolution that must occur is not between individual detectable labels, but between different concatemers immobilized to the substrate.

In some embodiments, molecules to be sequenced, single or multiple copies, will be bound to the surface using covalent linkages, by hybridizing to capture oligonucleotide on the surface, or by other non-covalent binding. The bound molecules will remain on the surface for hundreds of cycles and can be re-interrogated with different primer sets, following stripping of the initial sequencing primers, to confirm the presence of specific variants.

In one embodiment, the fluorophores and blocking groups may be removed using chemical reactions.

In another embodiment, the fluorescent and blocking groups may be removed using UV light.

In one embodiment, the molecules to be sequenced could be immobilized on reactive surfaces that have 50-100 nM diameters and these areas would be spaced at a pitch of 150-300 nM. These molecules may have barcodes, attached onto them for target de-convolution and a sequencing primer binding region for initiating sequencing. Buffers will contain appropriate amounts of DNA polymerase to enable an extension reaction. These sited could contain 10-100 copies of the target to be sequenced generated by any of the gene amplification methods available (PCR, whole genome amplification etc.)

In another embodiment, single target molecules, tagged with a barcode and a primer annealing site would be immobilized on a 20-50 nM diameter reactive surface spaced with a pitch of 60-150 nM. The molecules would be sequenced individually.

In one embodiment, a primer would bind to the target and would be extended using one dNTP at a time with a single or multiple fluorophore (s); the surface would be imaged, the fluorophore would be removed and washed and the process repeated to generate a second extension. The presence of multiple fluorophores on the same dNTP will enable defining the number of repeats nucleotides present in some regions of the genome (2 to 5 or more).

In a different embodiment, following primer annealing, all four dNTPs with fluorophores and blocked 3' hydroxyl groups would be used in the polymerase extension reaction, the surface would be imaged and the fluorophore and blocking groups removed and the process repeated for multiple cycles.

In another embodiment, the sequences could be inferred based on ligation reactions that anneal specific probes that ligate based on the presence of a specific nucleotides at a given position.

A random array may be used which will have improved densities over prior art random arrays using the techniques outlined above, however random arrays generally have 4× to 10× reduced areal densities of ordered arrays. Advantages of a random array include a uniform, non-patterned surface for the chip and the use of shorter nucleic acid strands because there is no need to rely on the exclusionary properties of longer strands.

Example 1

The System as described comprises of several sub-systems:
1. Flowcell containing DNA to be sequenced
2. Sample Stage with encoder
3. FPGA (scanning mirror control)
4. Laser illumination sources
5. High-speed scanning optics (single mirror)
6. One or more cameras
7. Instrument Control Software
8. Super-resolution algorithms used for image processing A flow cell with fluorescently tagged DNA (Sample) is installed on a sample chuck. The sample chuck is mounted inside a high throughput scanning imaging system (Instrument). The sample has a random array of fluorescing molecules on the substrate of the flow cell. During imaging, laser-based excitation of the fluorescent molecules causes them to emit photons of a longer wavelength. These emitted photons are then used to generate an image of the fluorescent molecules, yielding what looks like a star-field. These images are captured on two different cameras. Site-specific information is then calculated across the entire field. Subsequent images taken of the same field but with different DNA molecules present in conjunction with extensive image analysis (using super resolution algorithms) enable the DNA sequence to be determined.

An Alio Stage (#AI-LM-100000-XY) using a Heidenhain Encoder (#LIP28R with LIP 201R Scale, 512 nm signal pitch) was used to position our Flowcell along our scanning axis. The stage scanning axis had to be aligned to the scan axis of the scanning mirror (SM).

Position information for the sample stage was supplied with an encoder using a 2.048 um scale pitch, which yields a 512 nm signal period. Subsequent interpolation yields an effective 20 nm resolution over a full period. 4 digitized signals (at 90 degree phase increments) representing this position data are then fed into an FPGA. The FPGA takes these 4 digital signals and calculates the instantaneous stage position at each encoder pulse.

A 4-color laser illumination system was used to excite the fluorescent molecules in the Flowcell. The excitation wavelengths are 488 nm, 525 nm, 590 nm and 640 nm. Sub-diffraction limited performance is dependent on the wavelength of light used for the imaging; in this case, those emitted wavelengths are nominally 520 nm, 565 nm, 612 nm & 665 nm. For our 640 nm excitation wavelength, any resolvable features less than 302 nm in size are under the diffraction limit (lambda/(2*NA)) for this optical system.

A single scanning mirror is located at a point in the optical path where all optical rays are parallel (at the image of the objective exit pupil), ensuring minimal distortion of the image during scanning (see acceleration tracking patent). A 40× 1.1Numerical Aperture water immersion objective was used.

An 8192 point scanning mirror (SM) calibration waveform was created based on a target stage velocity. This waveform contains the SM steps needed to deflect the SM in the forward scan direction used for imaging and the back scan direction needed to re-position the mirror to begin the next forward scan. Each of the 8192 points in this waveform is called a scanning mirror step. At each scanning mirror step in this waveform, control values for each camera and each laser can be specified. The FPGA adds the instantaneous stage position value (calculated from the 4 digital encoder signals) to each step in the SM waveform, real-time, before sending the new value to the SM amplifier to update the position of the SM. Each camera acquires the image of a single field during the forward scan. Images of up to 120 fields in a single column of a Flowcell lane can be acquired before the stage stops and changes direction.

The SM drive amplifier applies this new voltage value to the SM which causes the SM to rotate just enough to keep the existing field of the Flowcell on the exact same location on the camera's SCMOS detector. Therefore, even though the sample stage holding the Flowcell is continuously moving, the SM is tracking the stage motion and keeping the exact same imaged region fixed on the camera detector. This series of steps is repeated for the majority of the forward scan ramp. During the back scan, no imaging is performed.

Two Hamamatsu ORCA Flash 4.0 SCMOS cameras were used in External Trigger mode. These cameras are capable of up to 100 frames per second image acquisition rates. A well-designed optical system for use in super-resolution applications requires that the camera detector chip & pixel size as well as the objective magnification and NA be matched to get optical performance that is diffraction-limited.

Instrument control software was used to control everything, including fluidics actions for the Flowcell, when to start and stop imaging scans, stage positions as well as many other critical functions. Once the scan of a single column (120 fields) was begun, the SM position, laser state & camera state is all defined by the SM waveform output to the SM amplifiers.

Figure 28:
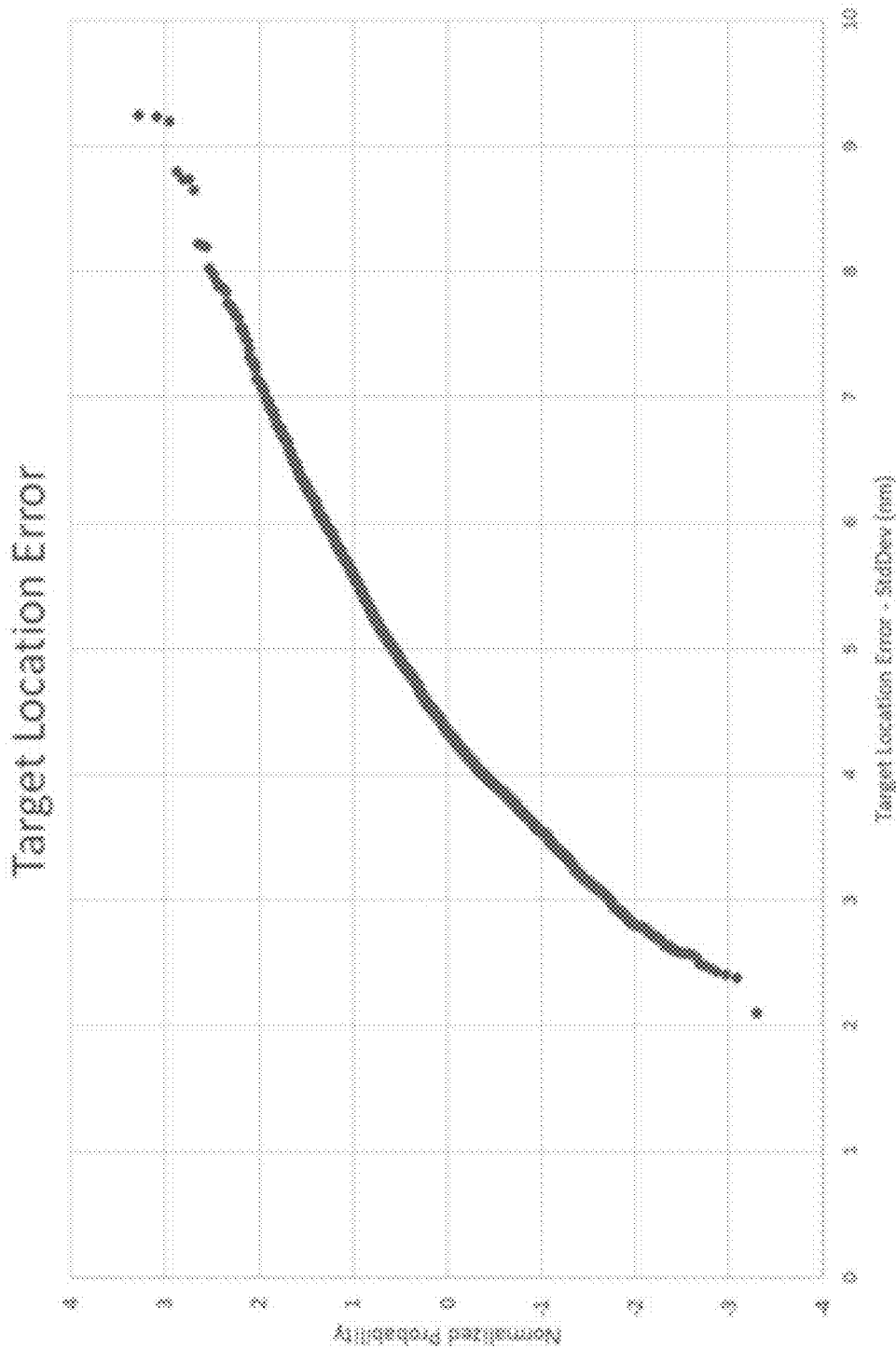
FIG. 28 shows localization variation for each of a plurality of molecules found in a field. The median localization variance is 5 nm and the 3 sigma localization variance is under 10 nm.
Figure 29:
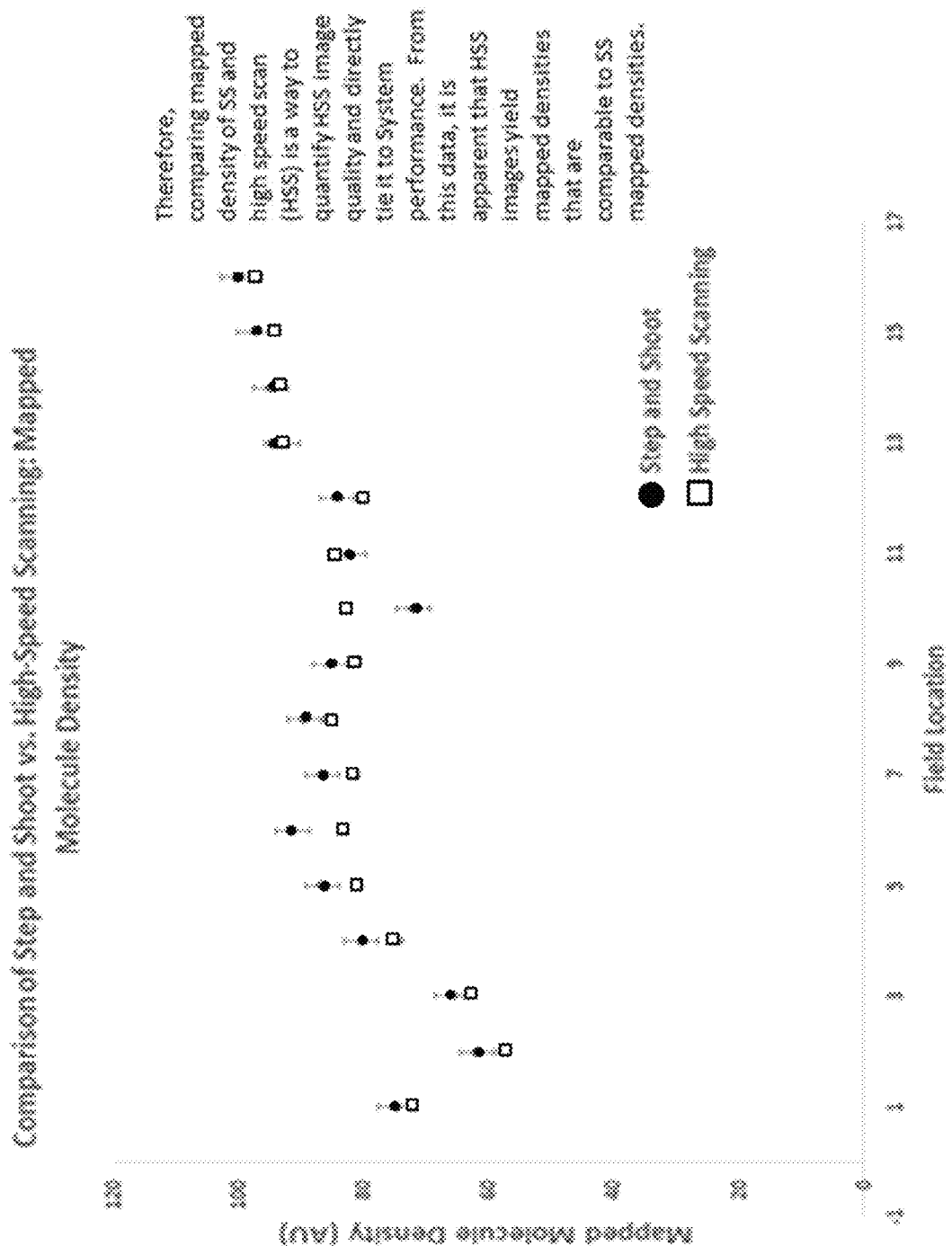
FIG. 29 shows example data obtained from the experiments of Example 1 demonstrating that the high speed scanning image yields mapped densities that are comparable to step and shoot mapped densities.

Once the images are acquired, many steps are performed to obtain sub-diffraction-limited resolution. FIG. 28 and FIG. 29 show examples of how mapped molecule density is comparable between step and shoot imaging and high speed scanning over a range of sample fields with differing conditions.

Example 2

Methods

The systems and methods described herein provide ample advantages over the current state of the art. A high-speed scanning ("HSS") system consistent with the features described herein was used to acquire images of analytes bound to detectable labels (e.g. fluorescently-tagged nucleic acid molecules). The HSS was configured to take images in 4 different colors over approximately 1200 fields. The HSS data was taken with a single scanning mirror and utilized real-time feedback from a linear encoder. The HSS data was imaged over an area of 77.7 mm$^2$. Once the images were acquired, image analysis software was used to determine the location of analytes in each field. Then an average density (analytes/μm$^2$) was calculated and assigned to each field measured.

The same measurements were performed using a conventional "step and shoot" ("SnS") system. For this SnS system, the data was acquired over 44 fields. The SnS data was imaged over an area of 4.85 mm$^2$. Once the images were acquired, image analysis software was used to determine the location of analytes in each field and an average density (analytes/μm$^2$) was then calculated and assigned to each field measured.

Results

Figure 31A:
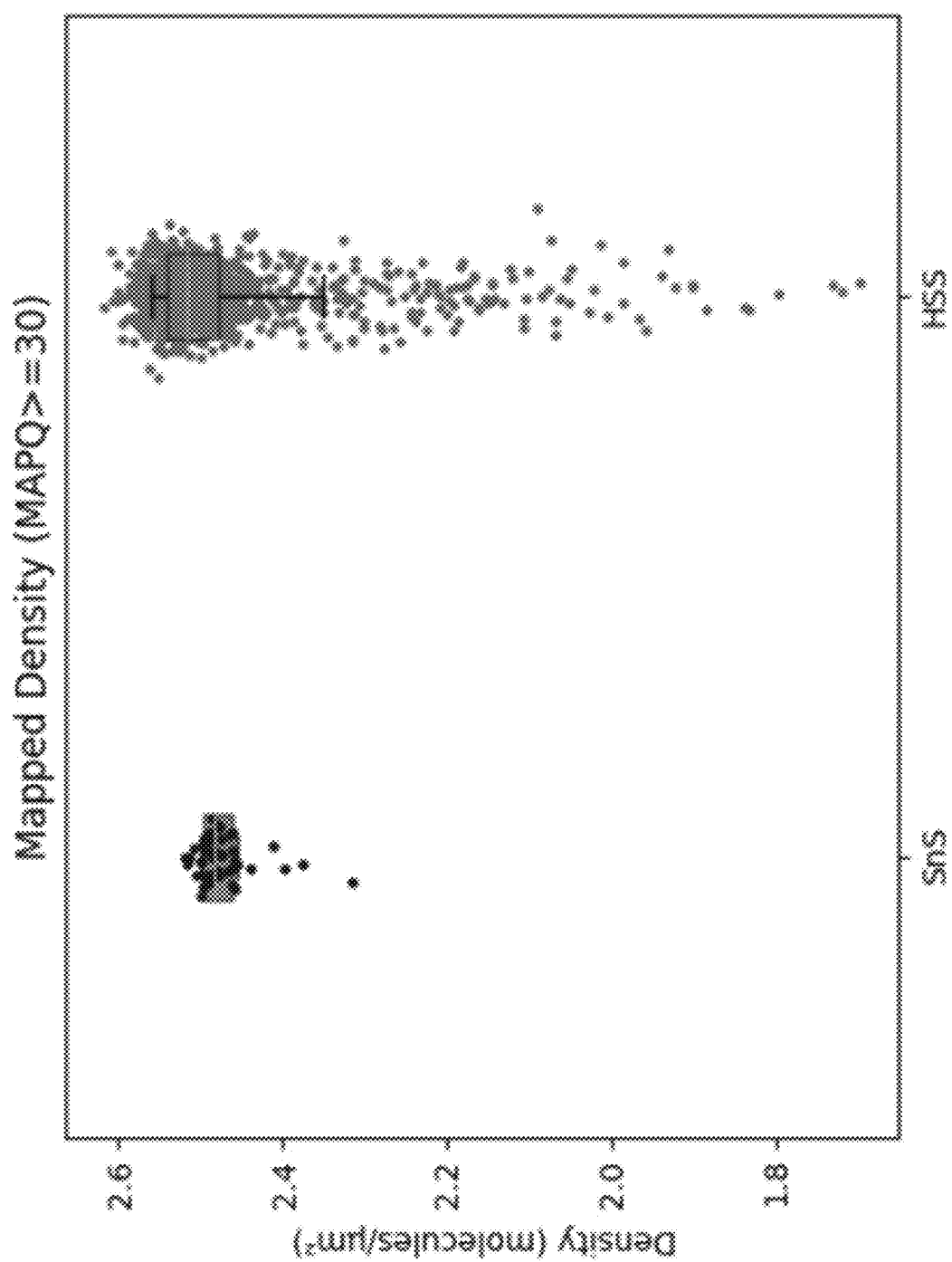
FIG. 31A shows the average analyte density (analyte/$\mu m^2$) measured across all fields in a fluidic cavity for both a system as described herein ("HSS") and a convention system ("SnS"). The line in the middle of the box is the median of the distribution. The box encompasses one-half of the data points and the box is centered on the median (line). The whiskers show the 10% mark and 90% mark of the data points.
Figure 31B:
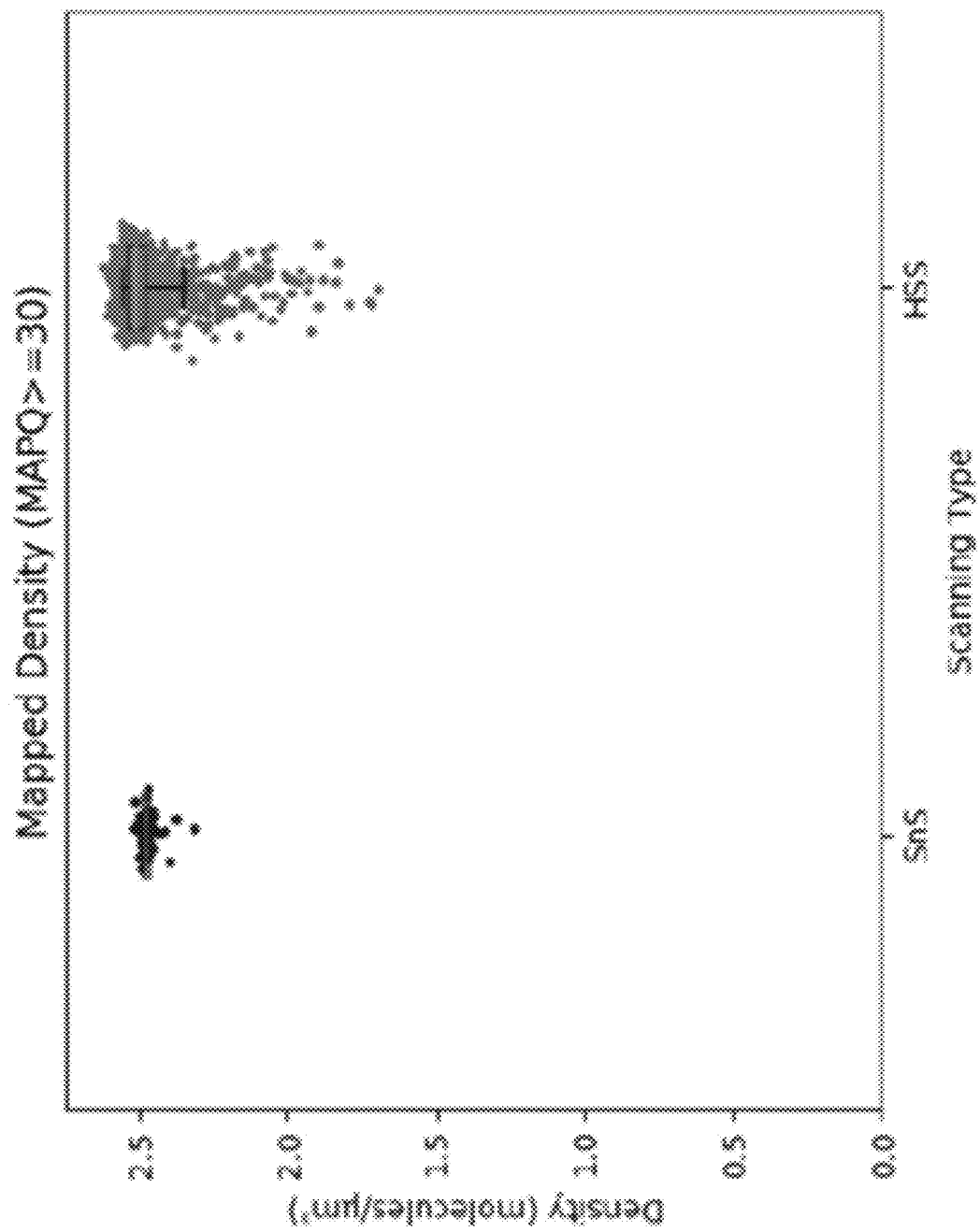
FIG. 31B shows the average analyte density (analyte/$\mu m^2$) measured across all fields in a fluidic cavity for both a system as described herein ("HSS") and a convention system ("SnS"). The line in the middle of the box is the median of the distribution. The box encompasses one-half of the data points and the box is centered on the median (line). The whiskers show the 10% mark and 90% mark of the data points.
Figure 31C:
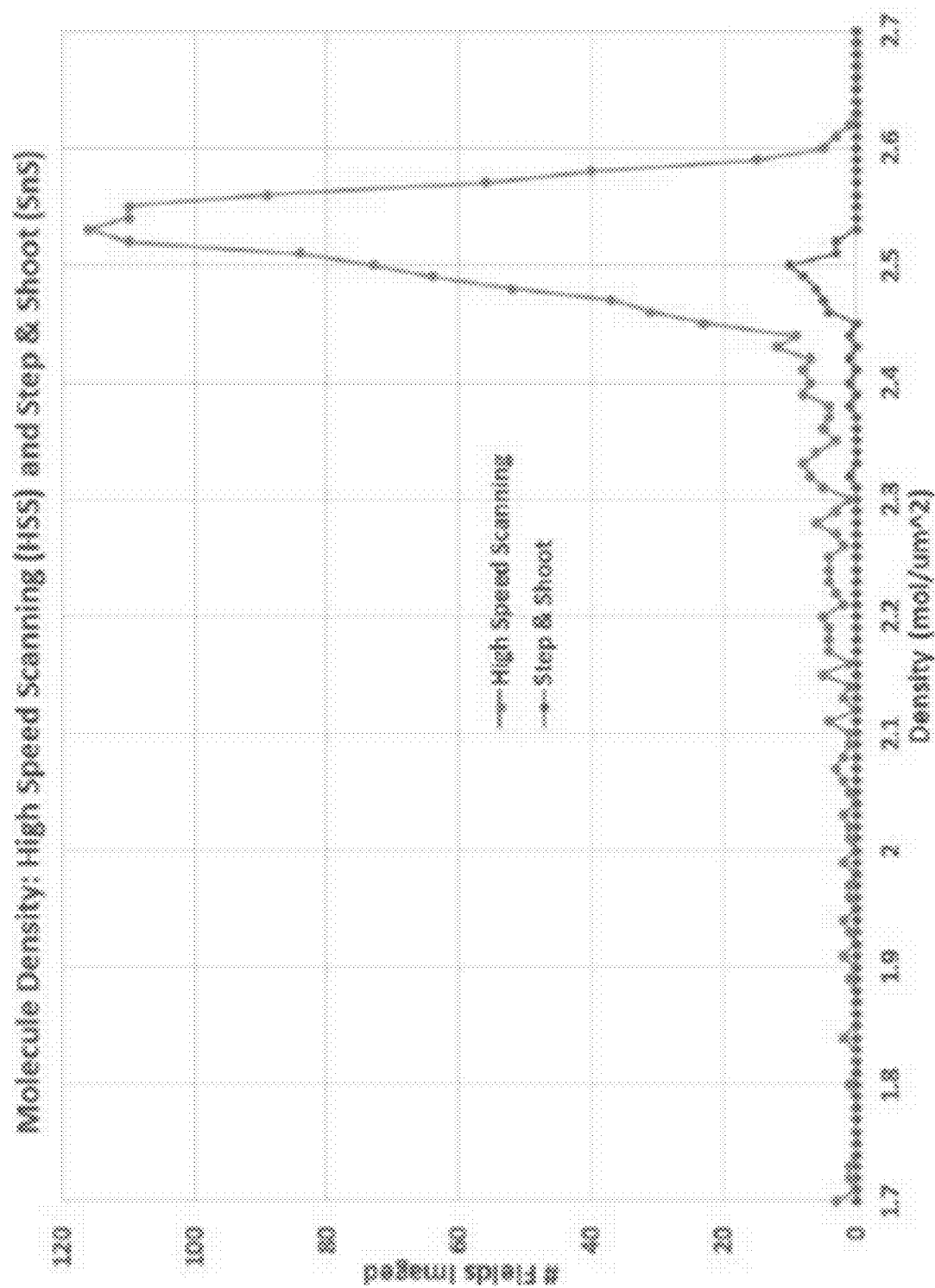
FIG. 31C shows the average analyte density as a function of the number of fields imaged for both a system as described herein ("HSS") and a convention system ("SnS").

The imaging time for both the HSS and the SnS data were comparable. Further, error rates for the HSS data were comparable to or lower than SnS error rates. FIGS. 31A-B show the average analyte density (analyte/μm$^2$) measured across all fields in a fluidic cavity for both HSS and SnS imaging. FIG. 31C is a histogram of the number of fields imaged, binned according to their analyte density (analytes/μm$^2$) for both HSS and SnS.

This data shows HSS has comparable detection performance (analyte density) to SnS while taking ~16× more data (the number of fields) in the same amount of time. This significant improvement to detection technology advances the current state of the art.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention.

Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method of imaging a moving substrate, wherein said moving substrate comprises a plurality of fields, comprising:
    a) disposing said substrate on a stage, wherein said stage moves along a defined path adjacent to a light source;
    b) receiving, by a central processing unit, positional information from an encoder, wherein said central processing unit performs a plurality of calculations of a plurality of positions for said stage;
    c) receiving, by a scanning mirror coupled to an axis adjacent to said defined path, said plurality of calculations of said plurality of positions for said stage;
    d) imaging at least a field of said plurality of fields with one or more cameras, thereby generating a plurality of images; and
    e) using an imaging algorithm to process said plurality of images to identify a position of an analyte of a plurality of analytes displaced on said substrate or a relative position of an analyte displaced on said substrate with respect to another analyte displaced on said substrate; wherein said plurality of analytes are disposed on said substrate at a density such that a minimum effective pitch between an analyte of said plurality of analytes and another analyte of said plurality of analytes is less than λ/(2*NA), wherein λ is a wavelength of light used in said defined path and 'NA' is a numerical aperture of said one or more cameras.

2. The method of claim 1, wherein (b)-(d) are performed synchronously.

3. The method of claim 1, wherein a plurality of movements of said scanning mirror is generated from said plurality of calculations of said central processing unit.

4. The method of claim 1, wherein said plurality of calculations is a function of a change in velocity of said stage.

5. The method of claim 1, wherein (b) further comprises providing, by said central processing unit, said plurality of calculations in a calibration waveform to said scanning mirror.

6. The method of claim 5, wherein (b) further comprises configuring said central processing unit to:
    generate one or more correction values for said position of said analyte of said plurality of analytes displaced on said substrate or said relative position of said analyte displaced on said substrate with respect to another analyte displaced on said substrate; and
    apply said one or more correction values to said calibration waveform.

7. The method of claim 1, wherein (c) further comprises moving said scanning mirror to an original position upon completing a scan of a field of said plurality of fields and scanning a subsequent field of said plurality of fields.

8. The method of claim 1, wherein (b) further comprises generating, by said encoder, a signal period from a plurality of encoder counts.

9. The method of claim 8, wherein said encoder counts are positioned at a distance of 0.05 micrometers to 30 micrometers.

10. The method of claim 8, wherein said encoder generates said signal period from said plurality of encoder counts at a signal period of up to 512 nanometers (nm).

11. The method of claim 1, wherein an image of said plurality of images comprises a blur of less than 10 nm to 40 nm.

12. The method of claim 11, wherein said blur is generated at a frame rate of 20 frames per second to 150 frames per second.

13. The method of claim 5, wherein each point of said calibration waveform comprises an associated control value for said one or more cameras, said light source, or a combination thereof.

14. The method of claim 5, wherein said calibration waveform is determined from a pre-calculated table.

15. The method of claim 1, wherein said plurality of fields comprises at least 20 fields.

16. The method of claim 15, wherein said substrate comprises a plurality of lanes, and wherein a lane of said plurality of lanes comprises a plurality of columns.

17. The method of claim 1, wherein said plurality of calculations comprises instantaneous calculations.

18. The method of claim 1, wherein said light source comprises a laser or a plurality of lasers.

19. A system comprising:
a) a light source;
b) one or more cameras operably coupled to an objective lens to capture a plurality of fields;
c) a stage, wherein, when in use, said stage holds a substrate and moves along a defined path adjacent to said light source;
d) an encoder mechanically operably coupled to said stage;
e) a central processing unit, wherein, when in use, said central processing unit receives positional information about said stage from said encoder and performs a plurality of calculations of a plurality of positions of said stage;
f) a scanning mirror coupled to an axis adjacent to said defined path, wherein said scanning mirror is operably coupled to said central processing unit to receive said plurality of calculations of said plurality of positions of said stage; and
g) an image processor, wherein, when in use, said image processor uses an imaging algorithm to process a plurality of images to identify a position of an analyte of a plurality of analytes displaced on said substrate or a relative position of an analyte displaced on said substrate with respect to another analyte displaced on said substrate, wherein said plurality of analytes are disposed on said substrate at a density such that a minimum effective pitch between an analyte of said plurality of analytes and another analyte of said plurality of analytes is less than $\lambda/(2*NA)$, and wherein $\lambda$ is a wavelength of light used in an optical path and 'NA' is a numerical aperture of said one or more cameras.

* * * * *